(12) United States Patent
Tian et al.

(10) Patent No.: US 12,673,873 B2
(45) Date of Patent: Jul. 7, 2026

(54) METHOD OF PREPARATION OF SILICON CARBIDE COMPOSITION AND USE THEREOF

(71) Applicant: The University of Chicago, Chicago, IL (US)

(72) Inventors: Bozhi Tian, Chicago, IL (US); Vishnu Nair, Chicago, IL (US); Aleksander Prominski, Chicago, IL (US)

(73) Assignee: The University of Chicago, Chicago, IL (US)

( * ) Notice: Subject to any disclaimer, the term of this patent is extended or adjusted under 35 U.S.C. 154(b) by 647 days.

(21) Appl. No.: 17/995,903

(22) PCT Filed: Apr. 13, 2021

(86) PCT No.: PCT/US2021/027099
§ 371 (c)(1),
(2) Date: Oct. 10, 2022

(87) PCT Pub. No.: WO2021/242425
PCT Pub. Date: Dec. 2, 2021

(65) Prior Publication Data
US 2023/0183075 A1 Jun. 15, 2023

Related U.S. Application Data

(60) Provisional application No. 63/011,033, filed on Apr. 16, 2020.

(51) Int. Cl.
| | |
|---|---|
| *C01B 32/977* | (2017.01) |
| *C01B 32/205* | (2017.01) |
| *C23C 30/00* | (2006.01) |

(52) U.S. Cl.
CPC .......... *C01B 32/977* (2017.08); *C01B 32/205* (2017.08); *C23C 30/00* (2013.01)

(58) Field of Classification Search
CPC ..... C01B 32/977; C01B 32/205; C23C 30/00; B32B 18/00; C04B 35/571; C04B 2235/665
See application file for complete search history.

(56) References Cited

PUBLICATIONS

Raju, et al., Synthesis of 3C-silicon carbide 1D structures by carbothermal reduction process, Journal of Alloys and Compounds 2021; 857: 158243, pp. 1-11 (Year: 2021).*
Nakajima, et al., Femtosecond Laser-Based Formation of Electrically Conductive Silicon Carbide on PDMS, Proc. of SPIE 2019; 10908: pp. 1090804-1 to 1098004-6 (Year: 2019).*
(Continued)

*Primary Examiner* — Daniel C. McCracken
(74) *Attorney, Agent, or Firm* — McDonnell Boehnen Hulbert & Berghoff LLP

(57) ABSTRACT

Compositions and methods directed to the synthesis and use of silicon carbide with, biomedical applications is provided. The method of synthesis includes providing a polydimethysiloxane (PDM'S) substrate, and irradiating at least a portion of the substrate with a laser under conditions sufficient to produce silicon carbide comprising 3C silicon carbide (3C-Si€). The composition can be used to modulate biological activity through electrical, chemical and heat stimuli.

20 Claims, 60 Drawing Sheets

A i. Surface

PDMS ii. Trench

PDMS iii. Cut-through

SiC

Graphite   Pyrolyzed PDMS

B

Electrical modulation

C

Objective

Photoelectrochemical modulation

(56)  References Cited

PUBLICATIONS

Nakajima, et al., Femtosecond Laser-Based Modification of PDMS to Electrically Conductive Silicon Carbide, Nanomaterials 2018; 8; 558: pp. 1-9 (Year: 2018).*

Amoros et al., "Synthesis and Characterization of SiC/MC/C Ceramics (M= Ti, Zr, Hf) Starting from Totally Non-Oxidic Precursors", Chem. Mater., 2002, vol. 14, No. 4, pp. 1585-1590.

Aron et al., "Neural Synchronization in Alzheimer's Disease", Nature, 2016, vol. 540, pp. 207-208.

Artimovich et al., "PeakCaller: An Automated Graphical Interface for the Quantification of Intracellular Calcium Obtained by High-Content Screening", BMC Neurosci., 2017, vol. 18, pp. 72-89.

Burns et al. "High-Temperature Chemistry of the Conversion of Siloxanes to Silicon Carbide" Chem Mater., 1992, vol. 4, No. 6, pp. 1313-1323.

Cattaneo et al., "Cell-Surface Receptors Transactivation Mediated by G Protein-Coupled Receptors", Int. J. Molecular Sciences, 2014, vol. 15, pp. 19700-19728.

Choyke et al., "Optical Properties of Cubic SiC: Luminescence of Nitrogen-Exciton Complexes, and Interband Absorption", Physical Review, 1964, vol. 133, No. 4A, pp. A1163-A1166.

Chun et al., "Conduction and Valence Band Positions of $Ta_2O_5$, TaON, and $Ta_3N_5$ by UPS and Electrochemical Methods", J. Phys. Chem. B., 2003, vol. 107, pp. 1798-1803.

Dai et al., "Mesh Nanoelectronics: Seamless Integration of Electronics with Tissues", Acc. Chem. Res., 2018, vol. 51, No. 2, pp. 309-318.

Dimmeler et al., "Activation of Nitric Oxide Synthase in Endothelial Cells by Akt-Dependent Phosphorylation", Nature, 1999, vol. 399, pp. 601-605.

Do et al., "Hydrogen Peroxide Decomposition on Manganese Oxide (Pyrolusite): Kinetics, Intermediates, and Mechanism", Chemosphere, 2009, vol. 75, pp. 8-12.

Farahani et al., "Three-Dimensional Printing of Multifunctional Nanocomposites: Manufacturing Techniques and Applications", Advanced Materials, 2016, vol. 28, pp. 5794-5821.

Gemes et al., "Calcium Signaling in Intact Dorsal Root Ganglia: New Observations and the Effect of Injury", Anesthesiology, 2010, vol. 113, pp. 134-146.

González-Pacheco et al., "Mechanism of Vascular Smooth Muscle Cells Activation by Hydrogen Peroxide: Role of Phospholipase C Gamma", Nephrol. Dial, Transplant., 2002, vol. 17, pp. 392-398.

Han et al., "Atomically Dispersed Molybdenum Catalysts for Efficient Ambient Nitrogen Fixation", Angewandte Chemie International Edition, 2019, vol. 131, pp. 2343-2347.

Hu et al., "Synthesis and Characterization of Ultralong SiC Nanowires with Unique Optical Properties, Excellent Thermal Stability and Flexible Nanomechanical Properties", Scientific Reports, 2017, vol. 7, 3011 (10 pages).

Jepps et al., "Polytypic Transformations in Silicon Carbide", Progress in Crystal Growth and Characterization, 1983, vol. 7, No. 1-4, pp. 259-307.

Jiang et al., "Rational Design of Silicon Structures for Optically Controlled Multiscale Biointerfaces", Nature Biomed. Eng, 2018, vol. 2, No. 7, pp. 508-521.

Kim et al., "Oxygen-Doped Porous Silicon Carbide Spheres as Electrode Materials for Supercapacitors", Physical Chemistry Chemical Physics, 2016, vol. 18, pp. 3331-3338.

Knippenberg, W.F., "Growth Phenomena in Silicon Carbide", Philips Research Report, 1963, vol. 18, pp. 161-274.

Kuo et al., "Robust Mesoporous Manganese Oxide Catalysts for Water Oxidation", ACS Catalysis, 2015, vol. 5, pp. 1693-1699.

La Via et al., "From Thin Film to Bulk 3C-SiC Growth: Understanding the Mechanism of Defects Reduction" Materials Science in Semiconductor Processing, 2018, vol. 78, pp. 57-68.

Lee et al., "Dissolution of Monocrystalline Silicon Nanomembranes and Their Use as Encapsulation Layers and Electrical Interfaces in Water-Soluble Electronics", ACS Nano, 2017, vol. 11, No. 12, pp. 12562-12572.

Luong et al., "Laser-Induced Graphene Composites as Multifunctional Surfaces", ACS Nano, 2019, vol. 13, pp. 2579-2586.

Mandel et al., "Vasoconstriction by Electrical Stimulation: New Approach to Control of Non-Compressible Hemorrhage", Sci Rep., 2013, vol. 3, pp. 2111.

Mokhov, Evgenly N., "Doping of SiC Crystals during Sublimation Growth and Diffusion", Crystal Growth in Communications, 1997, vol. 103, No. 5, pp. 1-25.

Morales et al., "A Laser Ablation Method for the Synthesis of Crystalline Semiconductor Nanowires", Science, 1998, vol. 279, pp. 208-211.

Nair et al., "Exceptional Photoconductivity of Poly(3-hexylthiophene) Fibers Through in situ Encapsulation of Molybdenum Disulfide Quantum Dots", Nanoscale, 2018, vol. 22, pp. 10395-10402.

Nair et al., "Mechanochemically Controlling the Van Der Waals Gap in Molybdenum Disulfide Nanosheets", Phys. Rev. Materials, 2019, vol. 3, No. 1, pp. 015802-1 to 015802-6.

Nair, et al., "Photon Induced Non-Linear Quantized Double Layer Charging in Quaternary Semiconducting Quantum Dots", Journal of Colloid and Interface Science, 2018, vol. 514, pp. 452-458.

Najafpour et al., "Manganese Compounds as Water-Oxidizing Catalysts: From the Natural Water-Oxidizing Complex to Nanosized Manganese Oxide Structures", Chemical Reviews, 2016, vol. 116, pp. 2886-2936.

Nakajima et al., "Femtosecond Laser-Based Modification of PDMS to Electrically Conductive Silicon Carbide", Nanomaterials, 2018, vol. 8, No. 558, pp. 1-9.

Rajeshwar, Krishnan, "Fundamentals of Semiconductor Electrochemistry and Photoelectrochemistry", Encyclopedia of Electrochemistry, A. J. Bard, Ed. (Wiley-VCH Verlag Gmbh & Co. KGaA, Weinheim, Germany, 2007 (52 pages).

Riedy et al, "Use of a Neuromuscular Stimulator to Increase Anal Sphincter Pressure", Spinal Cord, 2000, vol. 38, pp. 724-727.

Ruska et al., "The Quantitative Calculation of SIC Polytypes from Measurements of X-Ray Diffraction Peak Intensities", J. Mater. Sci., 1979, vol. 14, pp. 2013-2017.

Santiago et al., "Hydrogen Peroxide Activates Store-Operated Ca 2+ Entry in Coronary Arteries: Redox Regulation of SOC Entry in Coronary VSM", British Journal of Pharmacology, 2015, vol. 172, pp. 5318-5332.

Savineau et al., "Cytosolic Calcium Oscillations in Smooth Muscle Cells", Neuro Physiology Sci., 2000, vol. 15, pp. 50-55.

Shim et al., "Anomalous Photoluminescence from 3C-SiC Grown on Si (111) by Rapid Thermal Chemical Vapor Deposition", Appli. Phys. Lett., 1997, vol. 70, pp. 1757-1759.

Siahrostami, et al., "One- or Two-Electron Water Oxidation, Hydroxyl Radical, or $H_2O_2$ Evolution", J. Phys. Chem. Lett., 2017, vol. 8, pp. 1157-1160.

Sneyd et al., "On the Dynamical Structure of Calcium Oscillations", Proc. Natl. Acad. Sci. USA, 2017, vol. 114, pp. 1456-1461.

Stanford et al., "Laser-Induced Graphene Triboelectric Nanogenerators", ACS Nano, 2019, vol. 13, No. 6, pp. 7166-7174.

Ushio-Fukai et al., "Vascular Signaling Through G Protein-Coupled Receptors: New Concepts", Current Opinion in Nephrology and Hypertension, 2009, vol. 18, pp. 153-159.

Wang et al., "Periodically Twinned SiC Nanowires", Nanotechnology, 2008, vol. 19, 215602 (7 pages).

Yang et al., Mechanisms of Hydrogen Peroxide-Induced Contraction of Rat Aorta, European Journal of Pharmacology, 1998, vol. 344, pp. 169-181.

Ye et al., "Laser-Induced Conversion of Teflon into Fluorinated Nanodiamonds or Fluorinated Graphene", ACS Nano, 2018, vol. 12, pp. 1083-1088.

Yu et al. "Bioresorbable Silicon Electronics for Transient Spatiotemporal Mapping of Electrical Activity from the Cerebral Cortex", Nature Materials, 2016, vol. 15, pp. 782-791.

Zou et al., "Facile Electrosynthesis of Silicon Carbide Nanowires from Silica/Carbon Precursors in Molten Salt", Nature Scientific Reports, 2017, vol. 7, 9978, pp. 1-9.

Zou et al. "Investigation of the Differential Capacitance of Highly Ordered Pyrolytic Graphite as a Model Material of Graphene", Langmuir, 2016, vol. 32, pp. 11448-11455.

(56) References Cited

PUBLICATIONS

Gao, et al., "Laser Direct Writing of Ultrahigh Sensitive SiC-Based Strain Senor Arrays on Elastomer Toward Electronic Skins," Adv. Funct. Mater., 2019, vol. 29, pp. 1806786 through 1086786.

Nakajima, et al., "Femtosecond Laser-Based Formation of Electrically Conductive Silicon Carbide on PPMS," Proc. of SPIE, 2019, vol. 10908, pp. 1090804-1 through 1098004-6.

Notice of Transmittal of the International Search Report and the Written Opinion of the International Search Authority, or the Declaration dated Feb. 25, 2022 for the International Patent Application No. PCT/US2021/027099.

* cited by examiner

A

PDMS i. Surface

PDMS ii. Trench iii. Cut-through

SiC

Graphite     Pyrolyzed PDMS

B

Electrical modulation

C

Objective

Photoelectrochemical modulation d

4H SiC
3C SiC
15R SiC

C

| Peak | SiC | M-SiC | SiC-MnO$_2$ |
|------|------|-------|---------|
| Si-2p | 42.3 | 37.19 | 21 |
| C-1s | 35.63 | 28.62 | 46.69 |
| N-1s | 1.06 | 3.75 | 1.62 |
| O-1s | 21 | 30.4 | 28.29 |
| Mn-2p | 0 | 0 | 2.4 |

1

METHOD OF PREPARATION OF SILICON CARBIDE COMPOSITION AND USE THEREOF

CROSS REFERENCE TO RELATED APPLICATIONS

This application is a 371 U.S. national phase of PCT/US2021/02709), filed Apr. 13, 2021, which claims the benefit of priority from U.S. provisional application No. 63/011,033, filed Apr. 16, 2020, both which are incorporated by reference in its entirety.

REFERENCE TO GOVERNMENT RIGHTS

This invention was made with government support under grant number W911 NF-18-1-0042 awarded by the Army Research Office, grant number NS101488 awarded by National Institutes of Health, grant numbers N00014-16-1-2958 and N00014-16-1-2530 awarded by the Office of Naval Research, and grant number FA9550-18-1-0503 awarded by the Air Force Office of Scientific Research. The government has certain rights in the invention.

FIELD

A composition and method of preparation is disclosed. The composition can be advantageously used for stimulated modulation of biological cells and tissues, and production of hydrogen peroxide.

BACKGROUND

Development and integration of next-generation semiconducting materials continues to revolutionize fields of sensing, catalysis, and medicine. Of particular interest is the direct synthesis of semiconducting materials embedded in insulating polymeric substrates. However, the current art is limited to a limited subset of materials and methods, precluding widespread application.

An attractive target is the development of novel materials for biological sensing and modulation. In the past, silicon semiconductors have been widely utilized to this end. However, silicon suffers from severe drawbacks including degradation under physiological conditions, high cost, complex fabrication methods, and limited chemical and physical properties. Additionally, in contrast to semiconductor-based information processing systems, materials and devices used for bioelectronics or biomaterials prioritize operational flexibility over structural precision.

Hence, there is a demand in biointerface research to produce inexpensive and user-defined materials and devices while taking advantage of advanced methods, such as laser ablation and 3D printing, in order to provide improved materials for biological sensing and modulation.

SUMMARY

Rapid, direct synthesis techniques such as laser ablation have the promise to access metastable compositions and phases that are difficult to manufacture with conventional synthesis techniques. Additionally, the emerging fields of laser-assisted 3D printing may be adapted to laser ablation, allowing creation of arbitrary patterns and networks that allow simultaneous synthesis and design. Laser-assisted processes have been used for material synthesis due to their ease in fabrication, low cost, and their unique capacity to generate metastable phase. However, there are limited design principles available for this method to create functional materials for applications such as biological sensing or modulation. To address this limitation, a material system was developed that allows for the electrical, photoelectrochemical and photothermal modulation of multiscale biological components.

Of particular interest are methods to produce controlled patterns of silicon carbide (SiC). Silicon carbide has been a material of significant importance in the semiconductor industry for decades, but its utility in biological modulation from an optical and electronic perspective is much less explored. Attractively, silicon carbide possesses excellent stability under physiological conditions. Further, silicon carbide is known to form several hundred polytypes, though hexagonal 6H and 4H are the most widely-grown and frequently used in electronics. However, the cubic 3C polytype (3C—SiC) is an attractive target due to its high mobility, thermal conductivity, and saturation drift velocity. However, 3C—SiC cannot be grown by conventional methods in large quantities, or with a high level of quality.

In the present disclosure, two- and three-dimensional laser printing of 3C—SiC using polydimethylsiloxane as a precursor is demonstrated. The laser-assisted process enables incorporation of nitrogen as a dopant, making the electrode capable of exhibiting pseudocapacitive charging. A dual modification strategy is further presented for tuning material properties. This strategy involves use of additives in the initial raw material, or post-synthetic surface functionalization to obtain different sets of optoelectronic properties with which to provide stimuli to cellular tissue.

In one aspect, the disclosure provides for a method comprising: providing a polydimethylsiloxane (PDMS) substrate, and irradiating at least a portion of the substrate with a laser under conditions sufficient to produce silicon carbide comprising 3C silicon carbide.

In another aspect, the disclosure provides a method comprising a $MoS_2$-modified PDMS substrate, and irradiating at least a portion of the $MoS_2$-modified PDMS substrate with a laser under conditions suitable to produce silicon carbide a mixed-phase silicon carbide comprising 3C—SiC and 15R silicon carbide (15R—SiC), collectively M-SiC.

In certain embodiments as otherwise described herein, the PDMS membrane further comprises a gold membrane.

In certain embodiments, the disclosure also provides for a device comprising the silicon carbide produced as otherwise described herein.

In certain embodiments, the disclosure also provides for a method of modulating muscle contraction, comprising: contacting the device as otherwise described herein with a muscle cell; and stimulating the muscle cell with the device.

In certain embodiments as otherwise described herein, the stimulation can be electrical pulses or light pulses.

In certain embodiments, the disclosure also provides for a method of modulating neural activity, comprising contacting a plurality of neuronal cells with the silicon carbide produced as otherwise described herein to form a network having nodes, wherein the nodes comprise neuronal soma; and optically stimulating a node.

In certain embodiments, the disclosure also provides for a neural network comprising: cultured neuronal cells seeded with crystals of the silicon carbide produced as otherwise described herein, wherein the neuronal cells form entangled junctions with the crystals to form a neural network having nodes, wherein the nodes comprise neuronal soma.

In certain embodiments, the disclosure also provides for a method for generating hydrogen peroxide, comprising: contacting the silicon carbide produced as otherwise described herein with water; and stimulating the silicon carbide under suitable conditions so as to generate hydrogen peroxide.

These as well as other aspects, advantages, and alternatives will become apparent to those of ordinary skill in the an by reading the following detailed description with reference where appropriate to the accompanying drawings. Further, it should be understood that the description provided in this summary section and elsewhere in this document is intended to illustrate the claimed subject matter by way of example and not by way of limitation.

4 from atom probe tomography indicates nitrogen present in silicon carbide lattice and its bonding with carbon and silicon atoms.

Figure 4:
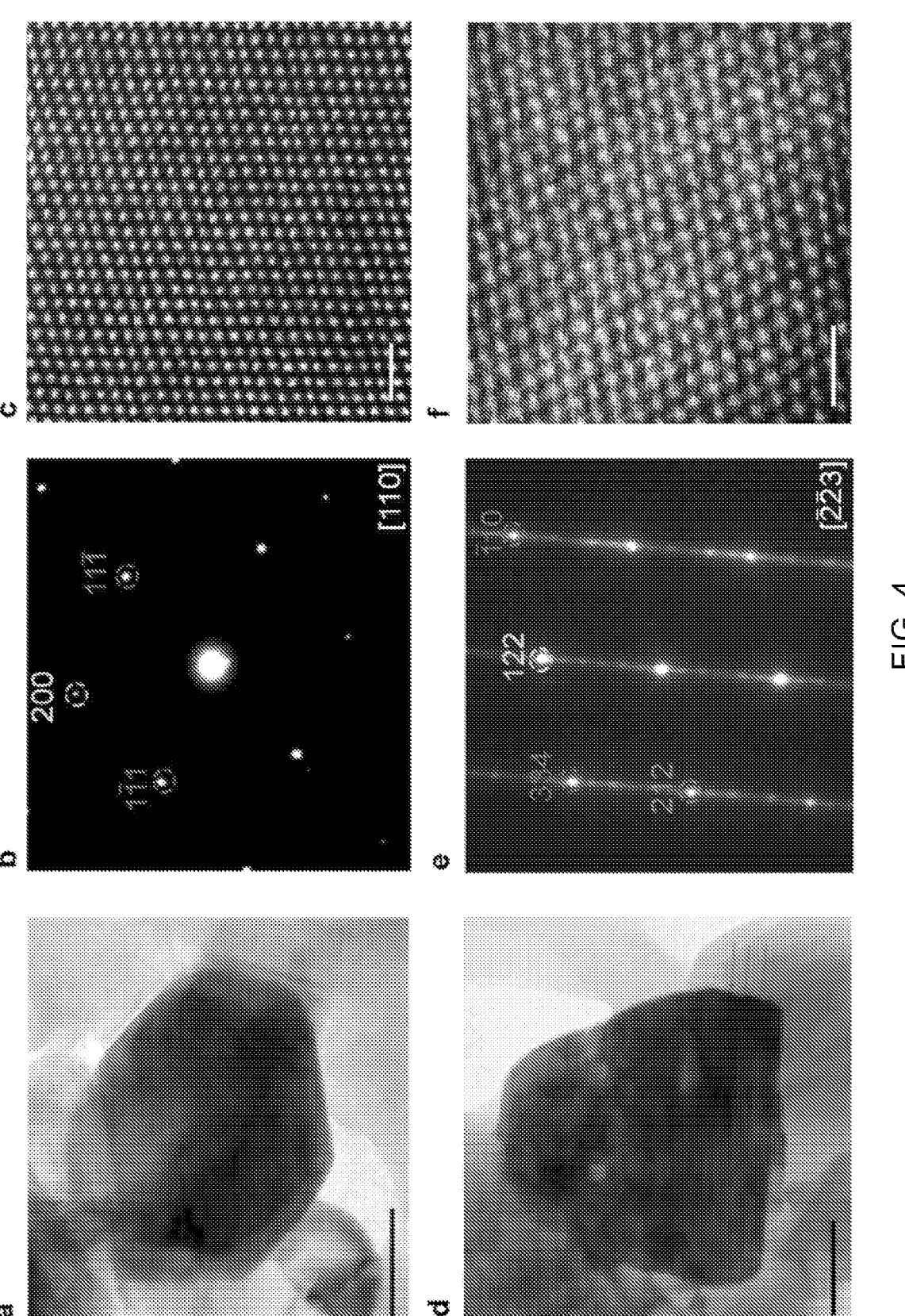
Figure 4:
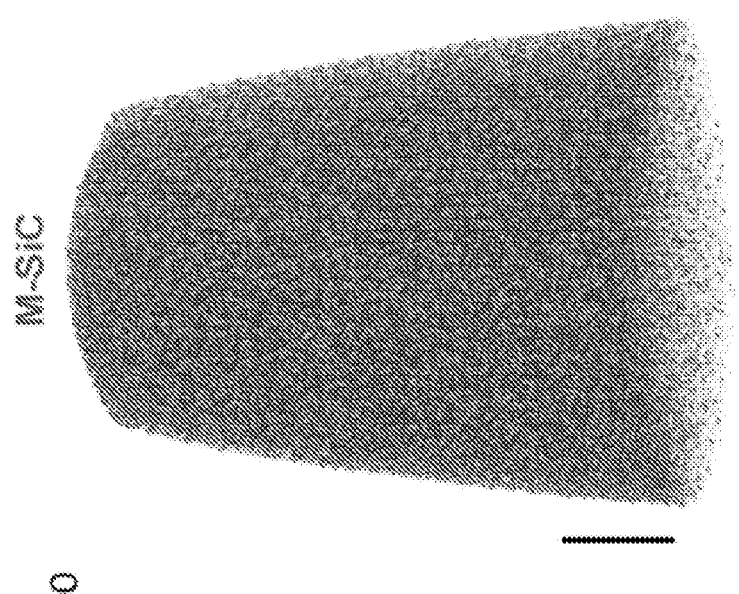
Figure 4:
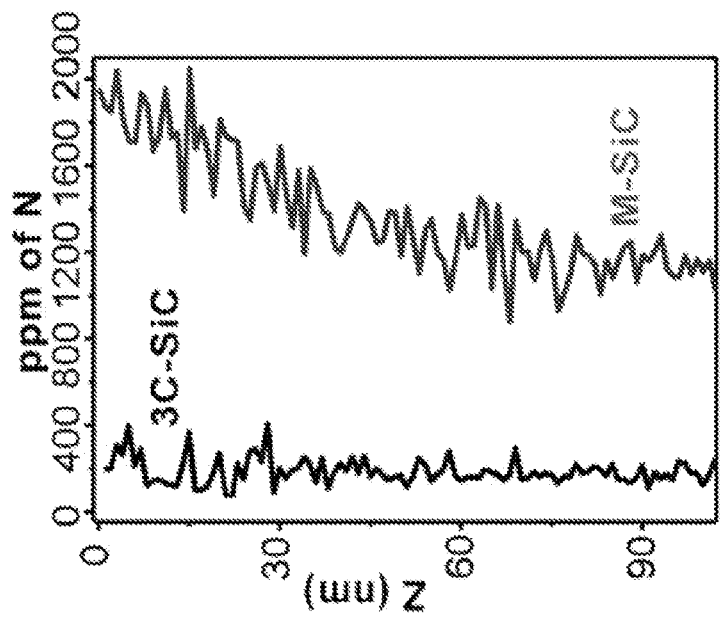
Figure 4:
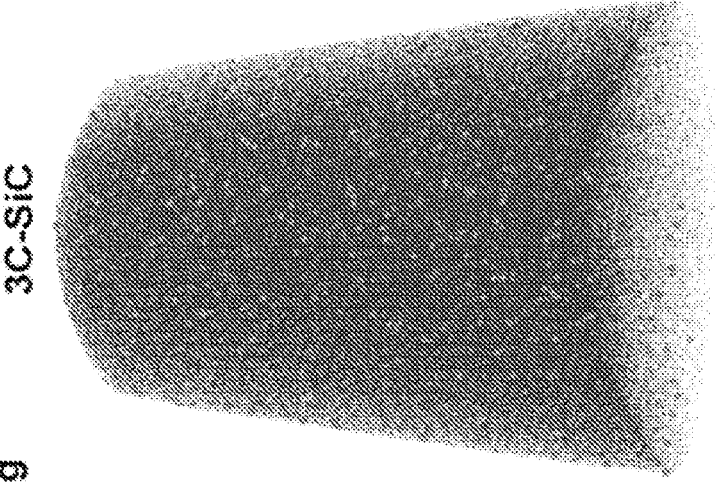

FIG. 4 (a)-(g) illustrate electron diffraction and STEM data revealing the composition of samples according to example embodiments. The crystal structure of the SiC were analyzed using microtomed sections of crystals and by performing electron diffraction and STEM on the samples. For the direct synthesis where 3C—SiC was purely formed, is verified by performing electron diffraction on a section (a) to obtain a pattern (b) and STEM lattice image (c) which indexes to the 110 zone. Similar analysis on M-SiC revealed primarily 3C phase, however, the existence of 15R as a separate secondary phase was observed similarly in an analysis from (d) to (f) revealing a [−2-23] zone with twinning (Selected twin planes marked by red arrows in d). Atom probe tomography reconstruction (g) of 3C—SiC and M—SiC (Red-Si, Blue-C, Green-N) were performed to discover the presence of nitrogen doping. The dopant nitrogen was profiled along the z direction of atom probe needles for either species revealing a 10-fold increase in doping along with a decreasing gradation in M-SiC. This decreasing gradation overlaps with the temperature gradient created by the ablation laser and grades away from the laser ablation spot into the PDMS bulk (Scale bars: a—100 nm, c—1 nm, d—50 nm, f—1 nm, g—20 nm).

Figure 5:
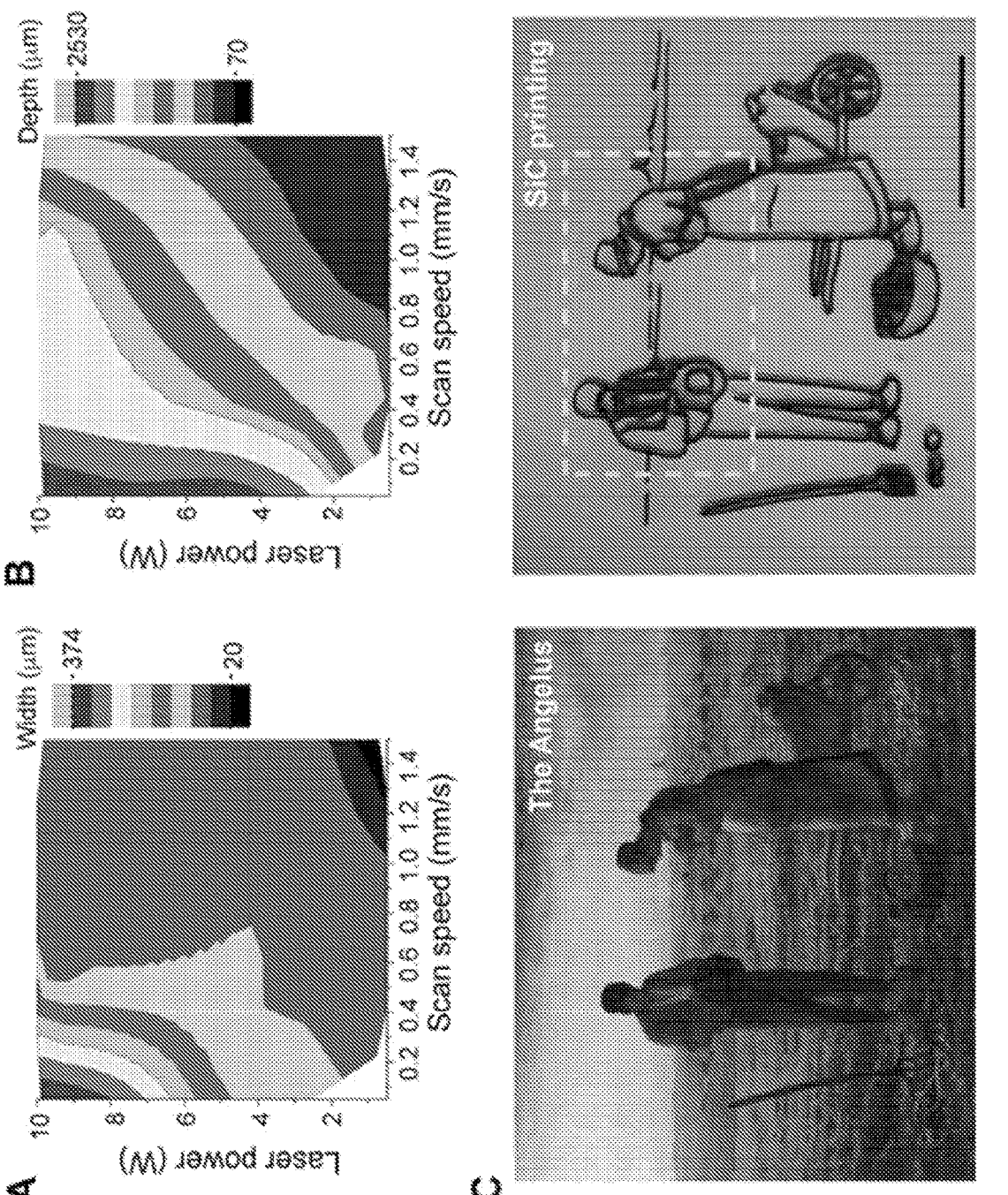
Figure 5:
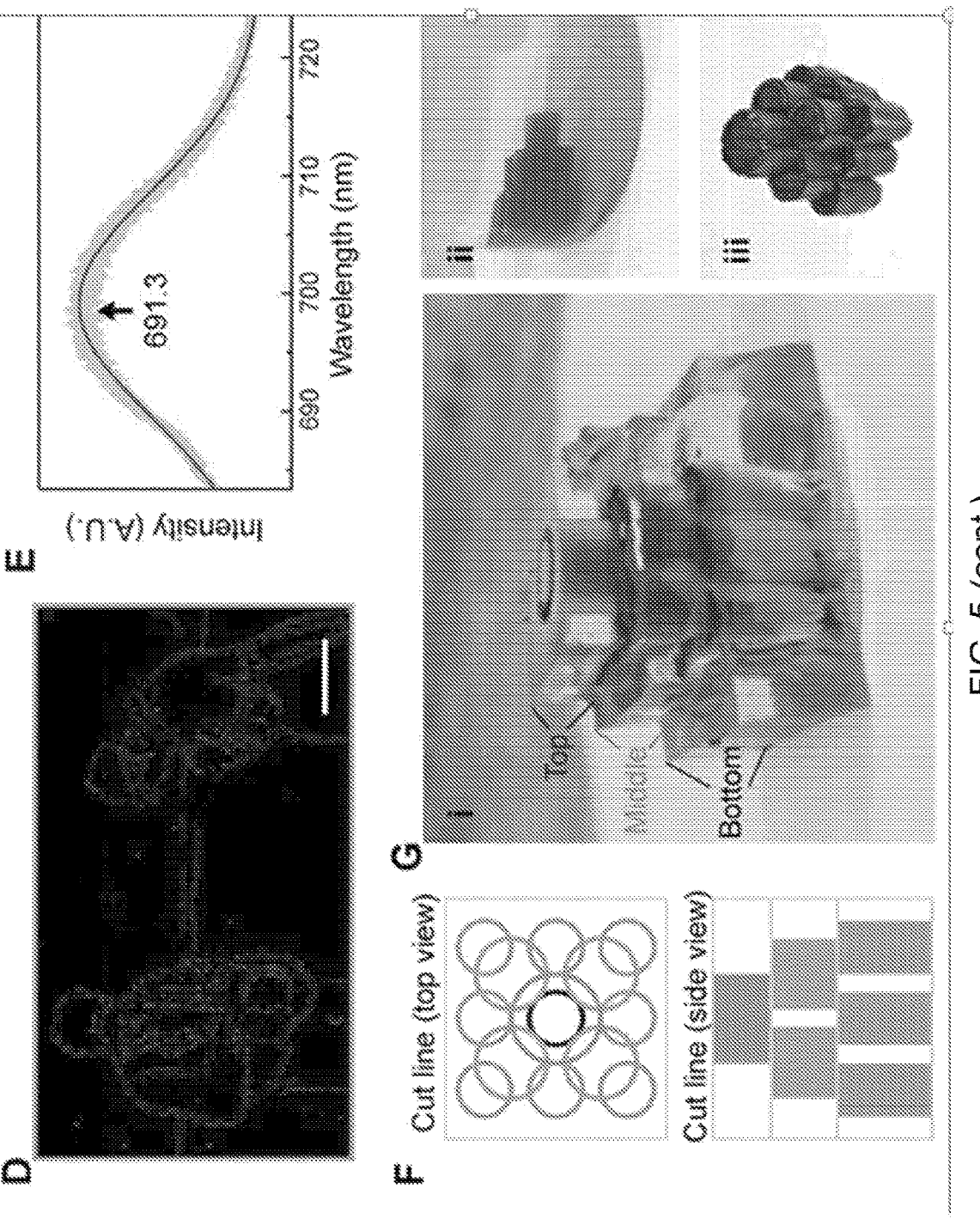

FIG. 5 (a)-(g) illustrate a laser printing technique according to example embodiments. In (a), laser printing resolution is determined by 3D confocal laser microscopy as a function of laser power and scan speed-represented as contour plot. In (b), laser printing depth is determined by 3D confocal laser microscopy as a function of laser power and scan speed-represented as contour plot. In (c), a representative painting is vectorized and printed on PDMS. In (d), Raman mapping of nitrogen defect luminescence on a printed pattern reveals silicon carbide. Panel (e) displays nitrogen defect luminescence Raman spectrum of 3C—SiC. Panel (f) displays multilayer vector design for three-dimensional printing. Panel (g) displays the layer by layer printing method which may be used to obtain a stable three-dimensional integrated structure.

Figure 6:
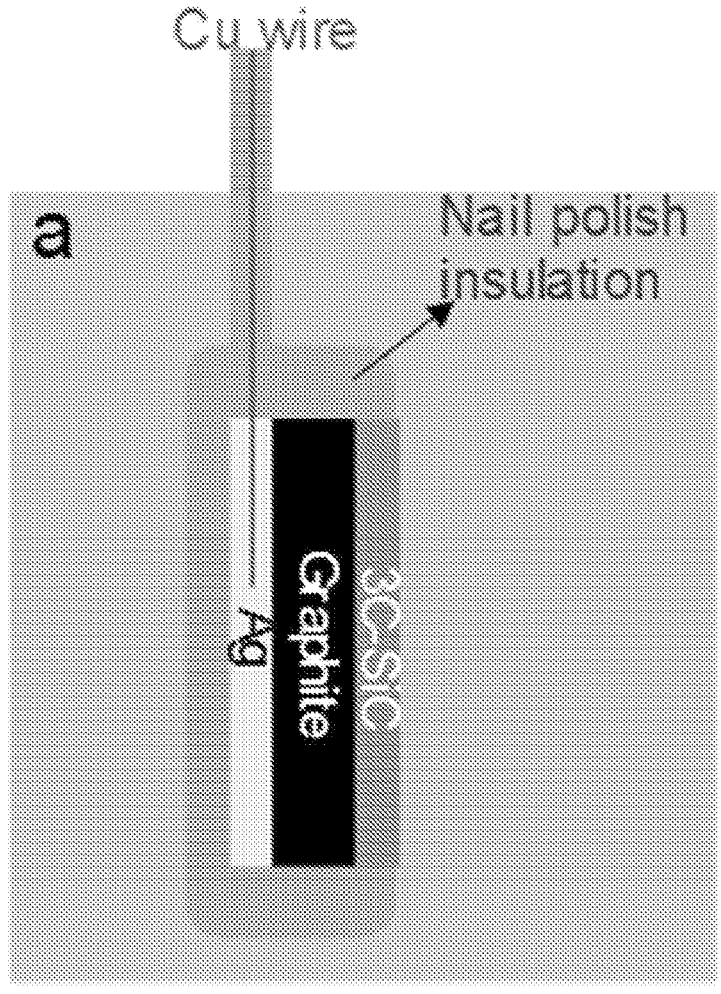
Figure 6:
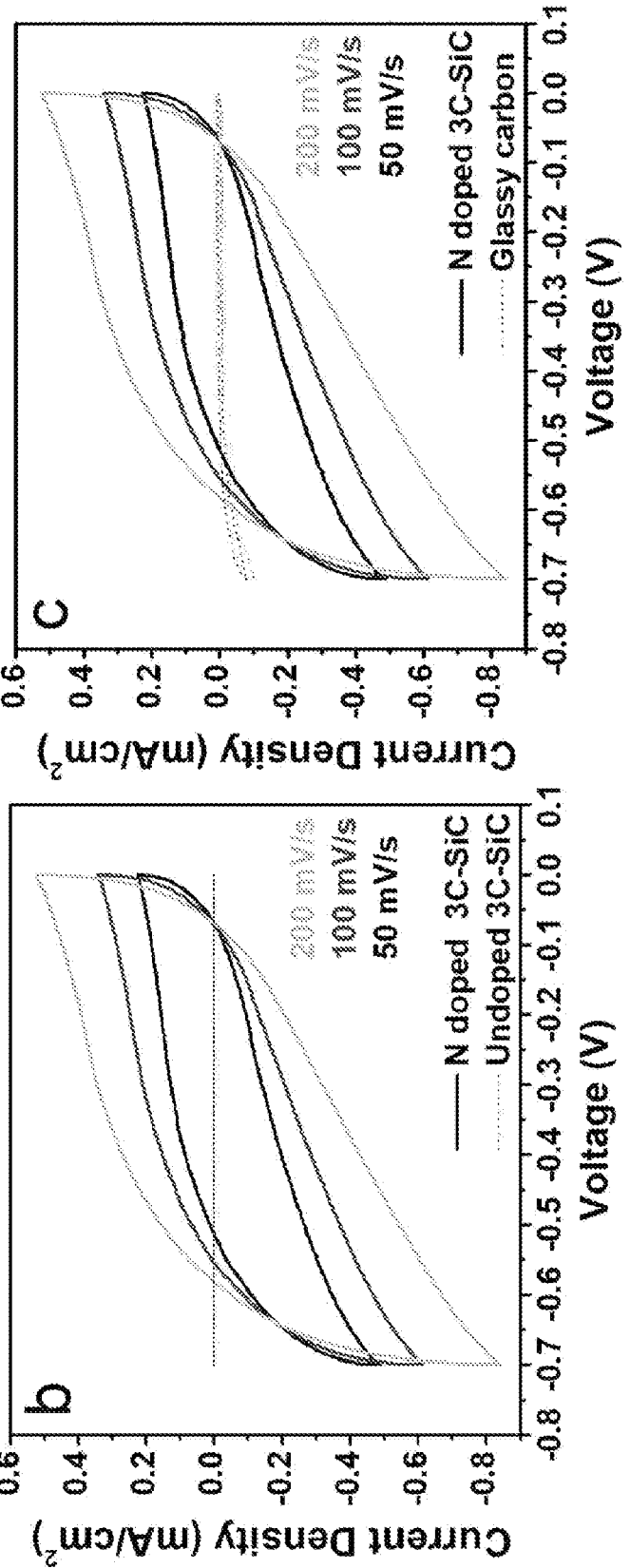
Figure 6:
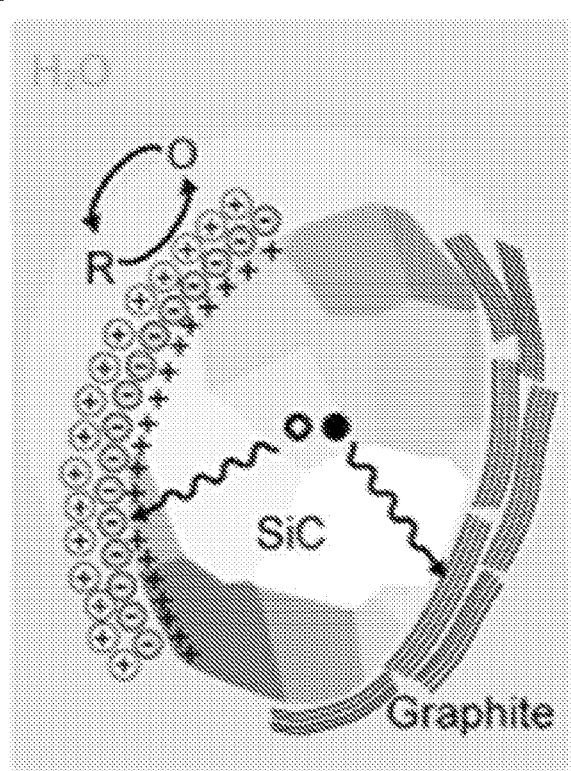
Figure 6:
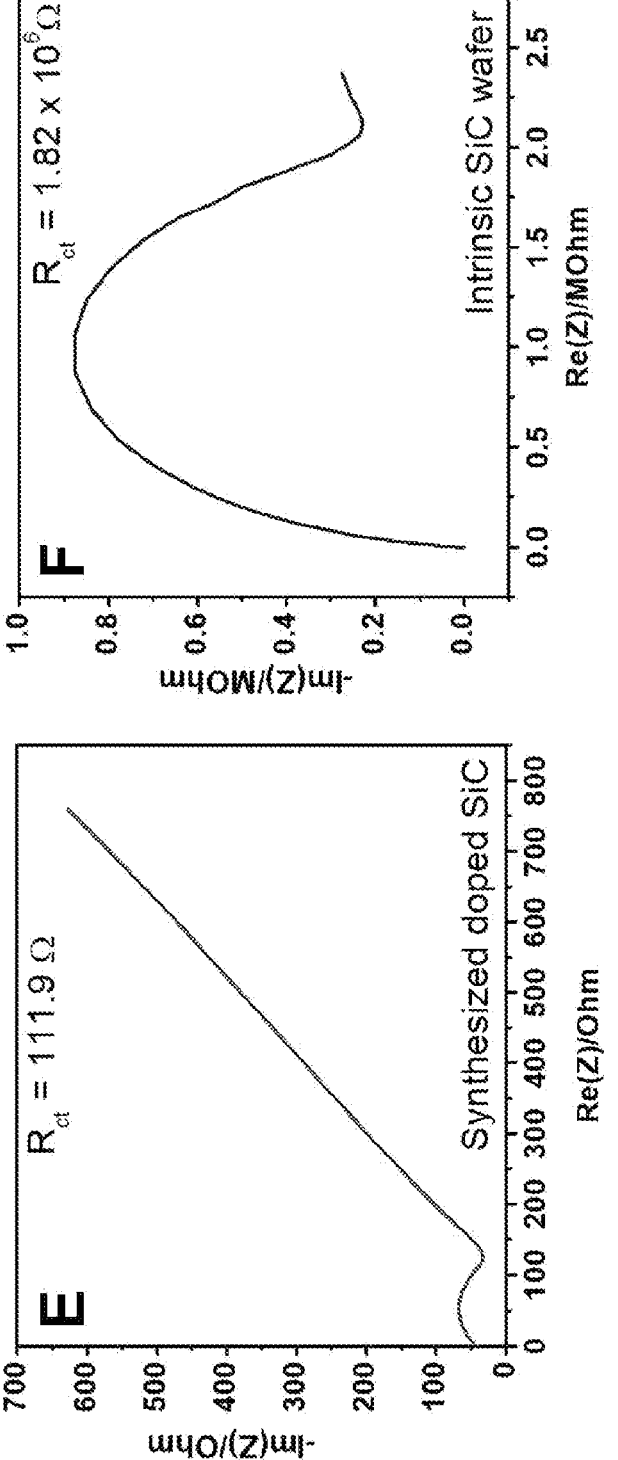
Figure 6:
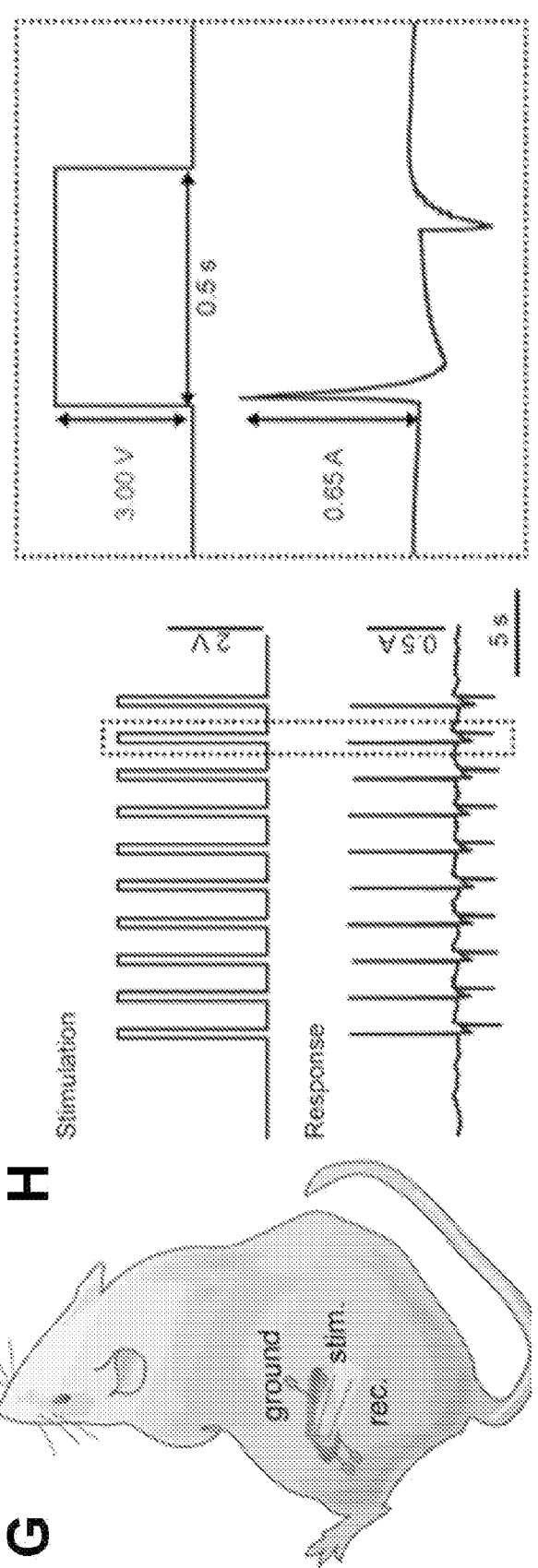

FIG. 6 (a)-(h) illustrate an electrode design and certain electronic properties according to example embodiments. (a) displays a schematic illustration of the electrode prepared for characterization of its electrochemical properties. Schematic illustration of SiC-graphite interfaces where SiC crystals have ribbon like graphite emerging from them on a nanoscale as observed from STEM imaging (d), and their capability in exhibiting pseudocapacitance. The utility of 3C—SiC as a pseudocapacitively coupled biointerface is demonstrated by the cyclic voltammograms (b, c). A comparison of cyclic voltammograms with undoped 3C—SiC and standard glassy carbon suggest that the faradaic component giving rise to pseudo capacitance arises purely from nitrogen doping and in SiC. Furthermore, electrochemical impedance studies suggest that the doped structure (e, f) enables a very low resistance of charge transfer at the electrode-electrolyte interface. Such a small resistance enables a very low resistance of charge transfer enables pseudocapacitive coupling of electrodes with the electrolyte. Further the capability of such printed pseudocapacitive electrodes in direct wired stimulation is illustrated by passing a stimulation current pulse to elicit in-phase action potentials in rat skeletal muscle (g, h).

Figure 7:
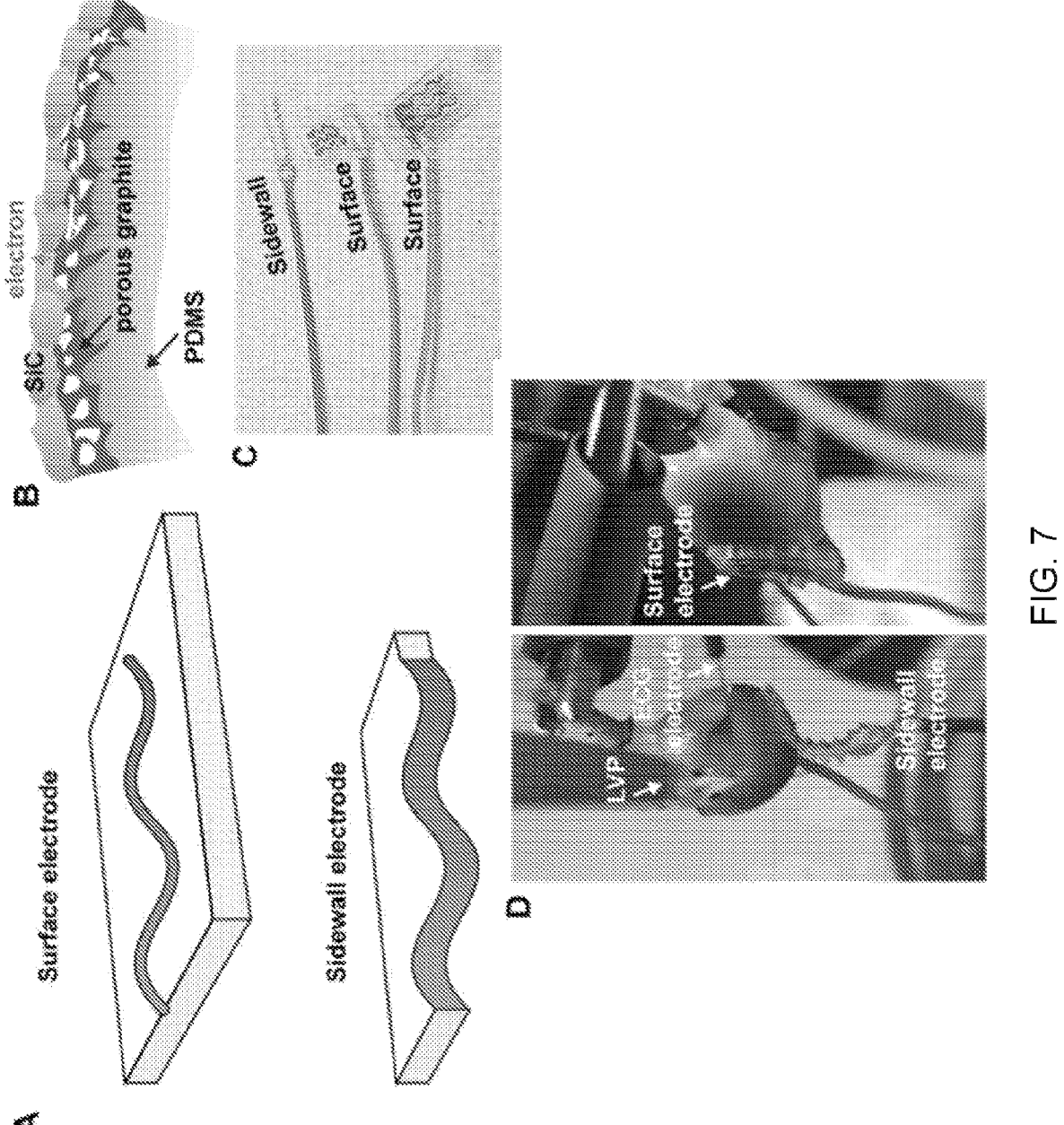
Figure 7:
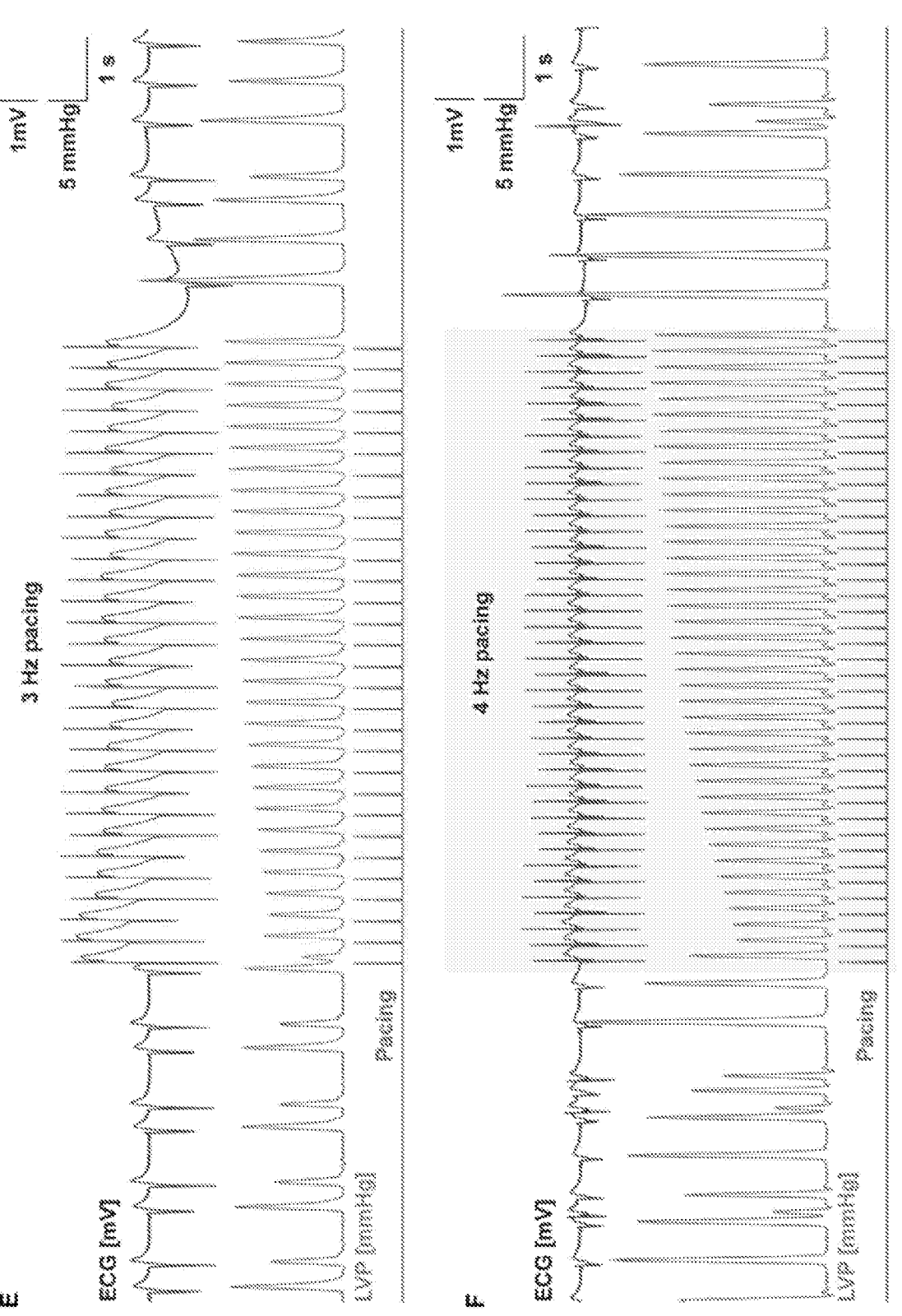

FIG. 7 (a)-(f) depicts the cardiac pacing experiment according to example embodiments. Panel (a) is a schematic depiction of surface interfacing and side interfacing electrodes which could be printed by varying the power and scan speed. Higher powers at a constant scan or lower scan speeds at higher power enable side electrodes against surface electrodes. Panel (b) is a schematic illustration showing porous graphite structure underlying SiC, serving as a contact for electrical interfacing. The porous structure of the graphite layer is realized from the STEM imaging. Panel (c) displays photographs illustrating sidewall and surface printed electrodes printed on PDMS for interfacing with isolated heart for cardiac pacing experiment. Panel (d) displays photographs illustrating a side-wall and surface electrode flexibly interfacing with an isolated heart in a Langendorff set-up. Cardiac pacing of an isolated heart with an electrical stimulus supplied through two silicon carbide electrodes (Each of side and surface printed electrode) at a frequency of: (e) 3 Hz and (f) 4 Hz. Both electrical stimulations are successful with in-phase electrocardiography (ECG) signals and ventricular contraction measured as left ventricular pressure (LVP).

Figure 8:
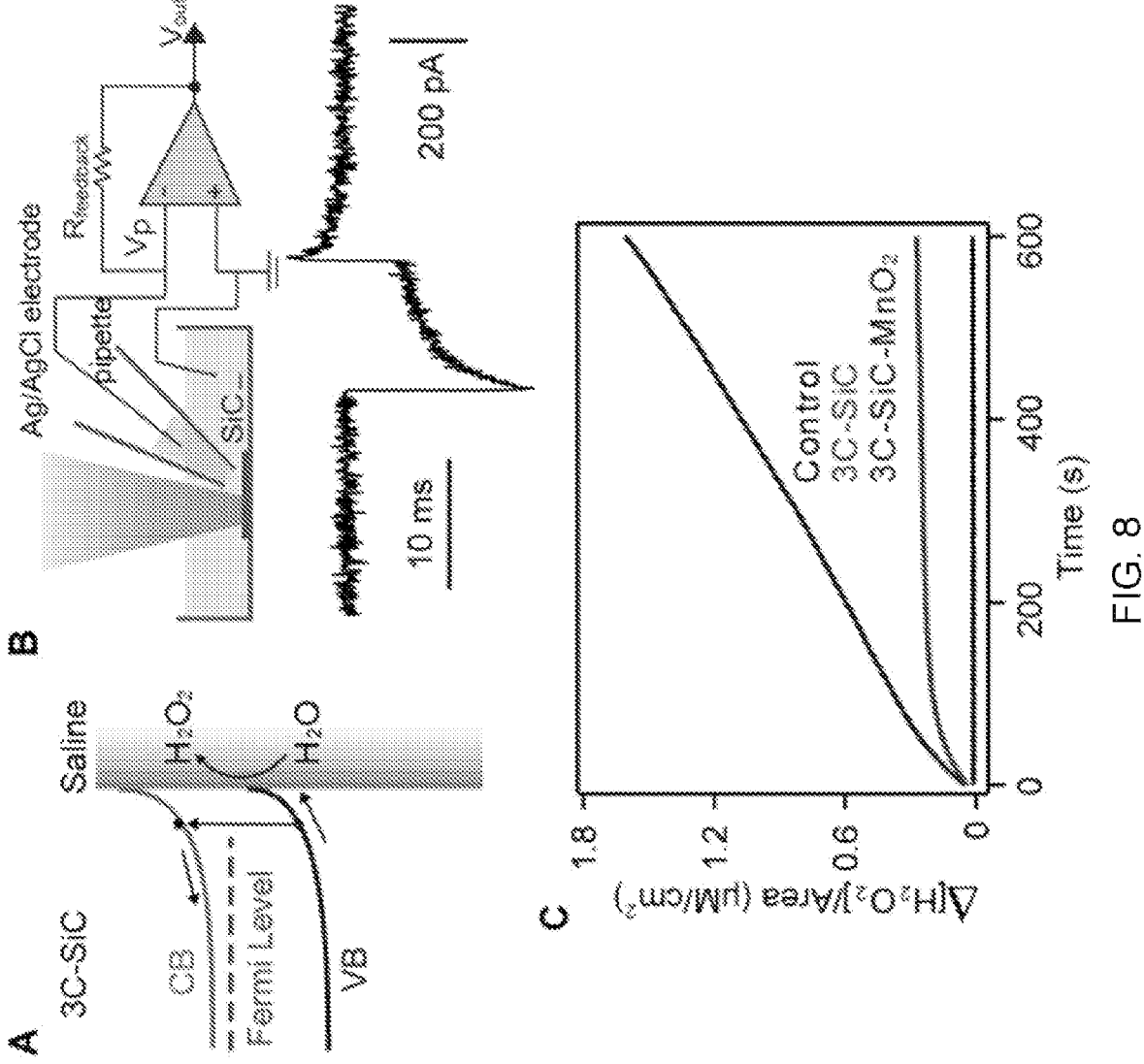
Figure 8:
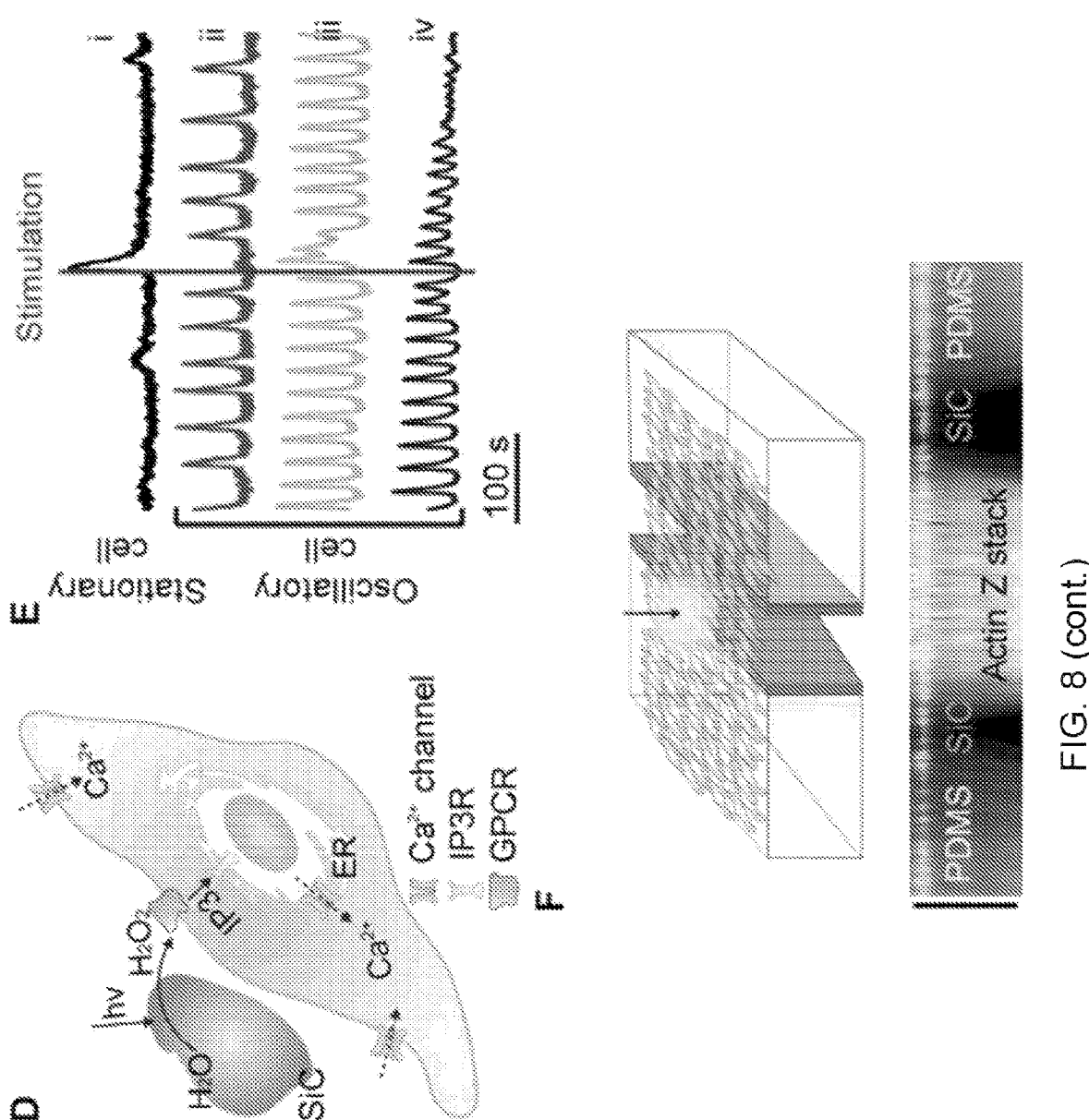
Figure 8:
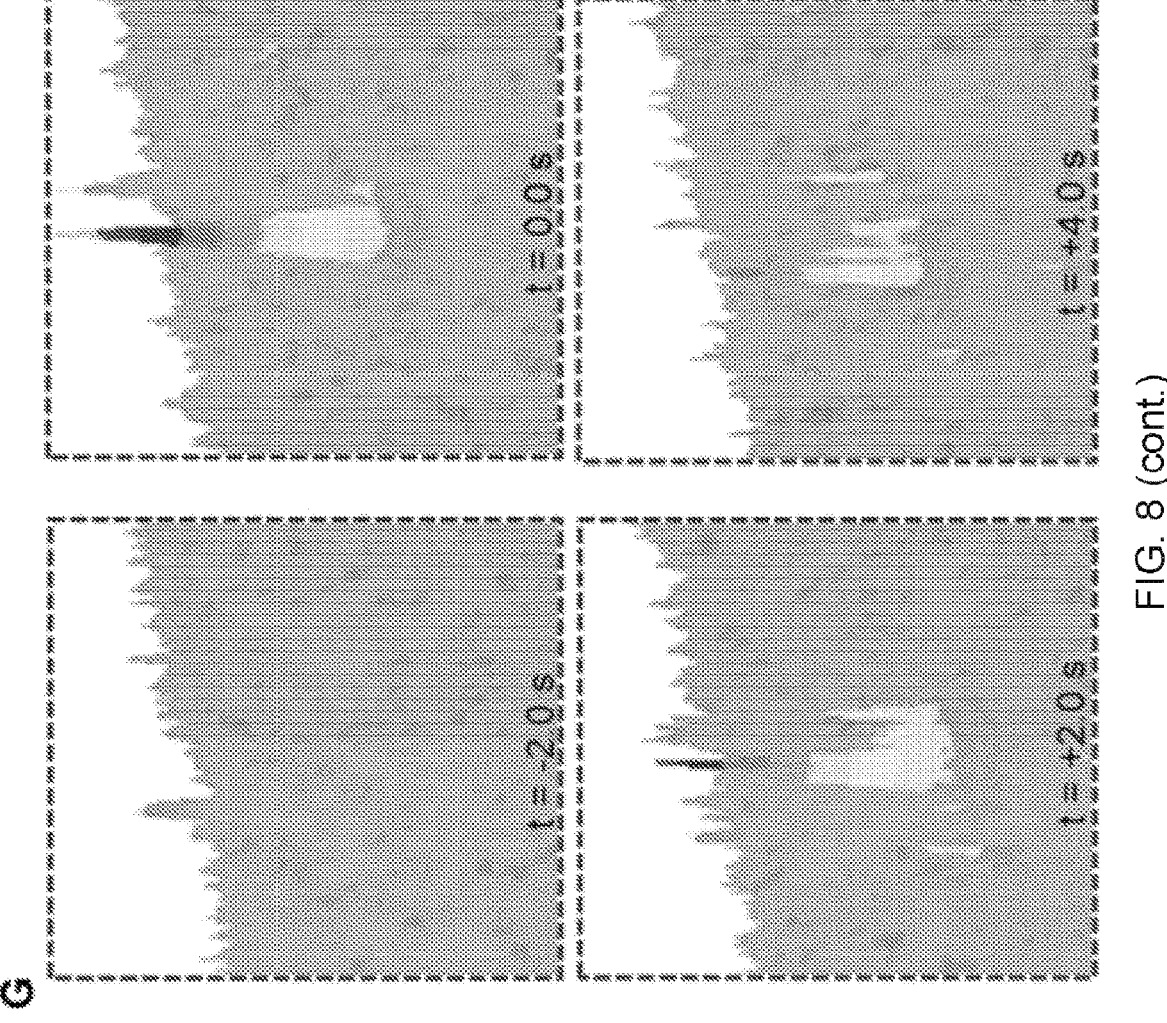

FIG. 8 (a)-(g) reveal the photoelectrochemical effect of the 3C—SiC according to example embodiments. Panel (a) displays the n-doping in 3C— SiC and subsequent band-bending suggests the possibility of pure oxidation reactions because of photostimulation. Panel C shows the results of photocurrent measurements on 3C—SiC for a 10 ms pulse revealing a photoanodic oxidation reaction. Panel (c) shows the results of fluorescence kinetics measurements done on 3C—SiC and 3C—SiC—MnOz which confirm the water oxidation to hydrogen peroxide and show the relative concentration of hydrogen peroxide produced by oxidation of water per $cm^2$ of the material irradiated with light. Panel (d) is a schematic illustration of the consequence of exogenous hydrogen peroxide on smooth muscle cells. Exogenous peroxides cause increased activation of IP3R causing release of calcium from internal stores like ER/SR and uptake of exogenous calcium. The difference in calcium signaling on a cellular level, because of peroxide release on a sheet of cells depend on the stimulation timing with respect to a contraction cycle confirms the role of peroxide and IP3R activation in individual cells (e). The ensemble measurements were carried out on a sheet of smooth muscles cells (f). The differential calcium ($\Delta$F/F) signals observed before and after stimulation reveals an overall increase in calcium levels (Represented as heat maps) along with an increased synchronization in contraction of a sheet of smooth muscles. Panel (g) displays a device level implementation of the some (g) and a point stimulation on the device reveals a calcium wave propagating (Represented as heat maps) from the stimulation point (g). (Scale bars: g—100 μm, h—100 μm, i—100 μm).

Figure 9:
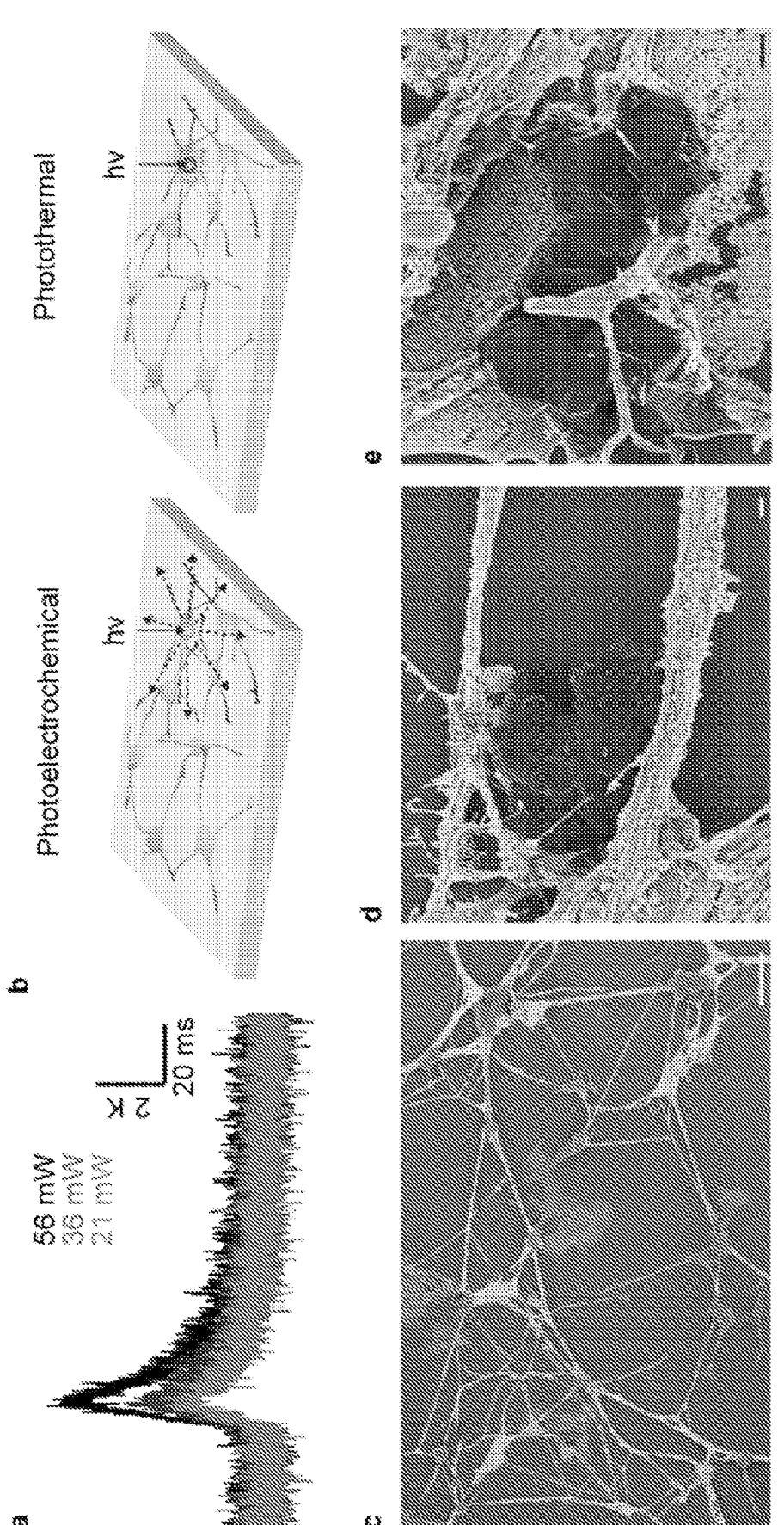
Figure 9:
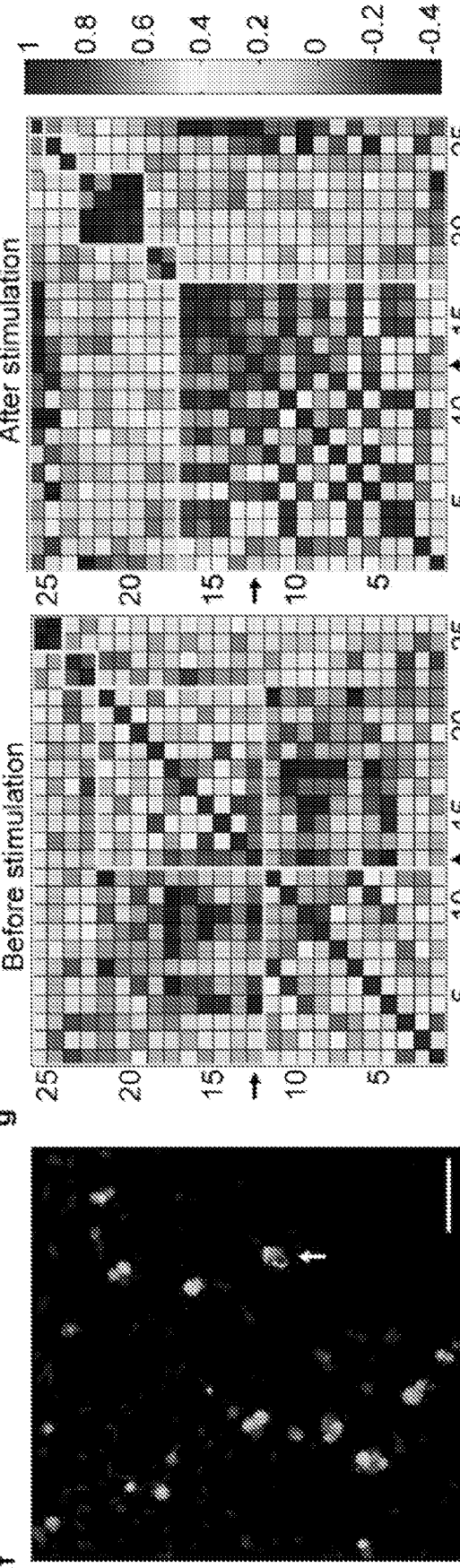

FIG. 9 (a)-(g) illustrate a neural network experiment, and the spatiotemporal control thereof according to example embodiments. For example, the photothermal capability of a mixed phase and excessively doped M-SiC is observed through single channel recordings (a) for a stimulation pulse of 1 ms and various powers of a 532 nm stimulation laser. The advantage of such a photothermal measurement over photoelectrochemical (b) is that electrochemically generated species can eventually diffuse across and stimulate other neurons in a network resulting in poor spatial temporal control whereas thermal gradients decay really fast. Interfaces formed by an artificial cultured dorsal root ganglial network was explored using SEM imaging and false coloring. A typical neuronal network (c) has neurons (blue) interlinked by axons and dendrites (yellow) with few glial cells (green). M-SiC particles interspersed with the growth medium have been observed to be entangled with axons (d)

and dendrites (e) as observed in SEM imaging. Calcium imaging was performed on a conventional neuronal network (f) with a single node stimulation (5.3 mW, 1 ms) to see how localized synchronization surrounding the stimulated node rises (g) with respect to unstimulated case. Such spatially controlled increases in local synchronization results in an increase in the mean synchronization of the entire neural network from 0.197 to 0.338. This illustrates the capability of M-SiC to form interfaces with neural networks and to modulate synchronizations locally compared to drugs which modify neural networks globally. X-axis and Y-axis in (g) are neuron indices along with the heat map for synchronization values.

Figure 10:
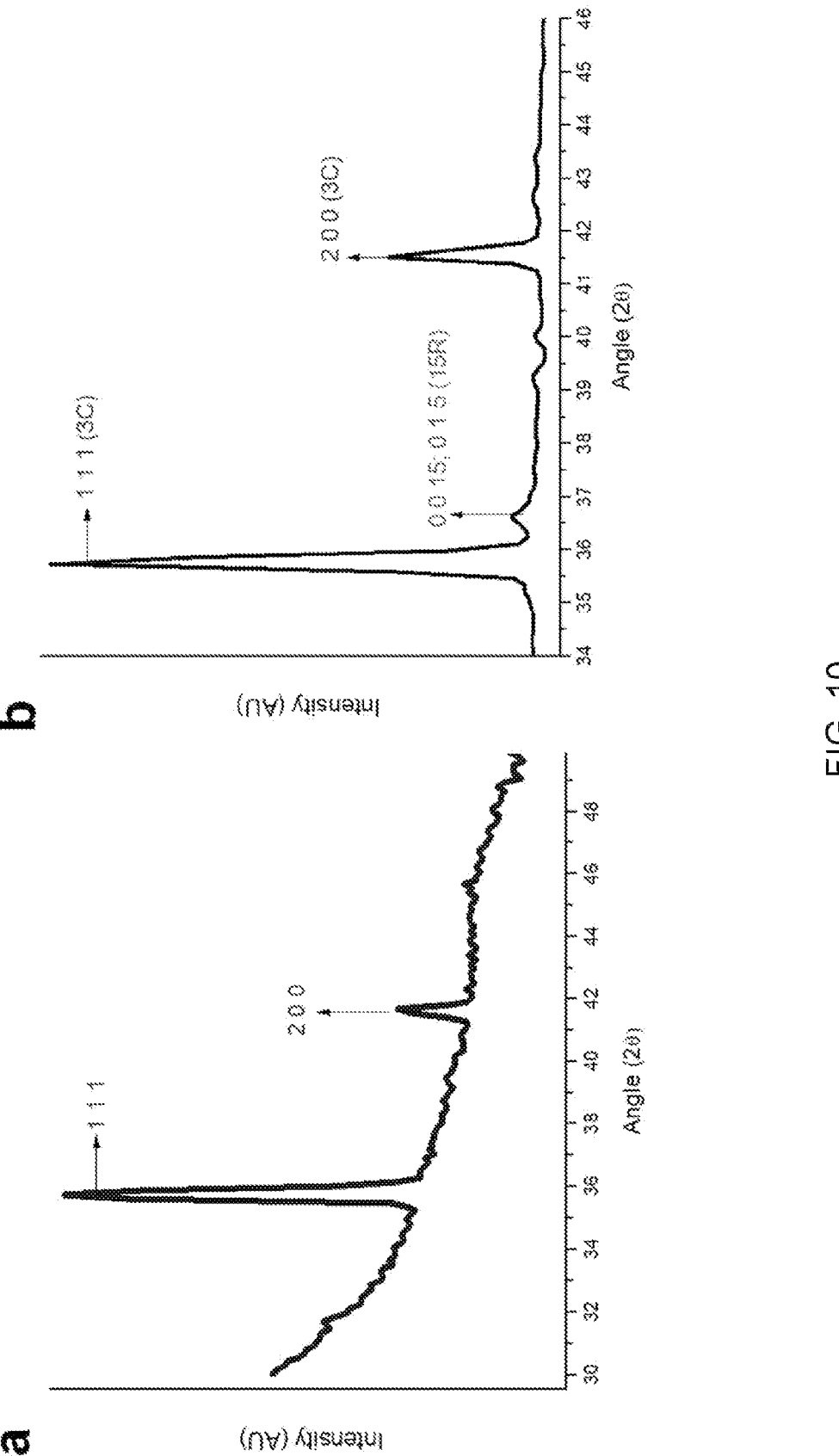
Figure 10:
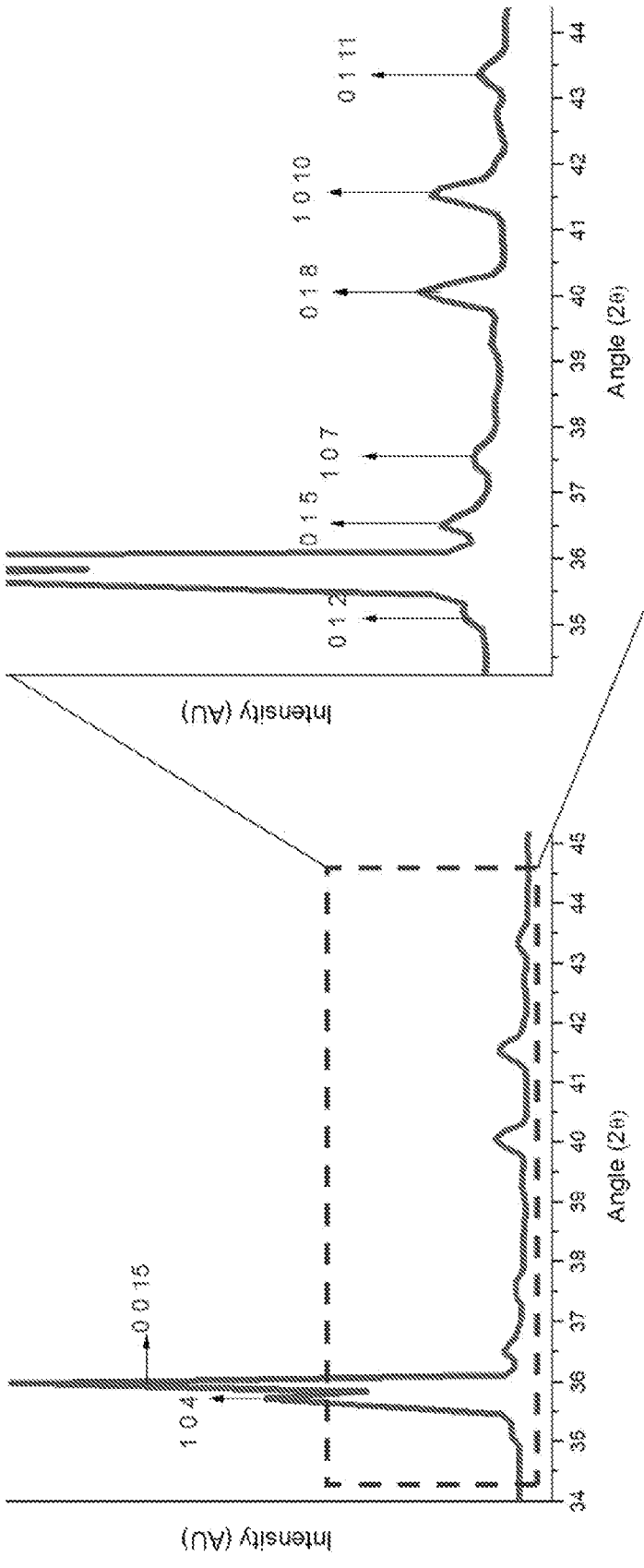

FIG. 10 displays wide angle x-ray scattering data according to example embodiments. In (a), wide angle X-ray scattering (WAXS) was collected for pure 3C—SiC sample. In (b), WAXS collected on a M-SiC sample showing mixed 3C and 15R polytypes existing on that sample. In (c), WAXS collected for M-SiC sample at a specific spot showing a 15R polytypic phase of SiC, revealing phase separation during synthesis.

Figure 11:
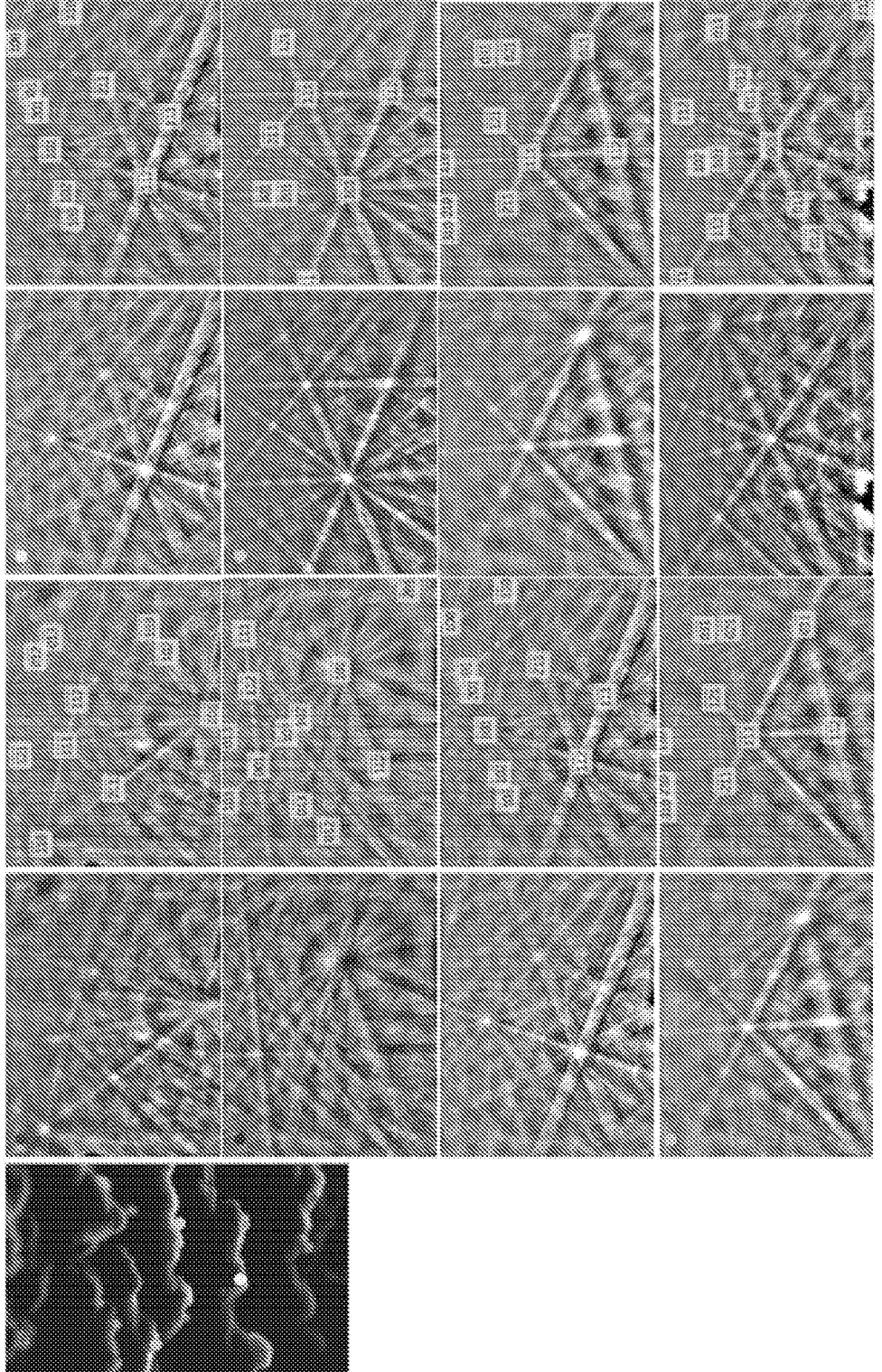
Figure 11:
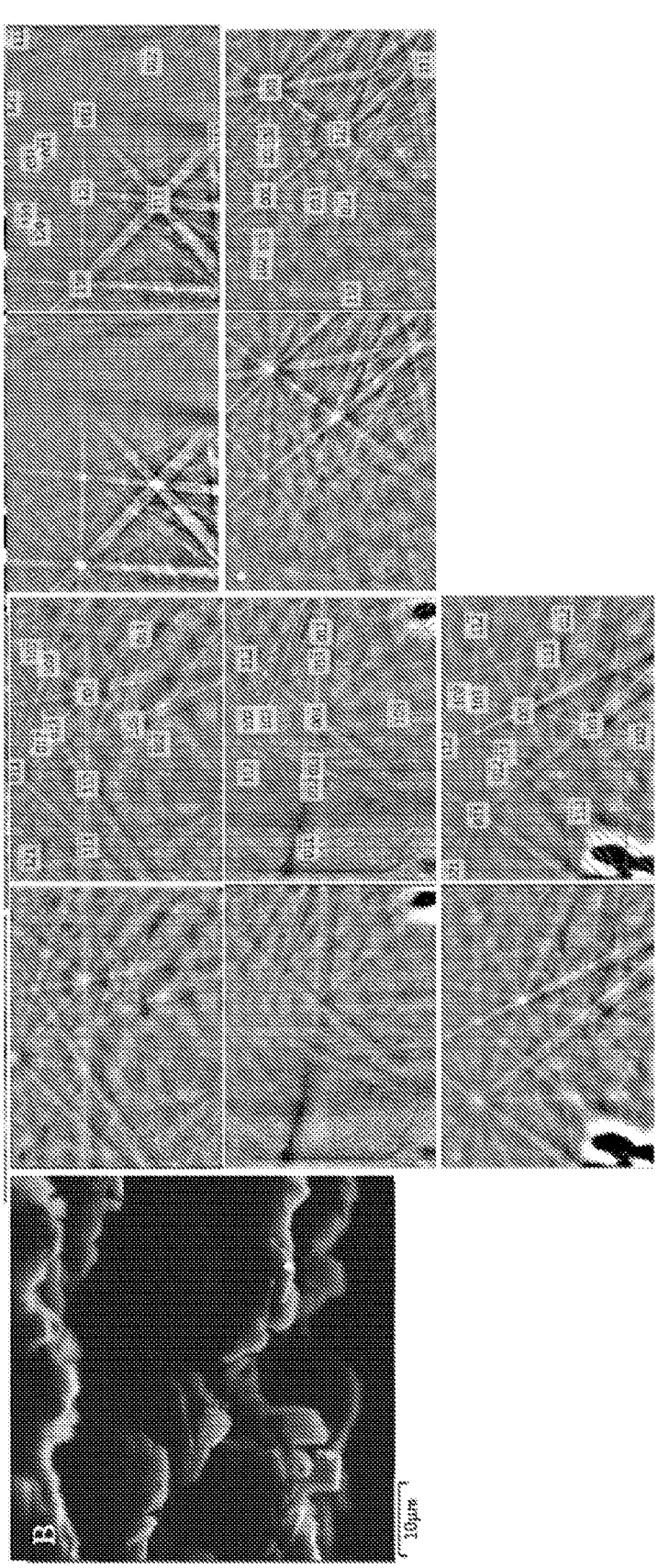
Figure 11:
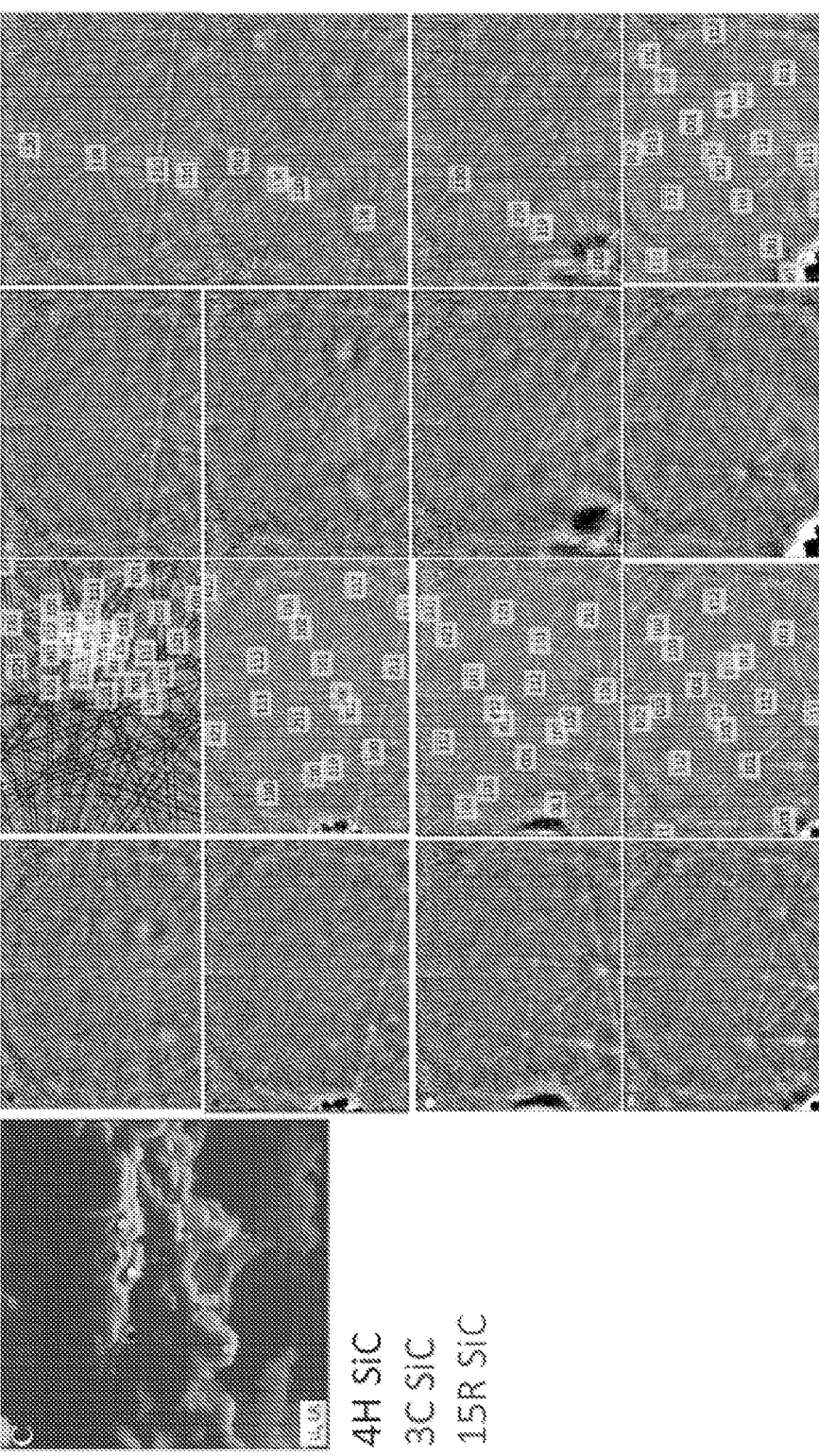
Figure 11:
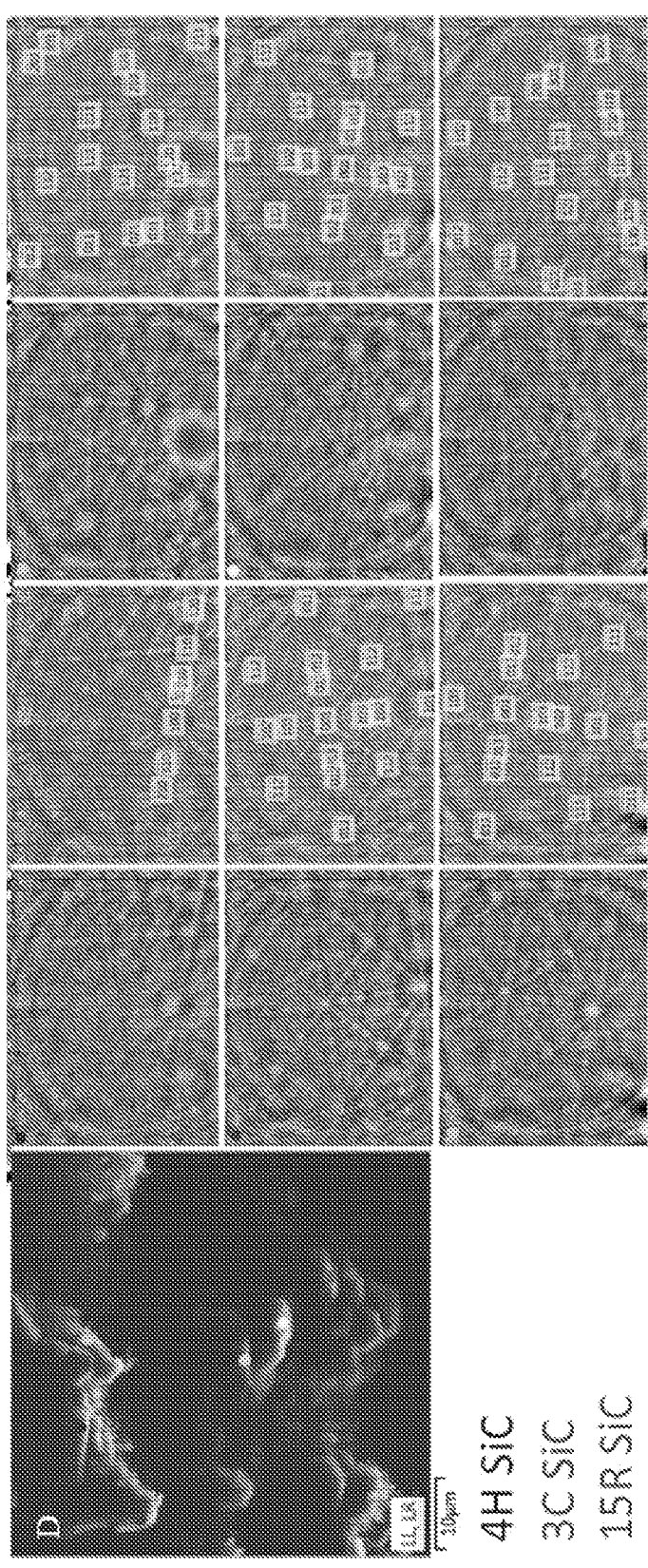
Figure 11:
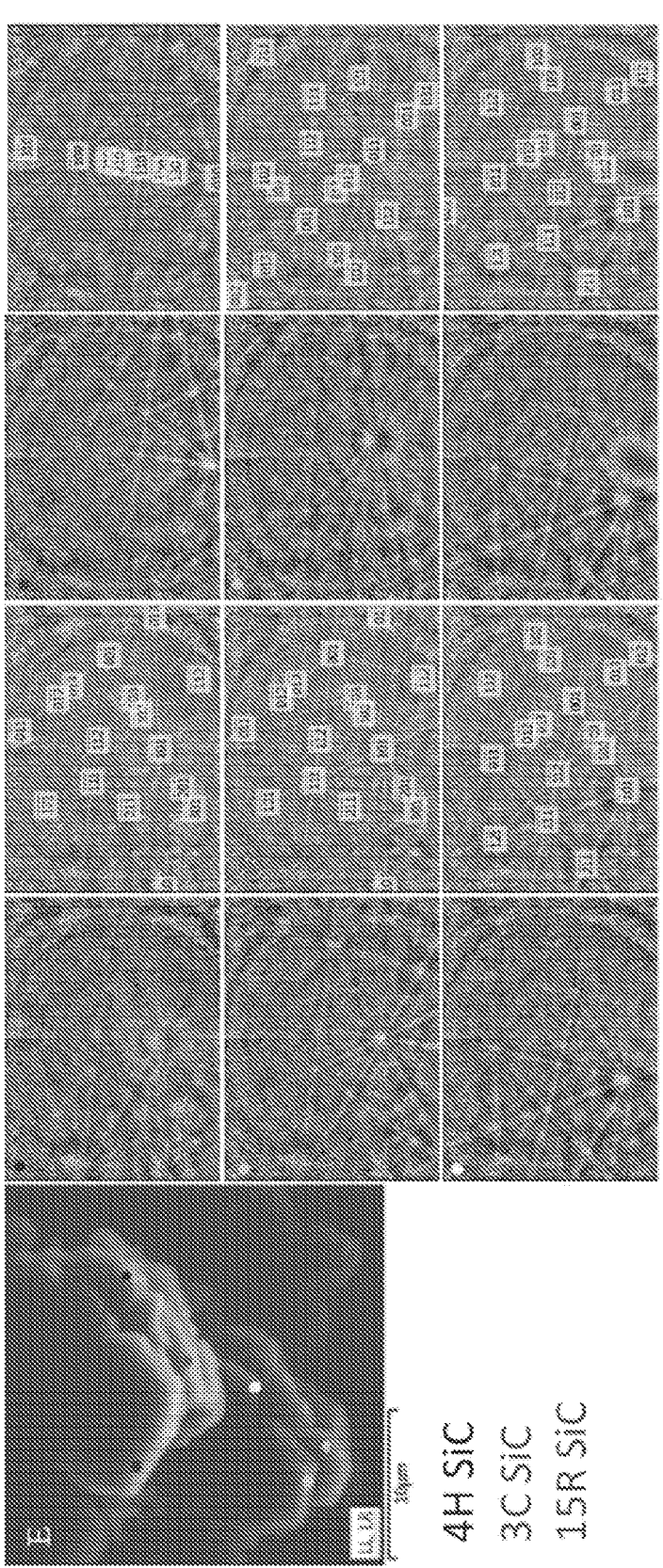
Figure 11:
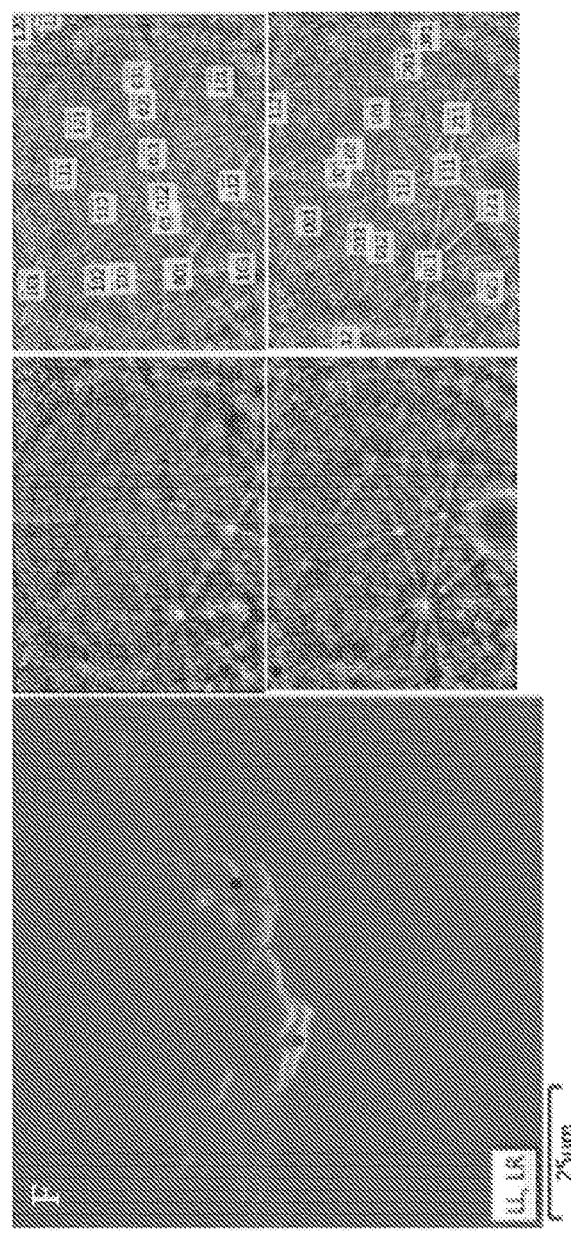
Figure 11:
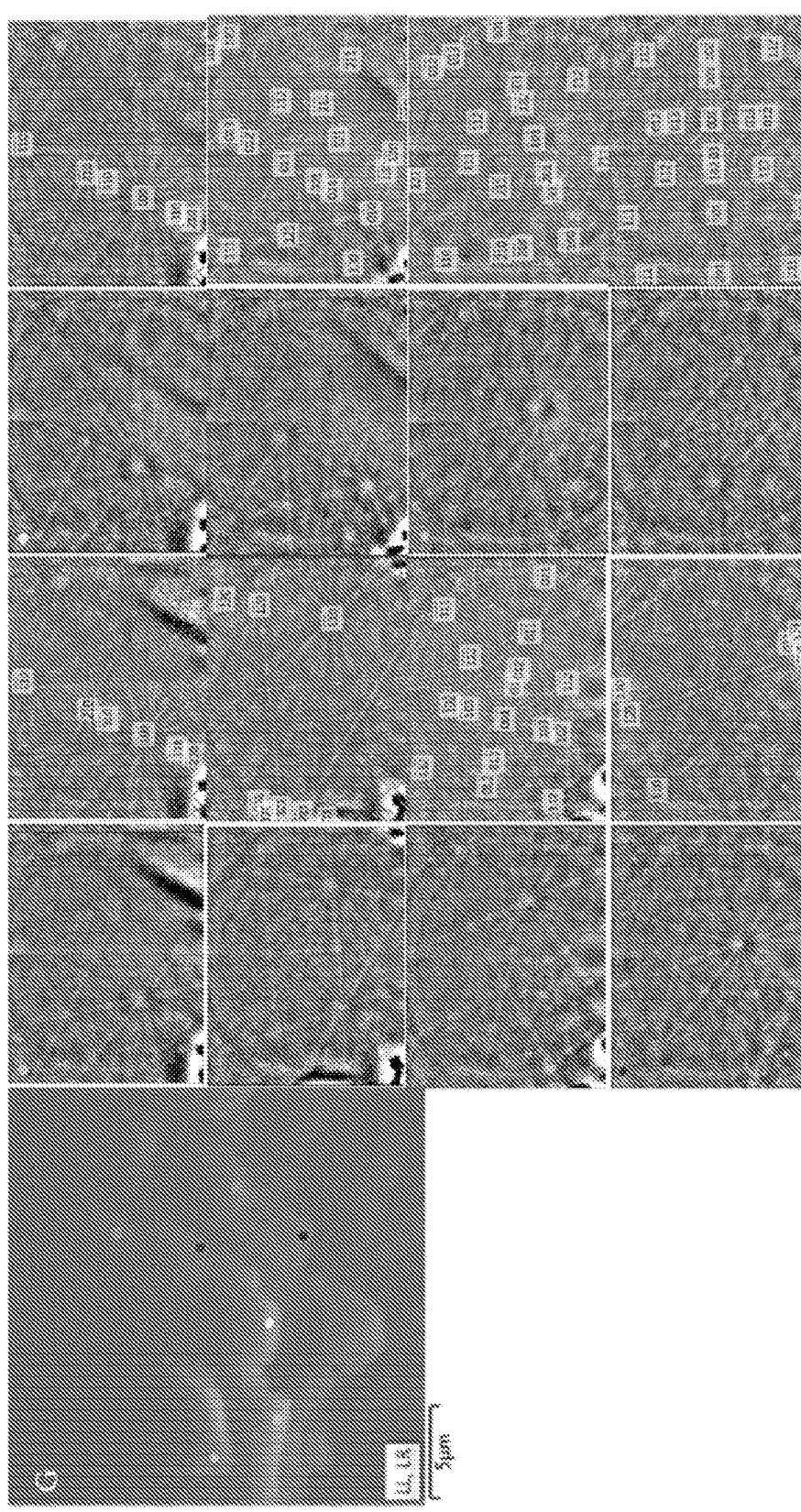

FIG. 11 (a)-(g) display results of multi-point electron back scattered diffraction characterization experiments according to example embodiments. Multipoint EBSD analysis carried out on a batch of 3C—SiC ((a) and (b)) and M—SiC ((c)-(g)) samples. The EBSD was done on different crystals which actively diffract on the detector as observed in the forescatter diode (FSD) images. The FSD image has every point marked where EBSD was carried out. The Kikuchi diffraction pattern and indexing from each corresponding point were detected and indexed as 4H—, 3C—, or 15R—SiC.

Figure 12:
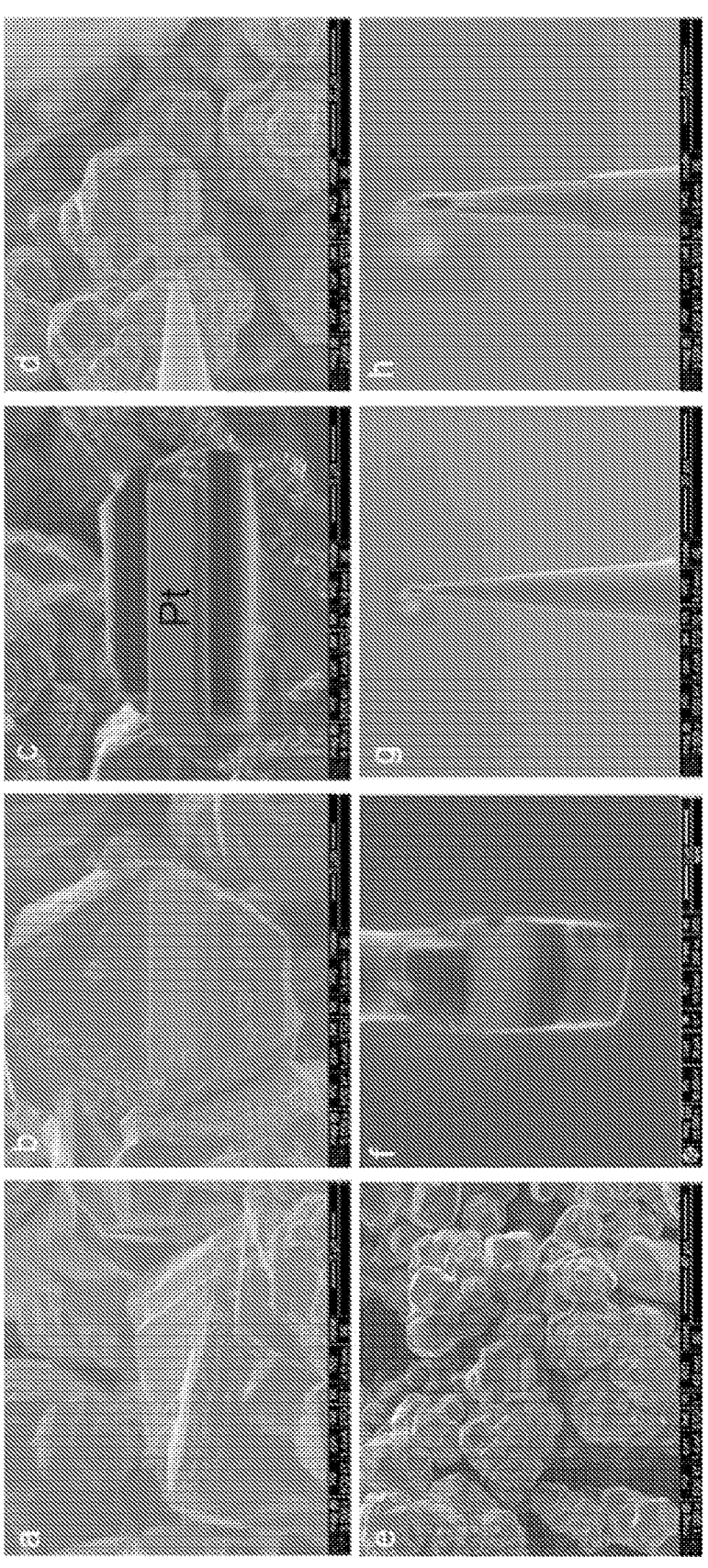

FIG. 12 (a)-(h) illustrates atom probe tomography sample preparation according to example embodiments. In (a), SEM image of a flat surface identified for FIB preparation of atom probe tomography tips; (b) Deposition of platinum to protect the sample of interest; (c) FIB milling of trenches on either side of the sample of interest protected by platinum coating; (d) Lift out of a lamella using micromanipulator, (e) Low magnification SEM image showing trench of the lifted-out lamella in material of interest; (f) FIB image showing a section of lamella, platinum welded on a silicon micropost; (g) Polished tip for atom probe tomography measurement on a silicon micropost; and (h) Higher magnification image of the atom probe tomography tip.

Figure 13:
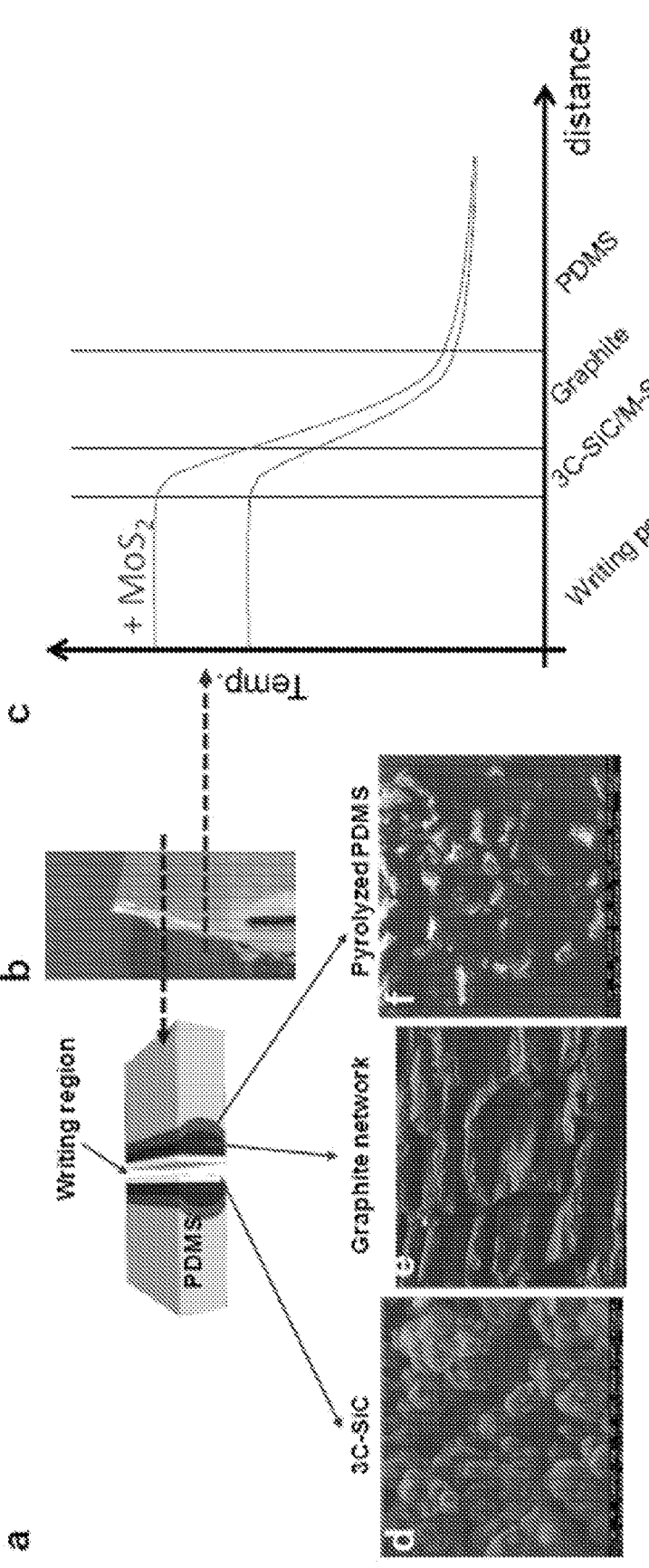
Figure 13:
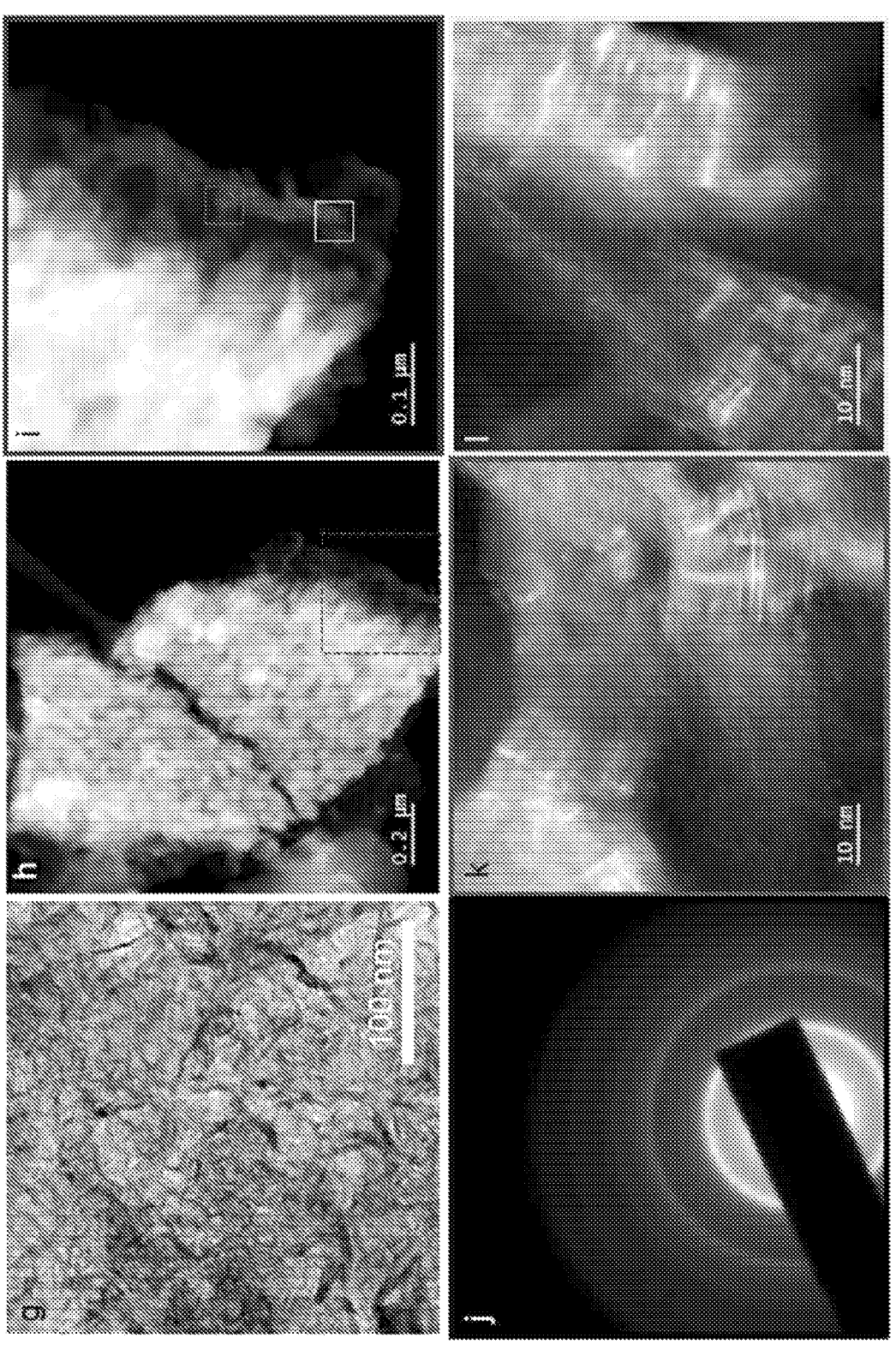

FIG. 13 (a)-(l) display electron microscopy characterization of SiC-graphite interfaces according to example embodiments. Schematic illustration of the different layers of materials formed (a) with respect to the laser writing point, embedded in a PDMS matrix; (b) The different layers formed are as a result of a temperature gradient that would exist from the laser writing point into the bulk which would control the thermodynamics of the reaction, leading to a layered structure; (c) Moreover, these layers can be observed by in SEM images (d)-(f). Further, addition of $MoS_2$ to PDMS leads to a higher temperature at the burning point (c). This is due to the fact that oxidation of $MoS_2$ is highly exothermic and the product formed ($MoO_3$) is extremely volatile at such high temperatures. The highly exothermic oxidation reaction leads to accelerated reaction kinetics. This effect, coupled with the known catalytic activity of molybdenum in fixing nitrogen, increases the nitrogen doping level by ten times and gives it a grading which following the temperature profile in (c). Graphitic layers as seen in a TEM (g) and its corresponding SAED pattern (j). HAADF STEM image of a microtomed section of the SiC-graphite (h) with magnified section (i) clearly showing the SiC-graphite interface where graphite is seen in ribbon like structures further confirmed at higher magnification images (k) and (l).

Figure 14:
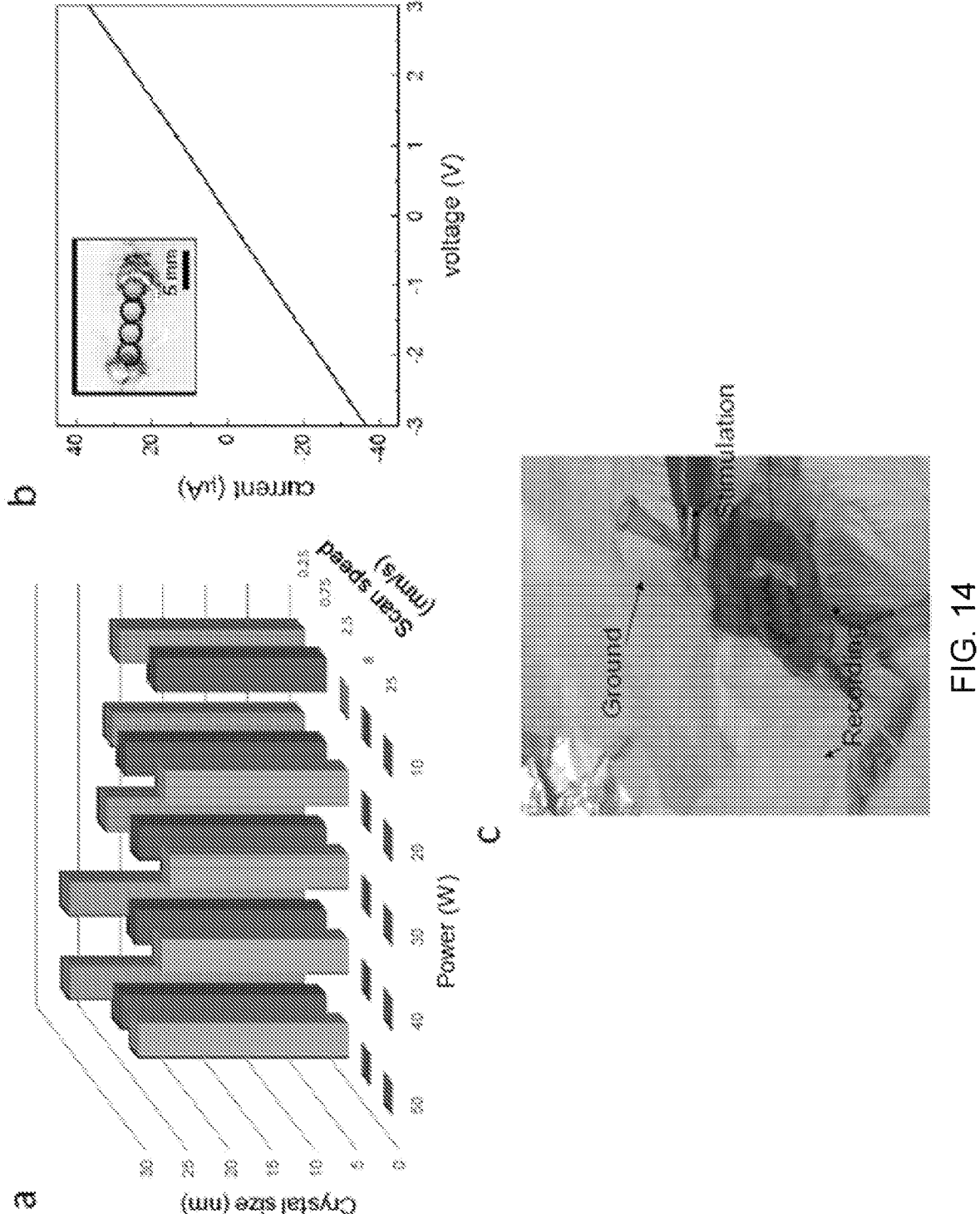

FIG. 14 (*a*)-(*c*) show 3C—SiC crystal size control studies, IV characteristics of 3C—SiC-graphite electrodes, and the muscle stimulation In vivo experiment set-up according to example embodiments. (a) Crystal size control factors in the laser ablation synthesis is demonstrated as a function of the laser power and scan speed. This illustrates that the synthesis has a cutoff power with respect to the synthesis parameters and control on crystal on size above the cutoff. The crystal sizes were estimated by using Debye-Scherrer equation on the (111) peak of x-ray diffraction/scattering. (b) I-V characteristic of a device made by SiC printing showing high conductance due to the supporting graphite layer below the SiC crystals. The high conductance is due to the graphitic layer and illustrates its utility in enabling integration of devices for future large-scale device fabrication. (c) Configuration for 3C—SiC muscle stimulation and recording electrodes on the skeletal muscle of an adult rat.

Figure 15:
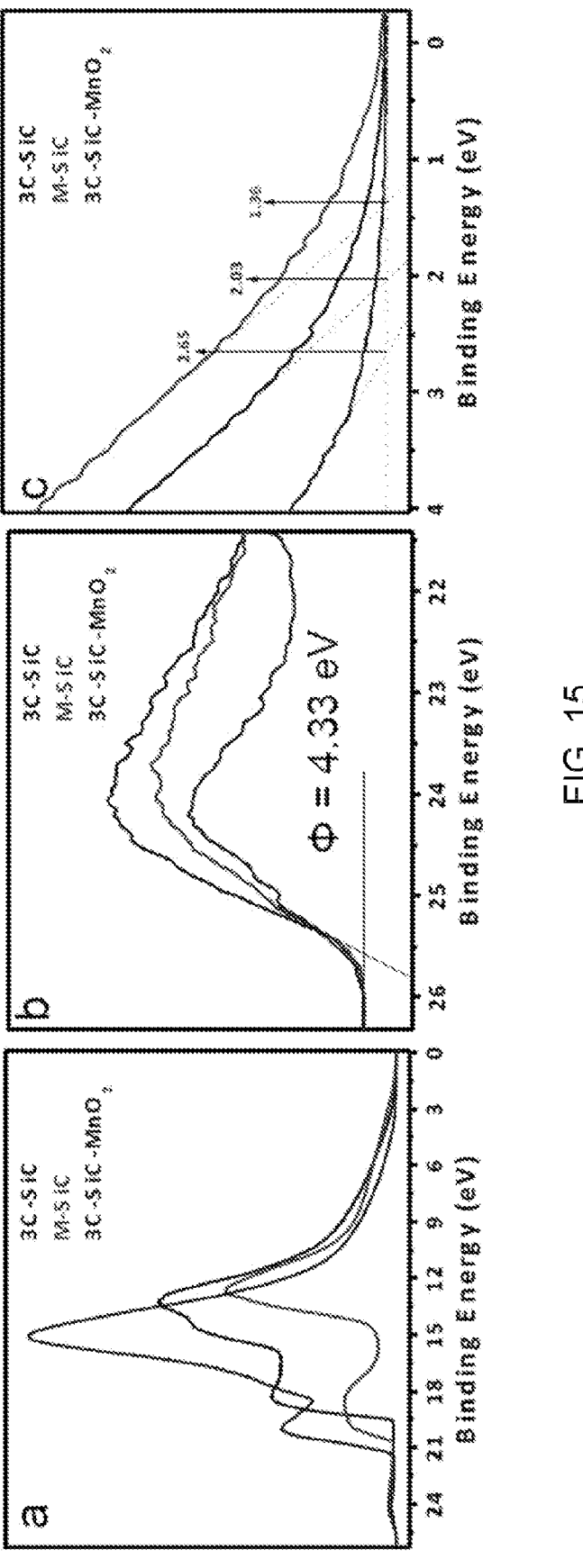

FIG. 15 (*a*)-(*c*) show ultraviolet photoelectron spectroscopy of various samples according to example embodiments. For example, (a) displays UPS spectrum of 3C—SiC, M-SiC, and 3C—SiC—MnO$_2$; (b) shows estimation of work function from the secondary scattering edge cutoff of the UPS spectrum; and (c) displays estimation of HOMO from the valence band edge of the UPS spectrum.

Figure 16:
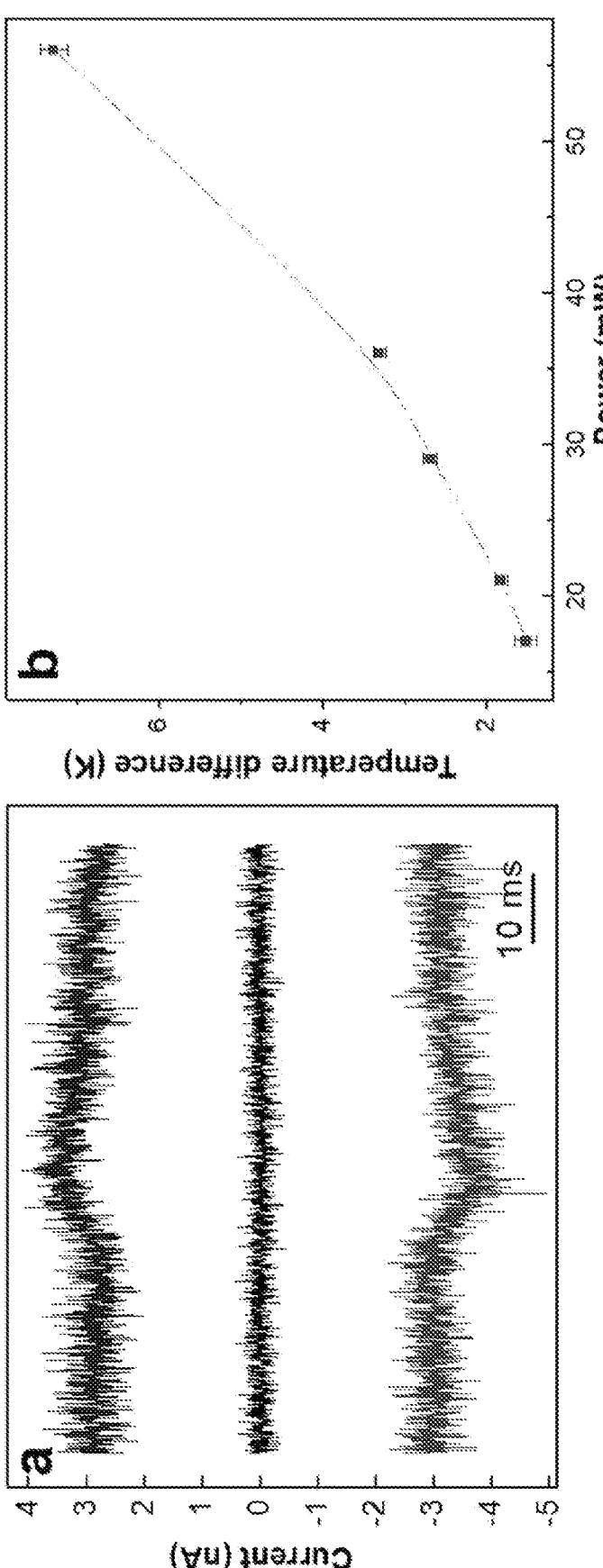
Figure 16:
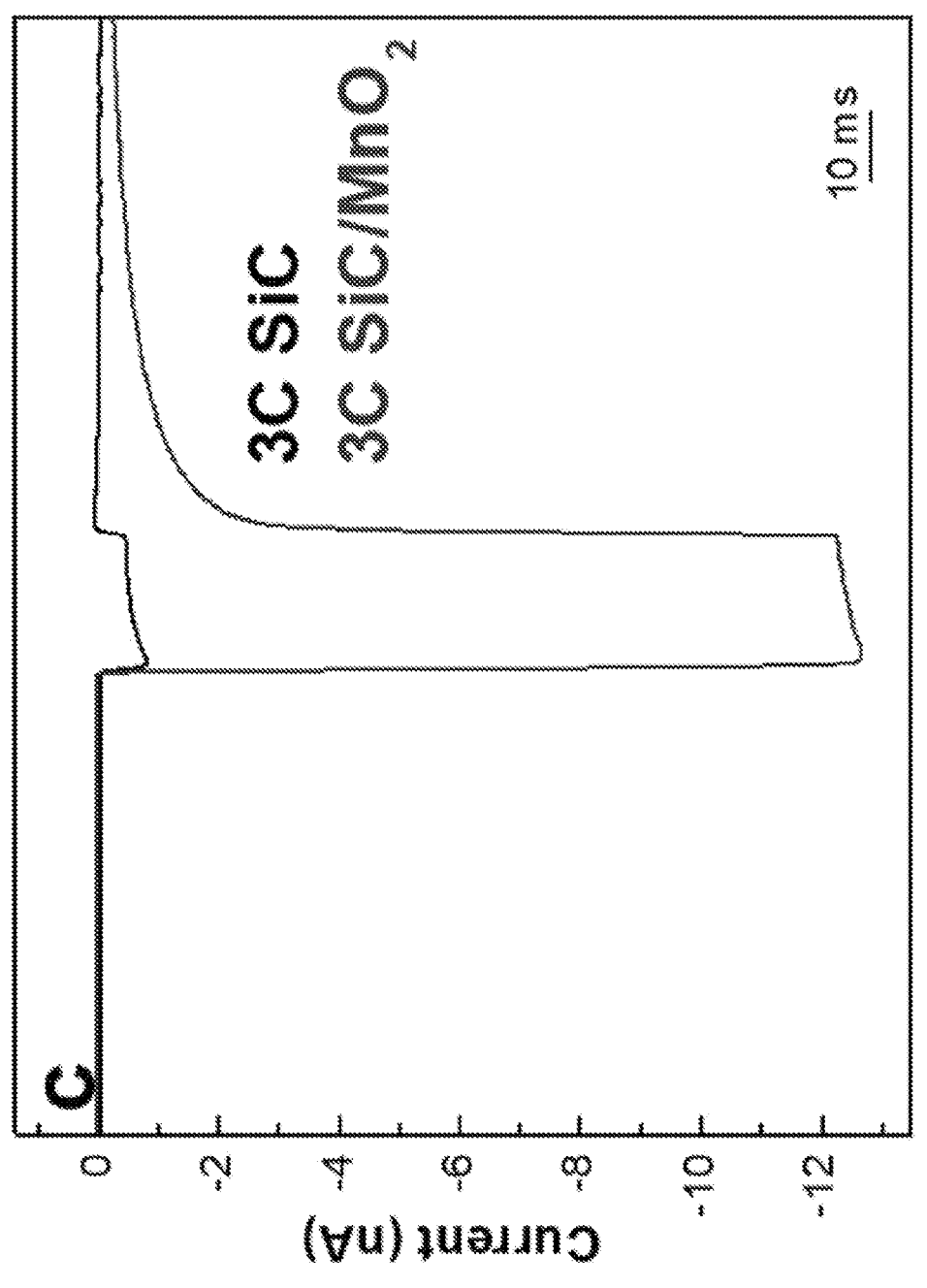

FIG. 16 (*a*)-(*c*) show photocurrent measurements on M-SiC and 3C—SiC—MnO$_2$ according to example embodiments. (a) Displays M-SiC consisting of a mixed phase and excess nitrogen doping, demonstrating a weak photothermal effect which would switch polarity with the holding level and portray a growing current with the applied stimulation (350 nm LED with a 10 ms pulse). The polarity flipping is due to the fact that thermal currents always superpose onto any injected current following direction contrary to faradaic processes. (b) Temperature change induced by a 10 ms pulse of 532 nm laser as a function of stimulation power averaged over 10 holding levels. This shows that the photothermal effect is small and thus a non-lethal dosage on cells further preventing the fluorescence imaging laser from producing stimulation artifacts. (c) Surface modification of 3C—SiC by MnO$_2$ further enhances the photoanodic oxidation reaction as indicated by the magnitude difference in current (stimulation: 350 nm LED with a 10 ms pulse).

Figure 17:
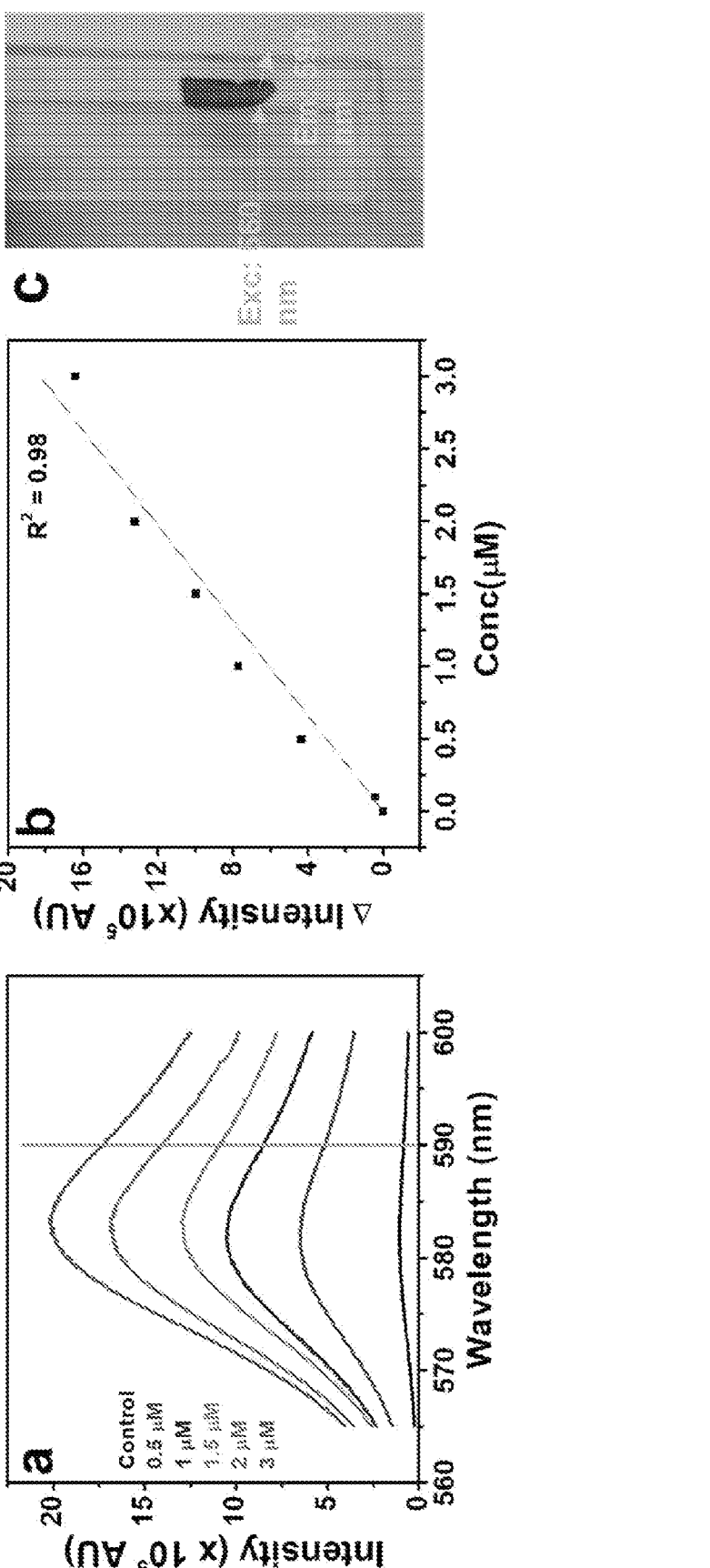

FIG. 17(*a*)-(*b*) display fluorescence calibration of amplex red hydrogen peroxide sensor according to example embodiments. In (a), steady state fluorescence of Amplex Red for specific concentration of hydrogen peroxide. Each curve is a separate measurement done with a freshly mixed dye stock solution and hydrogen peroxide of an appropriate concentration. (b) The intensity changes with respect to 0 mM hydrogen peroxide curve at 590 nm is plotted with respect to the added concentration hydrogen peroxide. The curve fitted by least squares methods (R$^2$=0.98) gives a linear correlation between concentration change of hydrogen peroxide and the fluorescence intensity change for a fixed concentration of Amplex Red. This fitted curve is used as a calibration curve to construct the quantitative fluorescence kinetics curve in FIG. 5. (c) is a photographc showing the measurement set-up involving a piece of SiC placed in the direction of the excitation beam but perpendicular to the detector.

Figure 18:
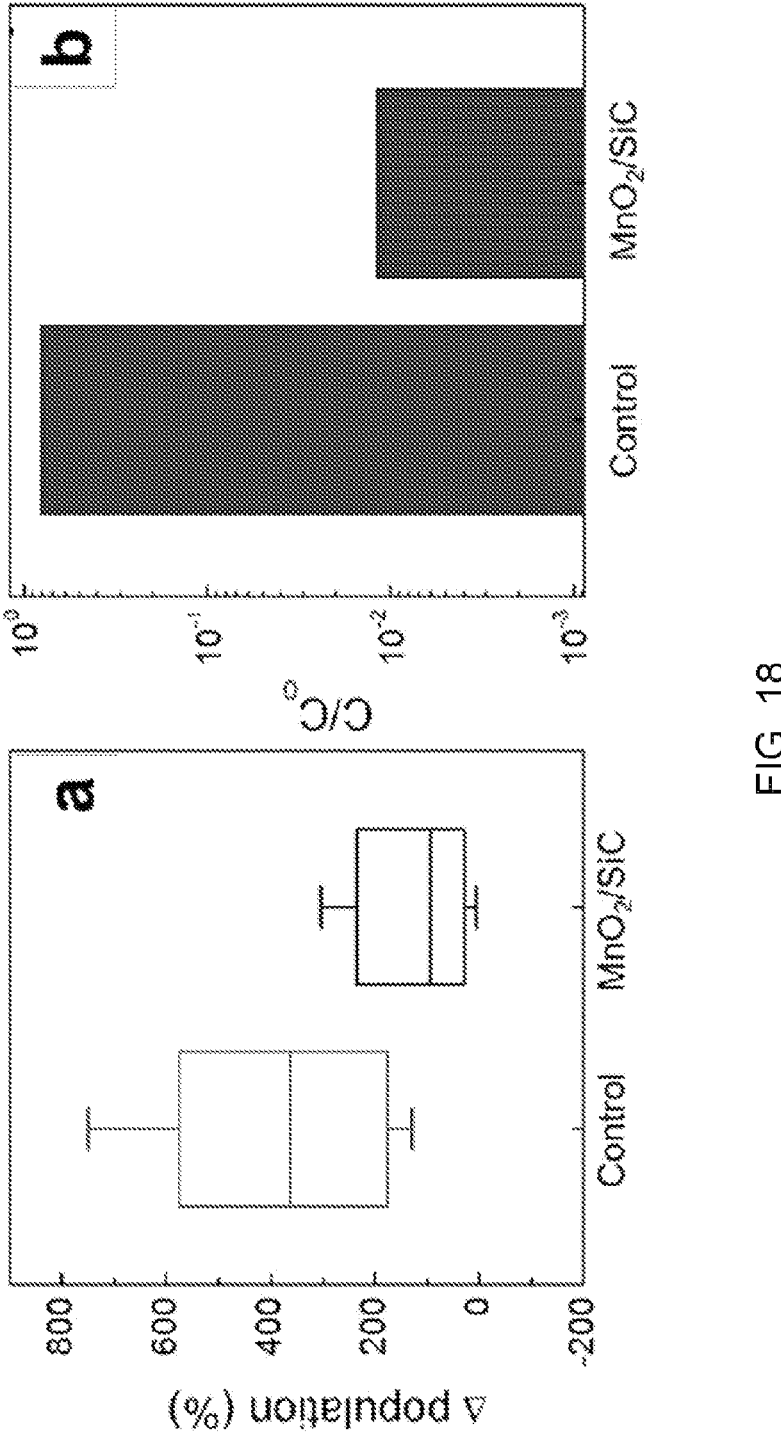

FIG. 18 (*a*)-(*b*) display the anti-bacterial effect of 3C—SiC—MnO$_2$ according to example embodiments. (a) Percentage change in bacterial population measured by standard spread plate culture, with photoelectrochemical anti-bacterial treatment of 3C—SiC—MnO$_2$ compared with samples containing 3C—SiC—MnO$_2$ under dark (N=15). (b) Average fractional change in bacterial population (with respect to bacterial culture without any 3C—SiC—MnO$_2$ under light conditions), estimated by standard spread plate culture with photoelectrochemical anti-bacterial treatment of 3C—SiC—MnO$_2$ compared with samples containing 3C—SiC—MnO under dark.

Figure 19:
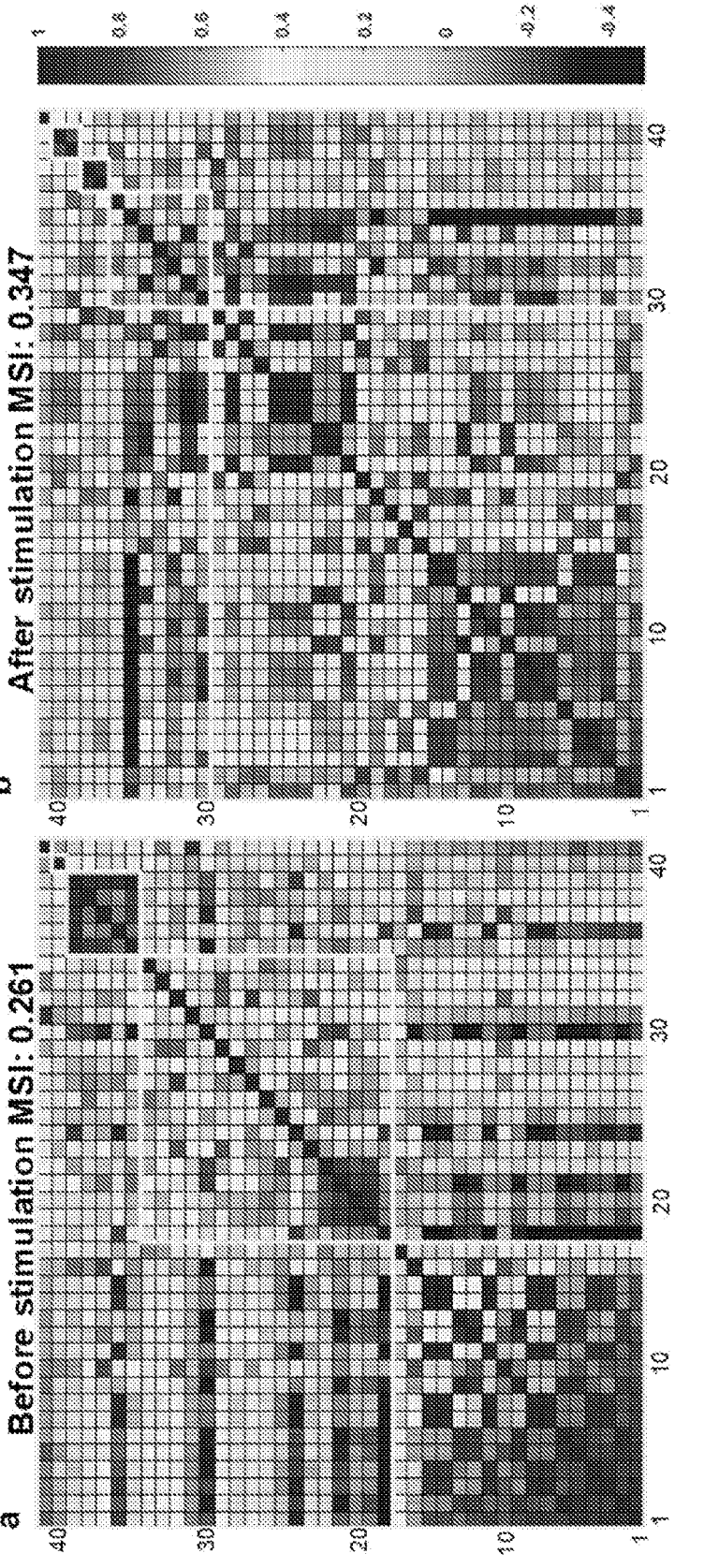
Figure 19:
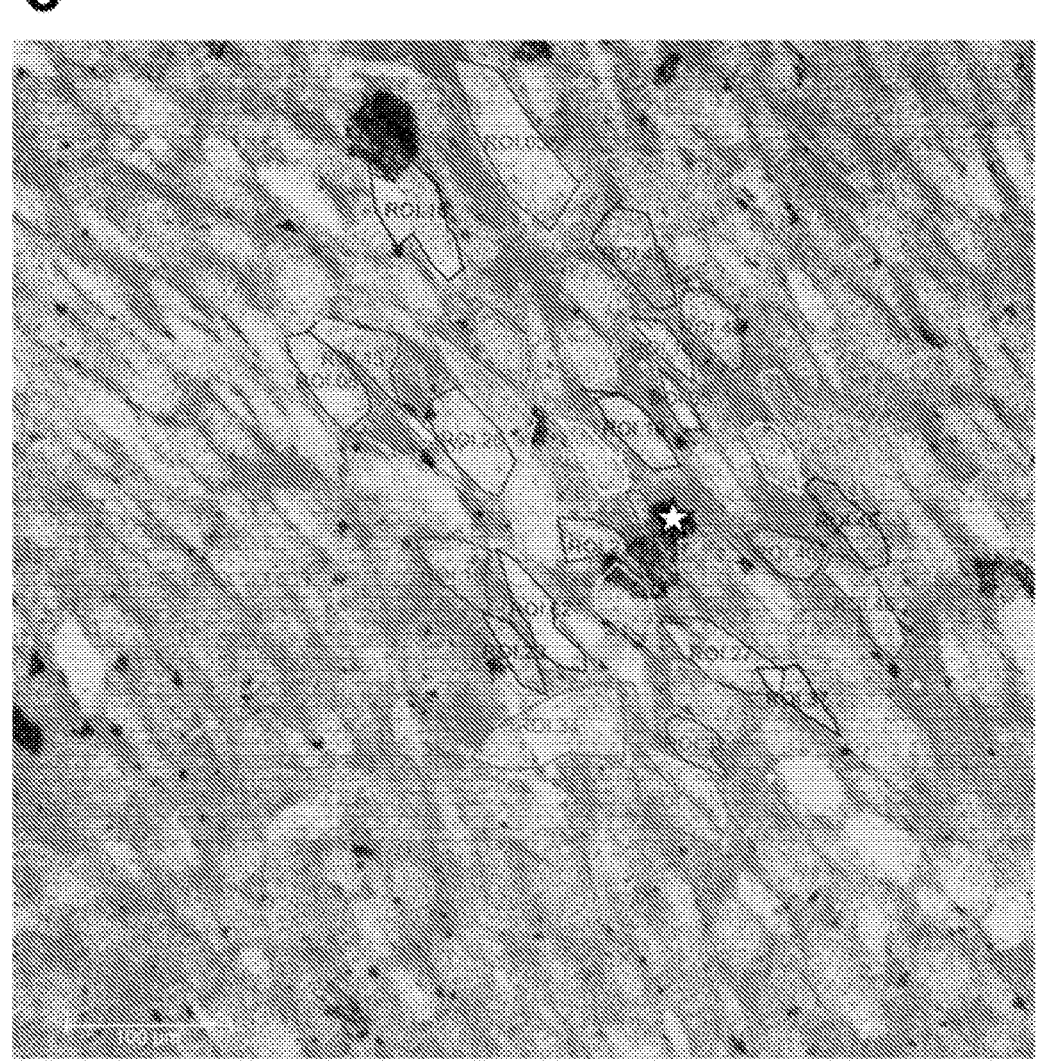

FIG. 19 (*a*)-(*c*) display HASMC calcium wave synchronization plots according to example embodiments. (a) Synchronization matrix of calcium signals before stimulation along with mean synchronization index (MSI) of 0.261. (b) Synchronization matrix of calcium signals after stimulation along with mean synchronization index (MSI) of 0.347. (Stimulation power: 29 mW, pulse: 1 ms). (c) Overlay of calcium and DIC image showing 3C—SiC particles co-cultured with smooth muscle cells along with stimulation point indicated by a white star. Region of interest (ROIs) used for synchronization analysis in a and b have been marked (Stimulation power: 29 mW, pulse: 1 ms).

Figure 20:
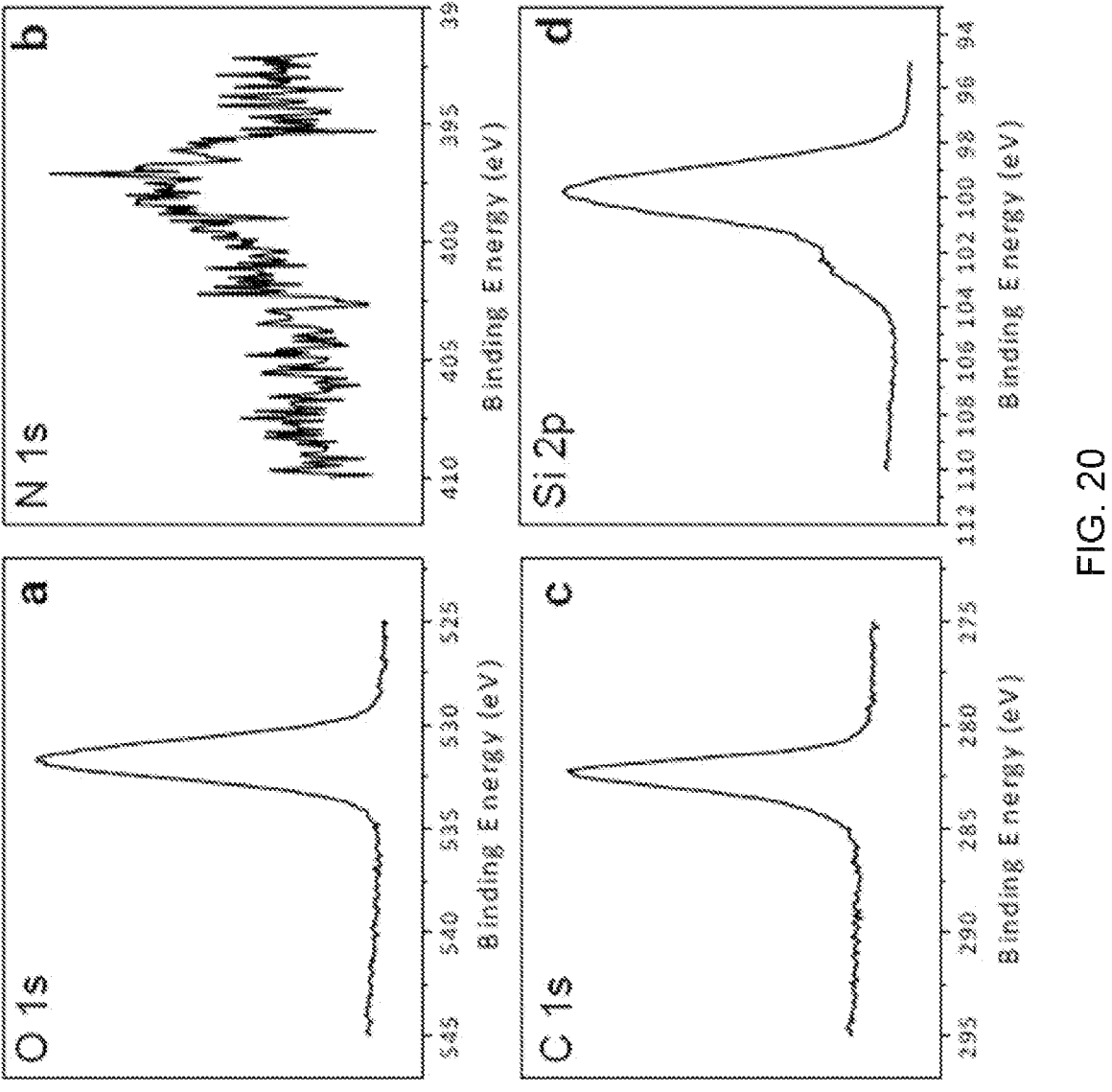
Figure 20:
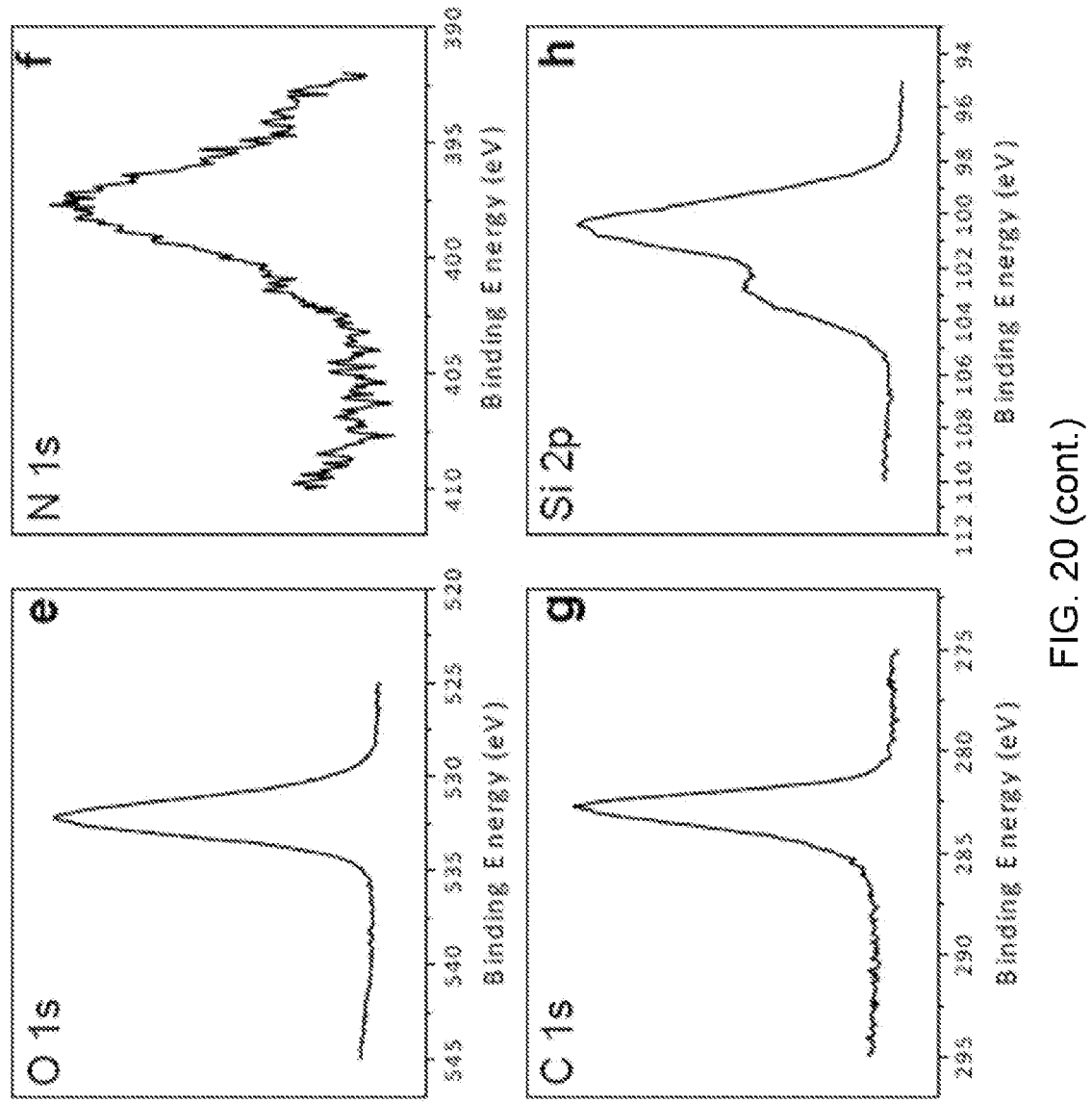

FIG. 20 (*a*)-(*h*) display XPS spectra of 3C—SiC and M-SiC according to example embodiments. Elemental XPS spectra collected on 3C—SiC samples for (a) oxygen 1s, (b)nitrogen 1s, (c) carbon (1s), (d) silicon 2p, and M-SiC samples for (e) oxygen 1s, (f) nitrogen 1s, (g) carbon 1s, (h) silicon 2p.

Figure 21:
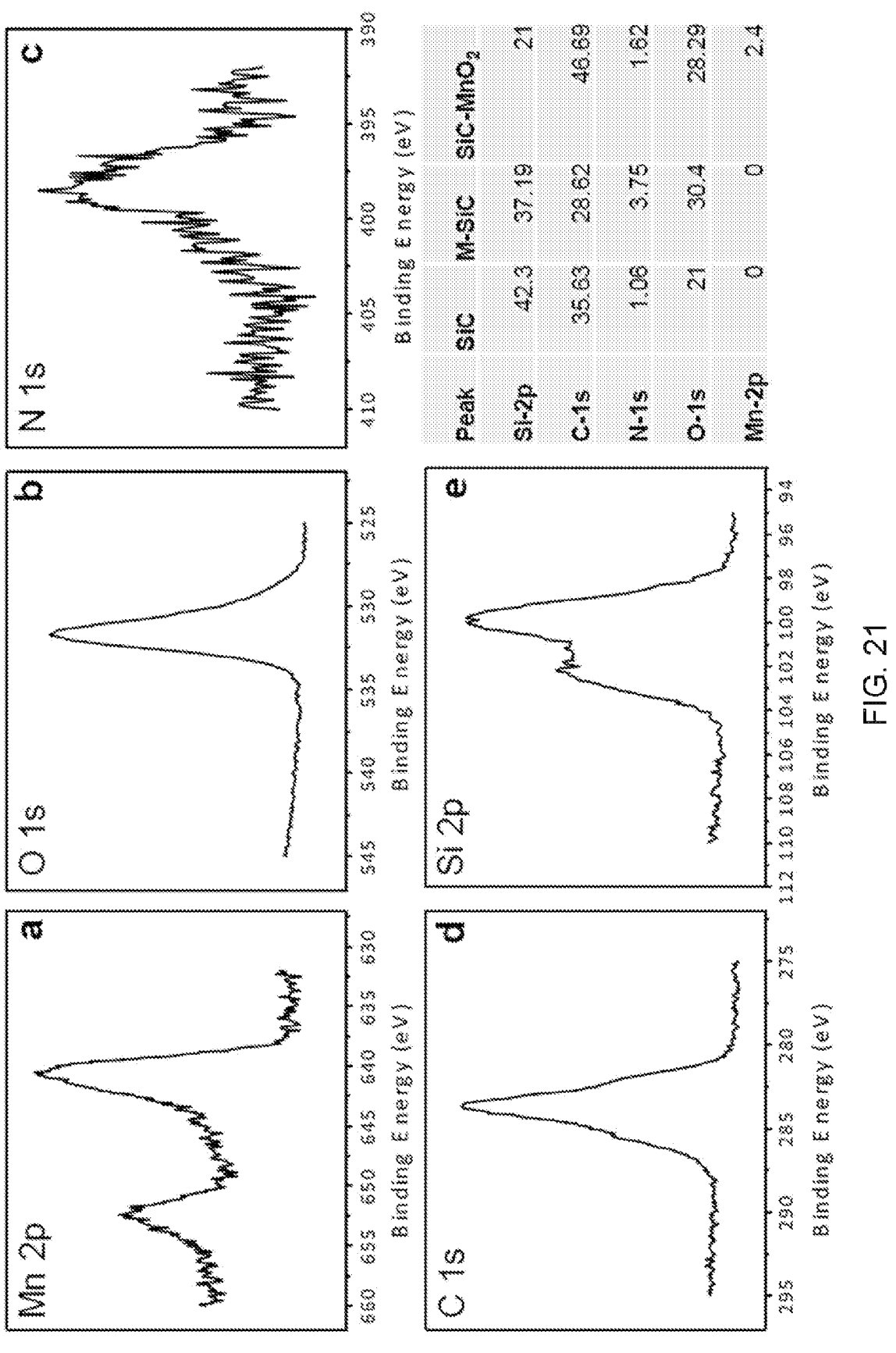

FIG. 21 (*a*)-(*e*) display XPS spectra of 3C—SiC—MnO$_2$ and surface composition analysis according to example embodiments Elemental XPS spectra collected on 3C—SiC—MnO$_2$ samples for (a) manganese 2p, (b) oxygen is, (c) nitrogen 1s. (d) carbon Is, (e) silicon 2p, (f) Table representing surface composition in atomic percentages for each element in 3C—SiC, M-SiC, and 3C—SiC—MnO$_2$.

Figure 22:
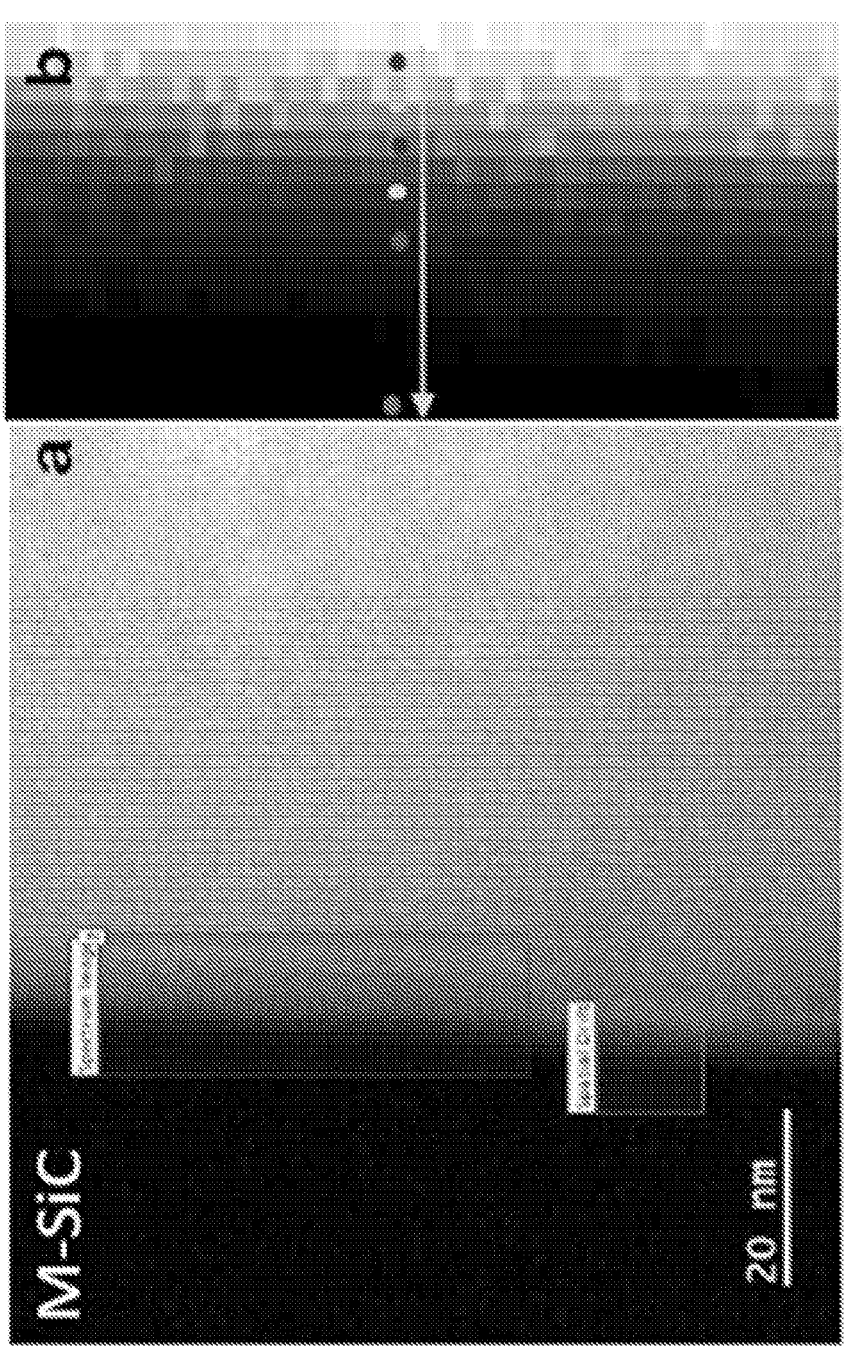
Figure 22:
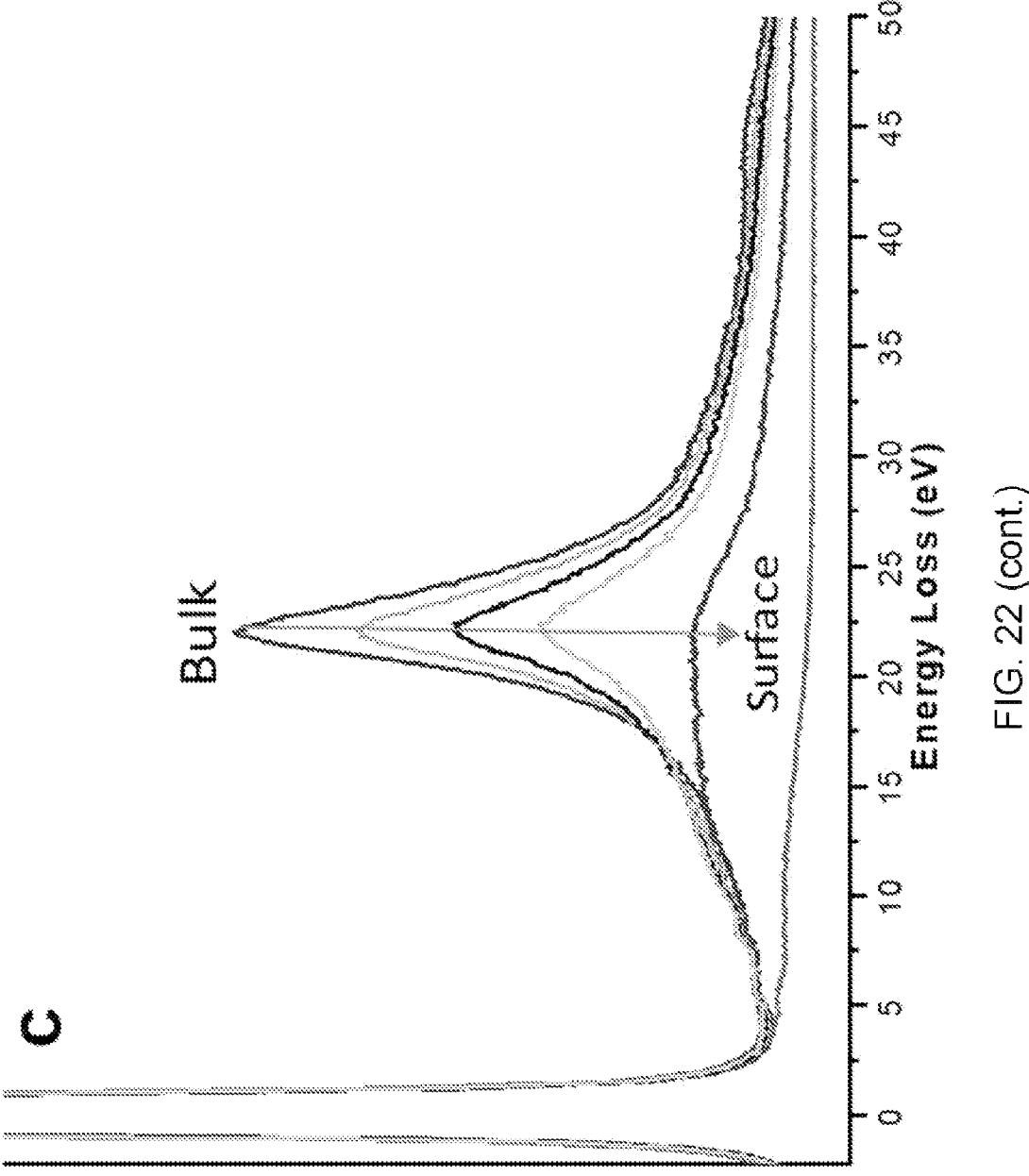
Figure 22:
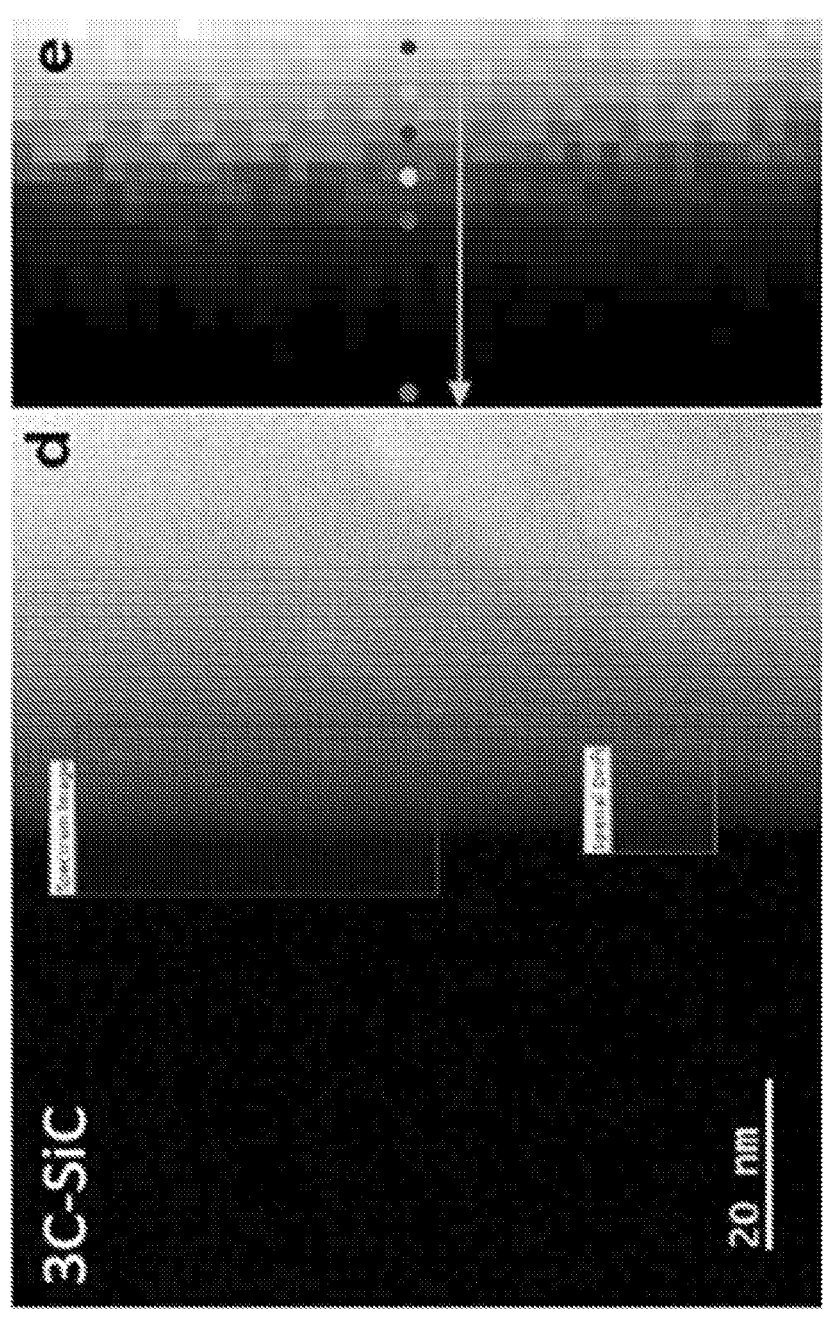
Figure 22:
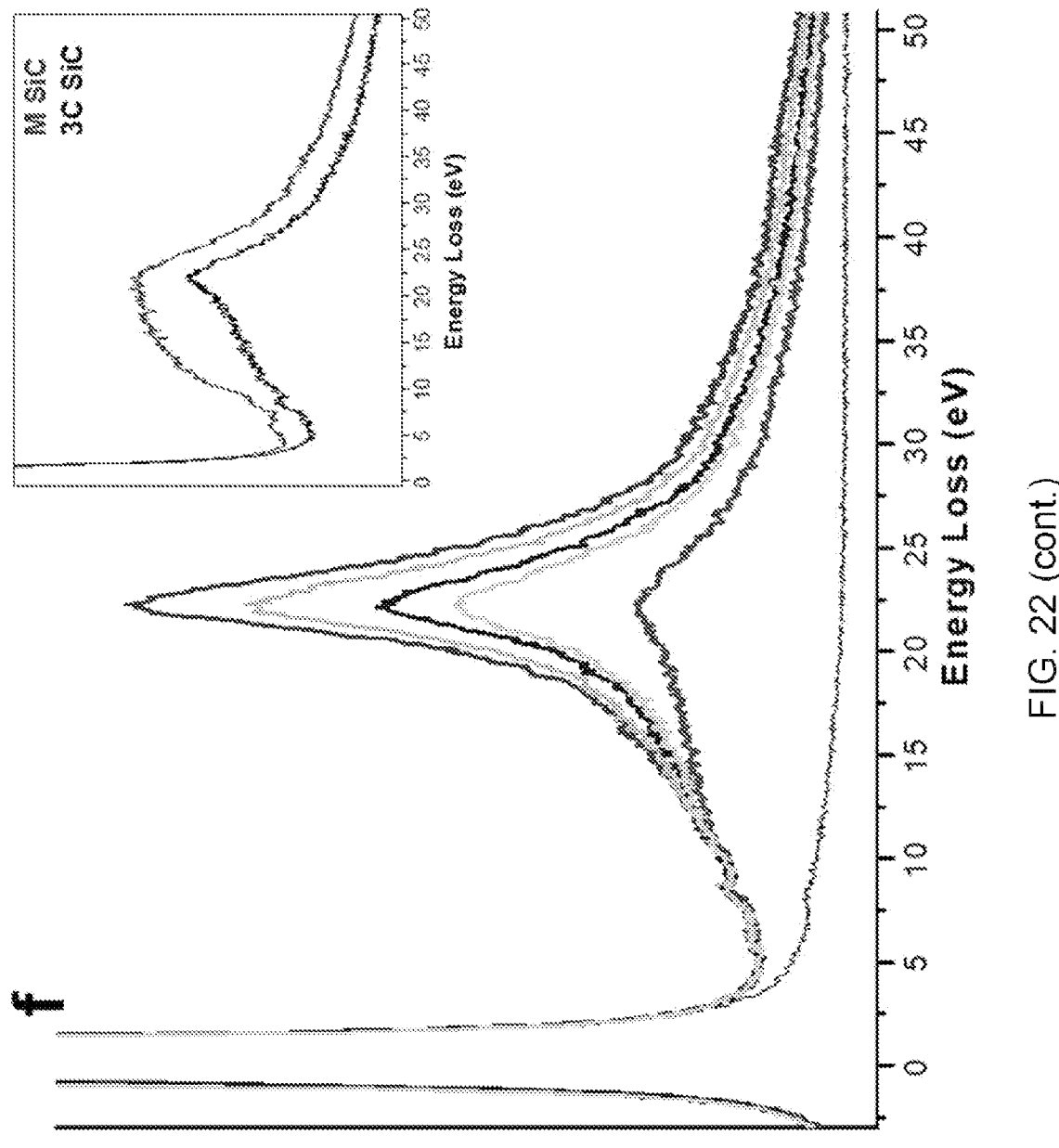

FIG. 22 (*a*)-(*f*) display the results of electron energy loss spectroscopy experiments according to example embodiments. EELS mapping done for surface and bulk plasmons in M-SiC (b) and 3C—SiC (e) on regions represented by HAADF STEM image in (a) and (d) respectively. The spatial evolution of low EELS spectra from the bulk of a microtomed crystal to its surface for a M-SiC (c) and 3C—SiC (f) crystal. The evolution from bulk to surface shows how the surface phonons are different in either case which could be correlated with the nitrogen doping level as revealed by atom probe tomography and surface oxide and nitride defects from XPS.

Figure 3:
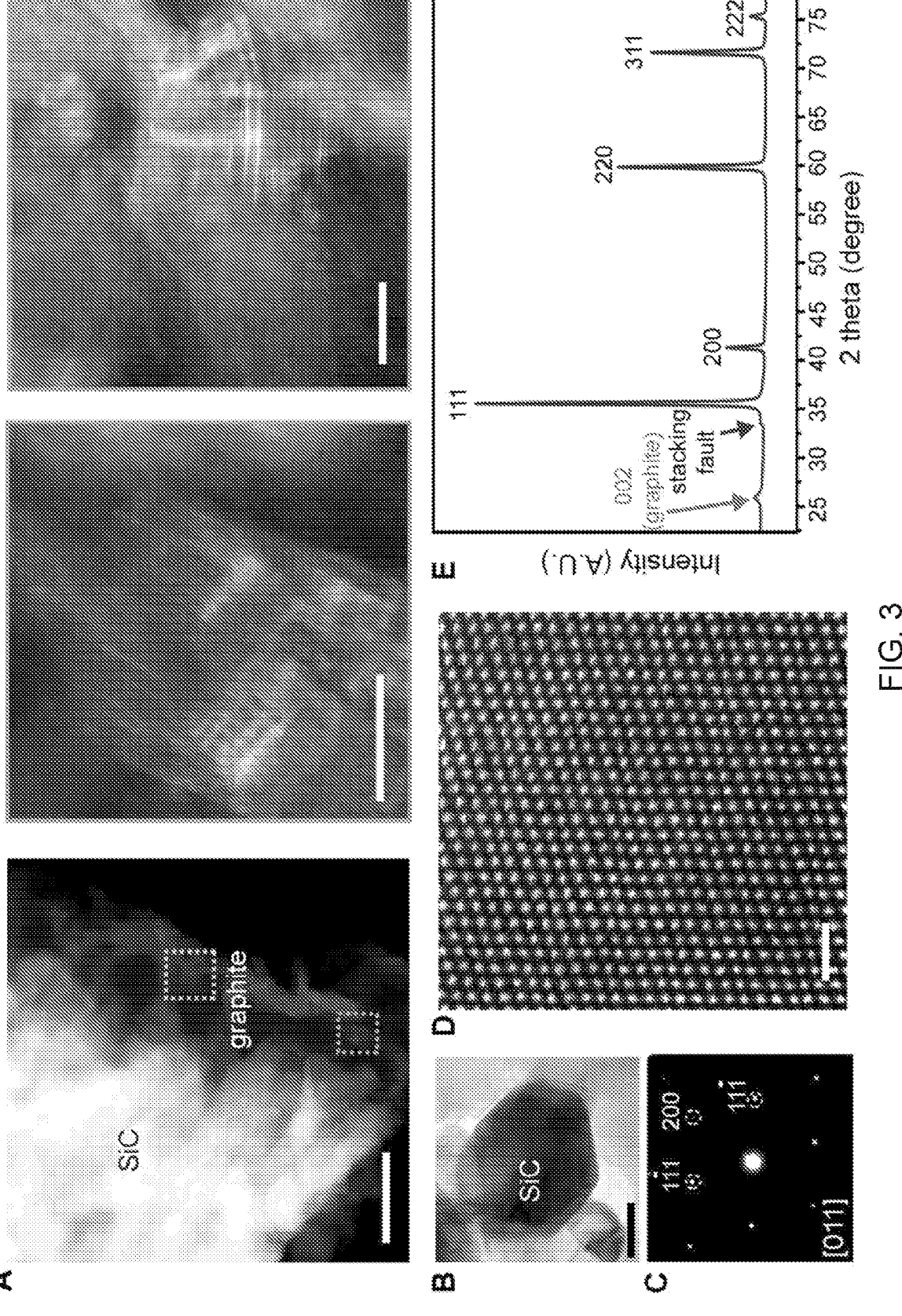
FIG. 3 (a)-(g) show structural characterization of 3C—SiC according to example embodiments, wherein laser printed silicon carbide has a graphite layer formed beneath it due to a temperature gradient existing from the ablation point. In (a), HAADF-STEM image reveals a porous graphitic surface integrated with SiC. Higher magnification images reveal graphitic layered structure in regions as marked in blue and green. In (b), a microtomed section of 3C—SiC with its diffraction pattern (c) taken on it indexing [011] zone. In (d), a HAADF-STEM image reveals cubic SiC lattice. In (e), X-ray diffraction reveals a 3C polytype of Silicon carbide with stacking faults and graphite layer beneath. In (f), an atom probe reconstruction of a 3C—SiC sample reveals nitrogen doping. In (g), a mass spectrum
Figure 3:
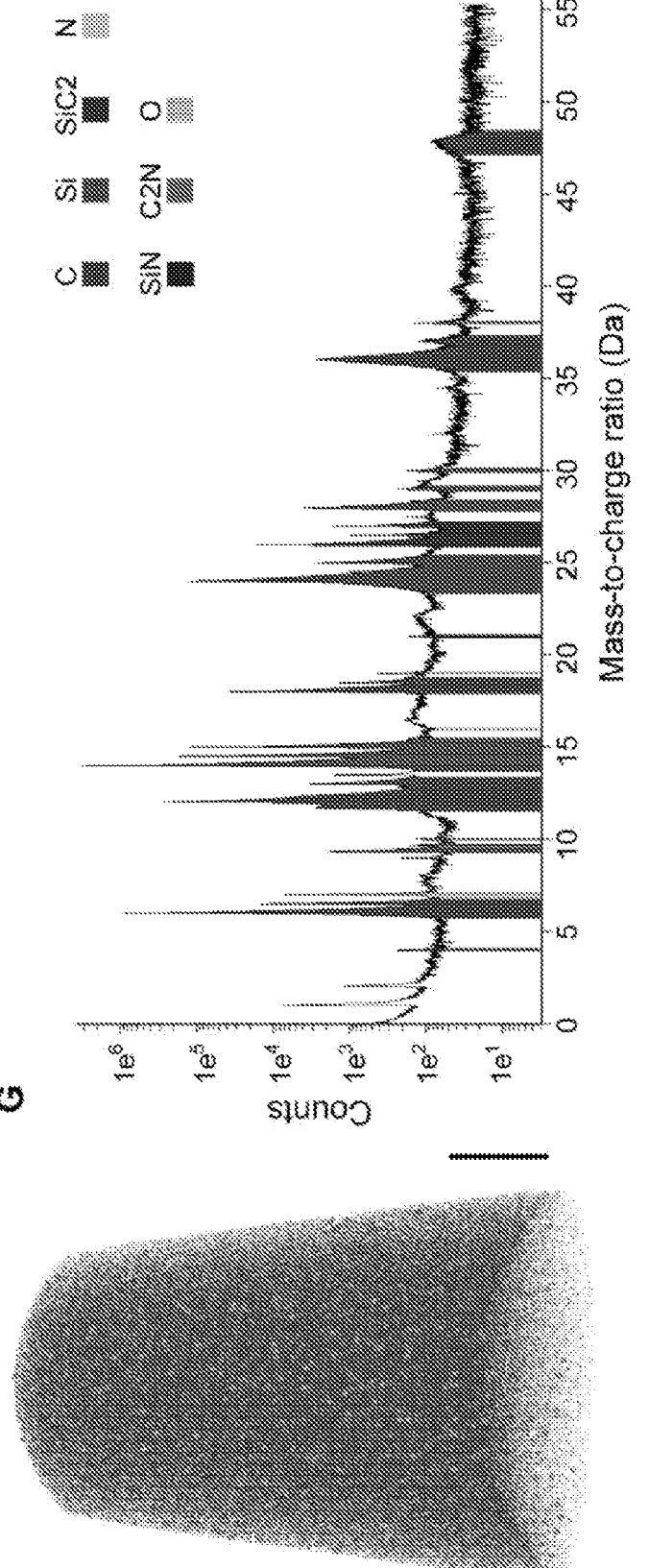
Figure 23:
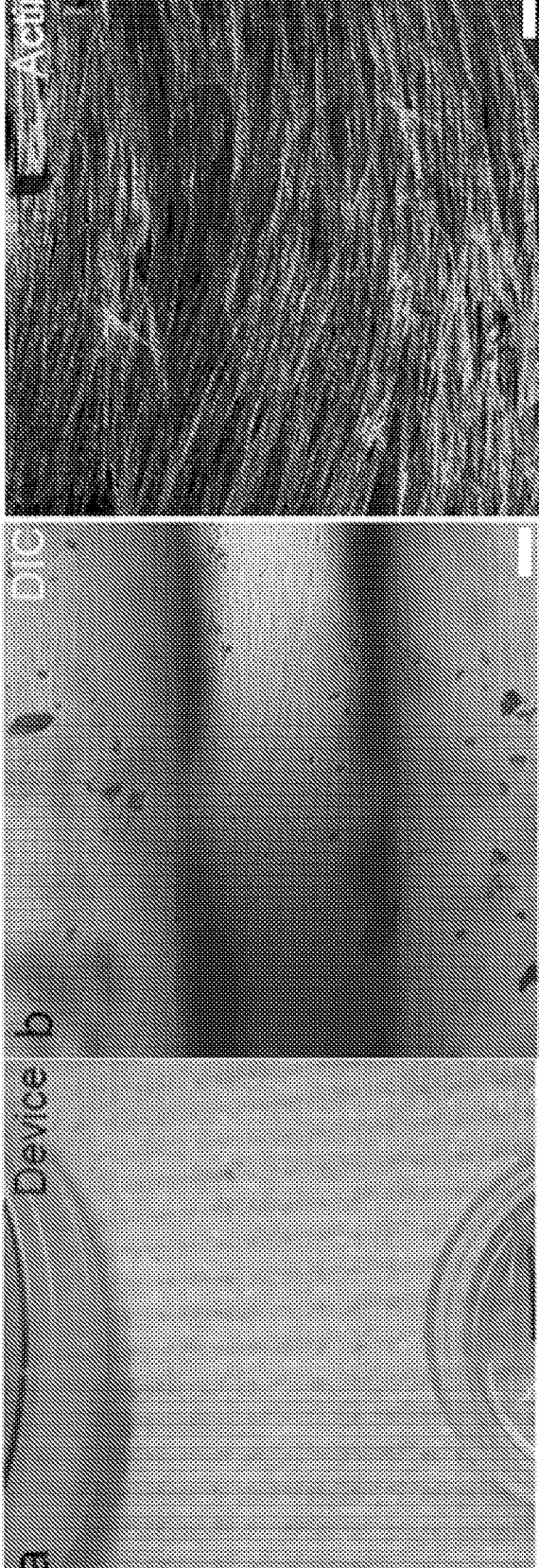
Figure 23:
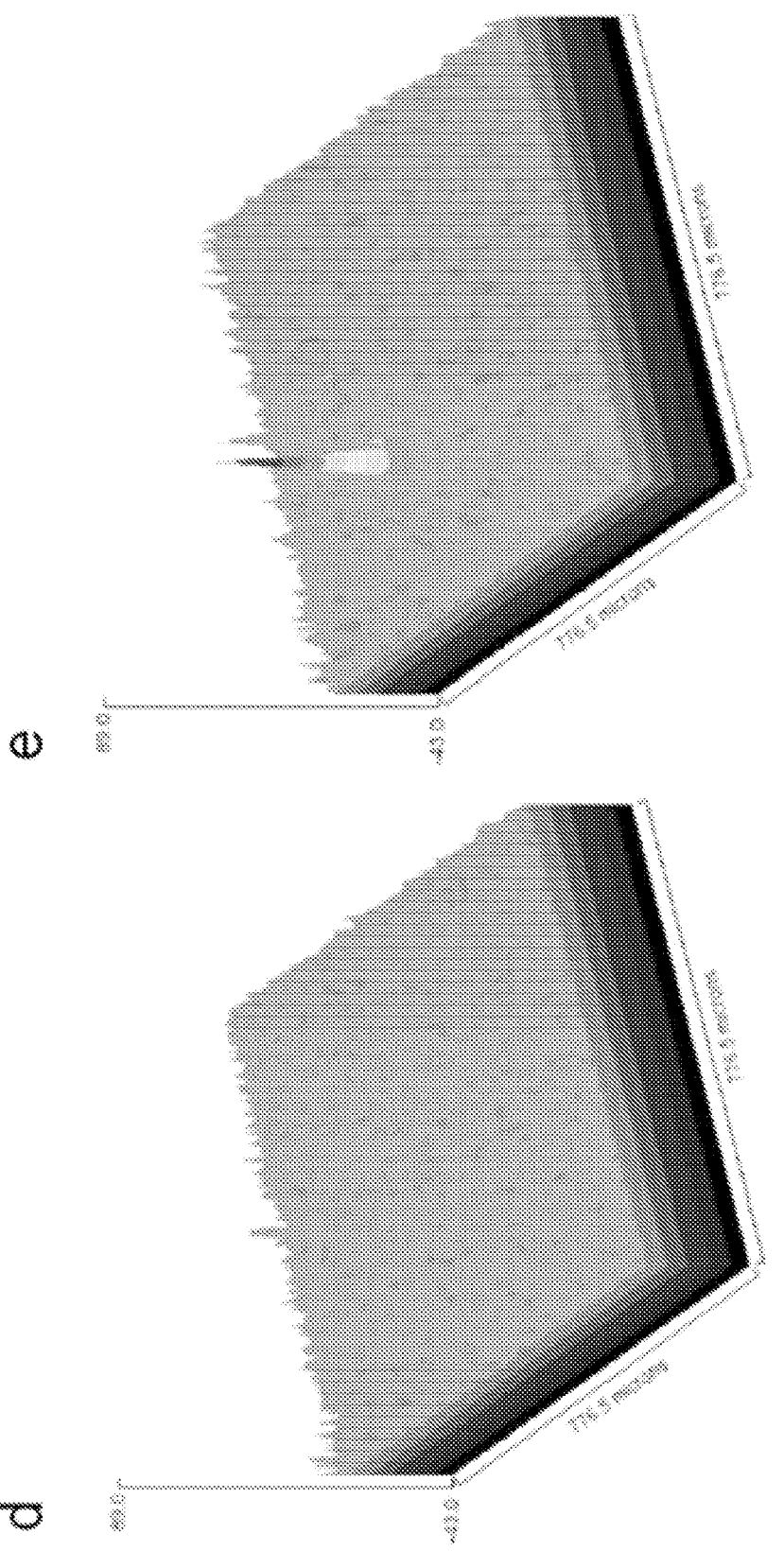
Figure 23:
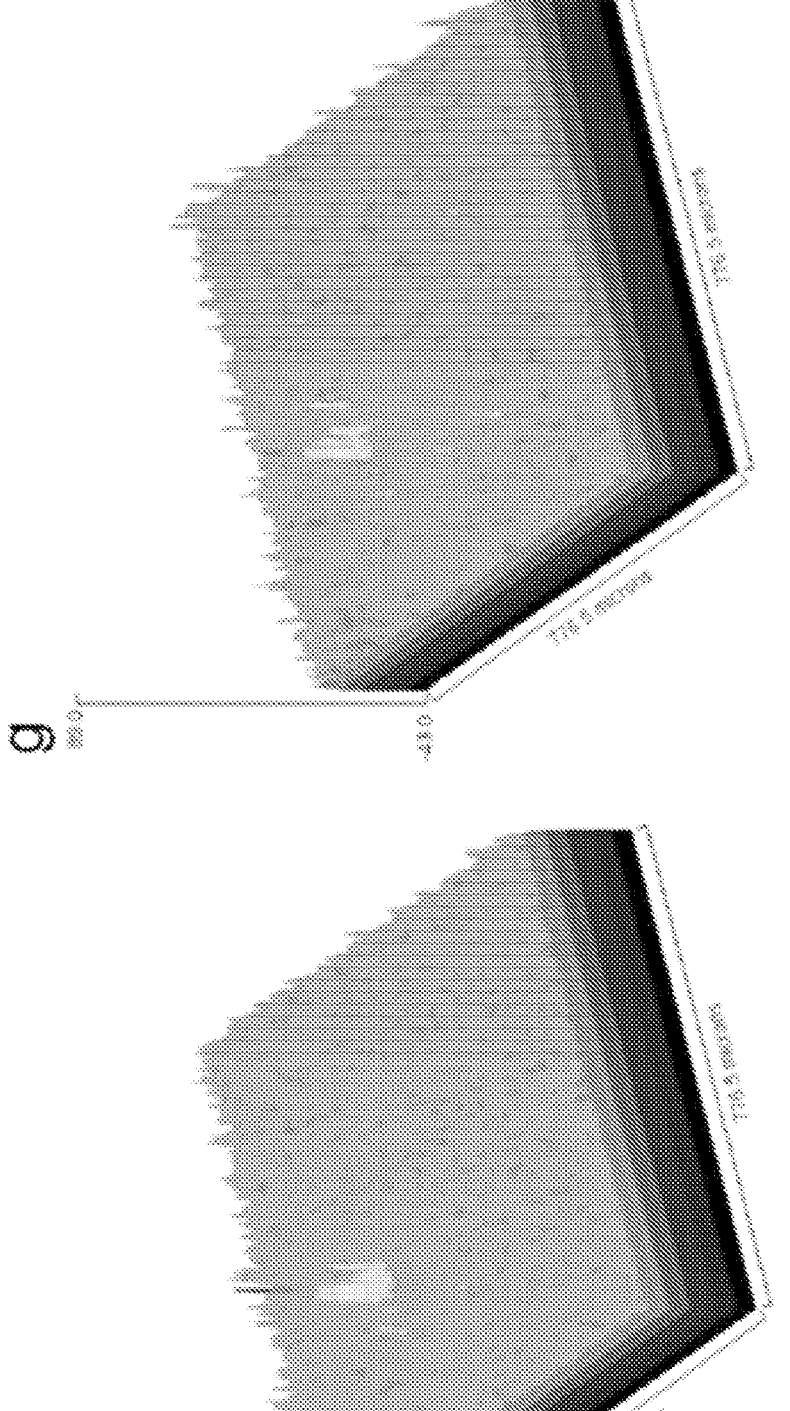

FIG. 23 (*a*)-(*g*) show 3C—SiC device-based stimulation of a HASMC sheet according to example embodiments. HASMCs are cultured on the device (a) to obtain a uniform film of cells as observed through DIC image (b), actin immunofluorescence staining (c) and Z-stack (see FIG. 3, i). Differential calcium fluorescence (ΔF/F) surface plots are constructed for device shown in (b): time points before (−2.0 s) (d) and after stimulation (e)-(g) (0.0 s, 2.0 s, 4.0 s, respectively) for a 8 mW, 1 ms stimulation on the region indicated by red box in (b). Magnified views of calcium waves in red boxed region is represented in FIG. 5 (*j*). Scale bars in (b)-(c) are 100 μm.

Figure 24:
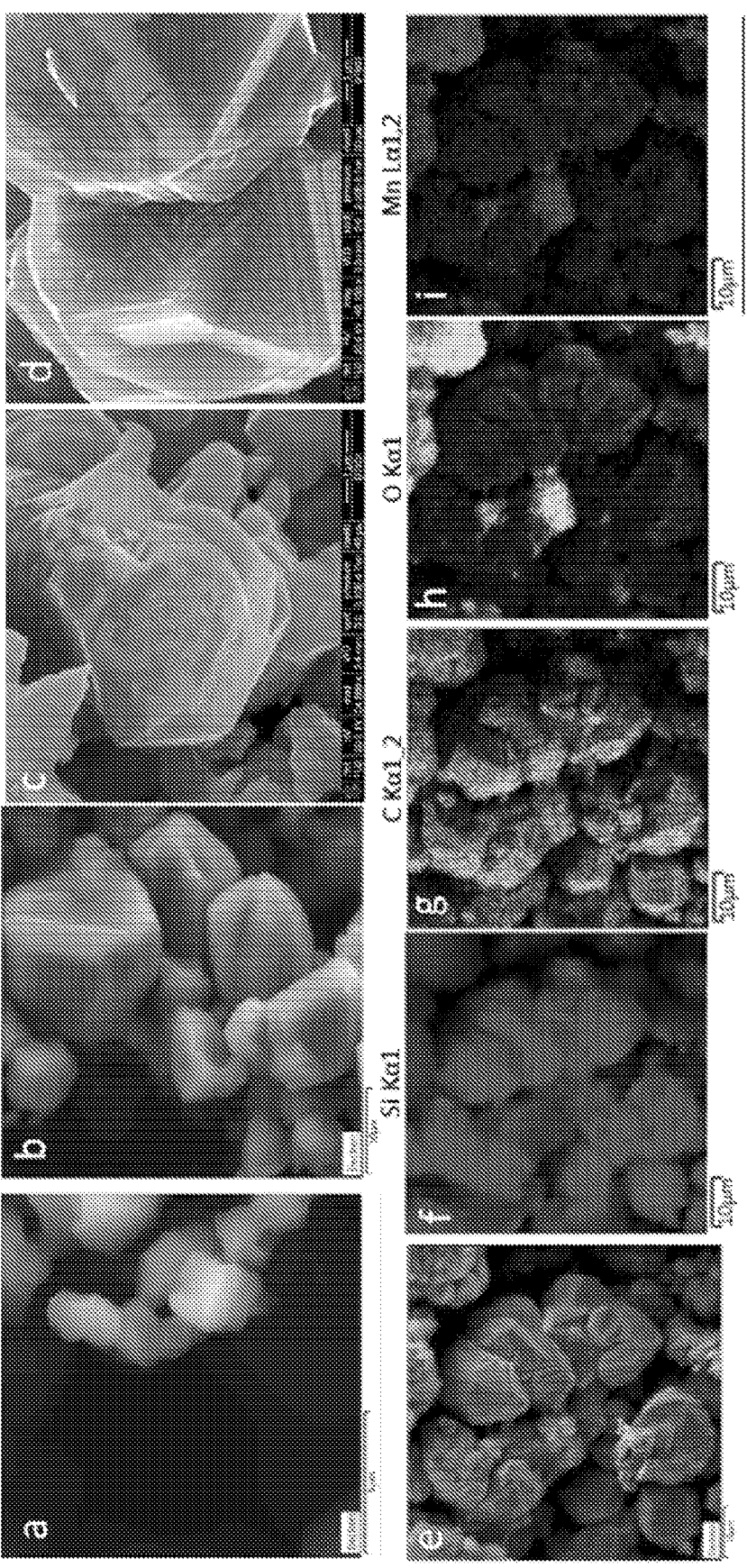

FIG. 24 (*a*)-(*i*) displays SEM and EDS analyses according to example embodiments. In (a), SEM images of 3C—SiC after purification revealing cubic morphology. In (b), SEM images of M-SiC after purification revealing rhombohedral morphology arising due to phase mixing induced after MoS$_2$ addition. In (c)-(d), Magnified view of crystals showing a coating of MnO$_2$ deposited on them by electroless deposition. In (e), SEM image of 3C—SiC—MnO$_2$ crystals where EDS mapping was performed. In (f)-(i), EDS map of crystals shown in (e).

Figure 25:
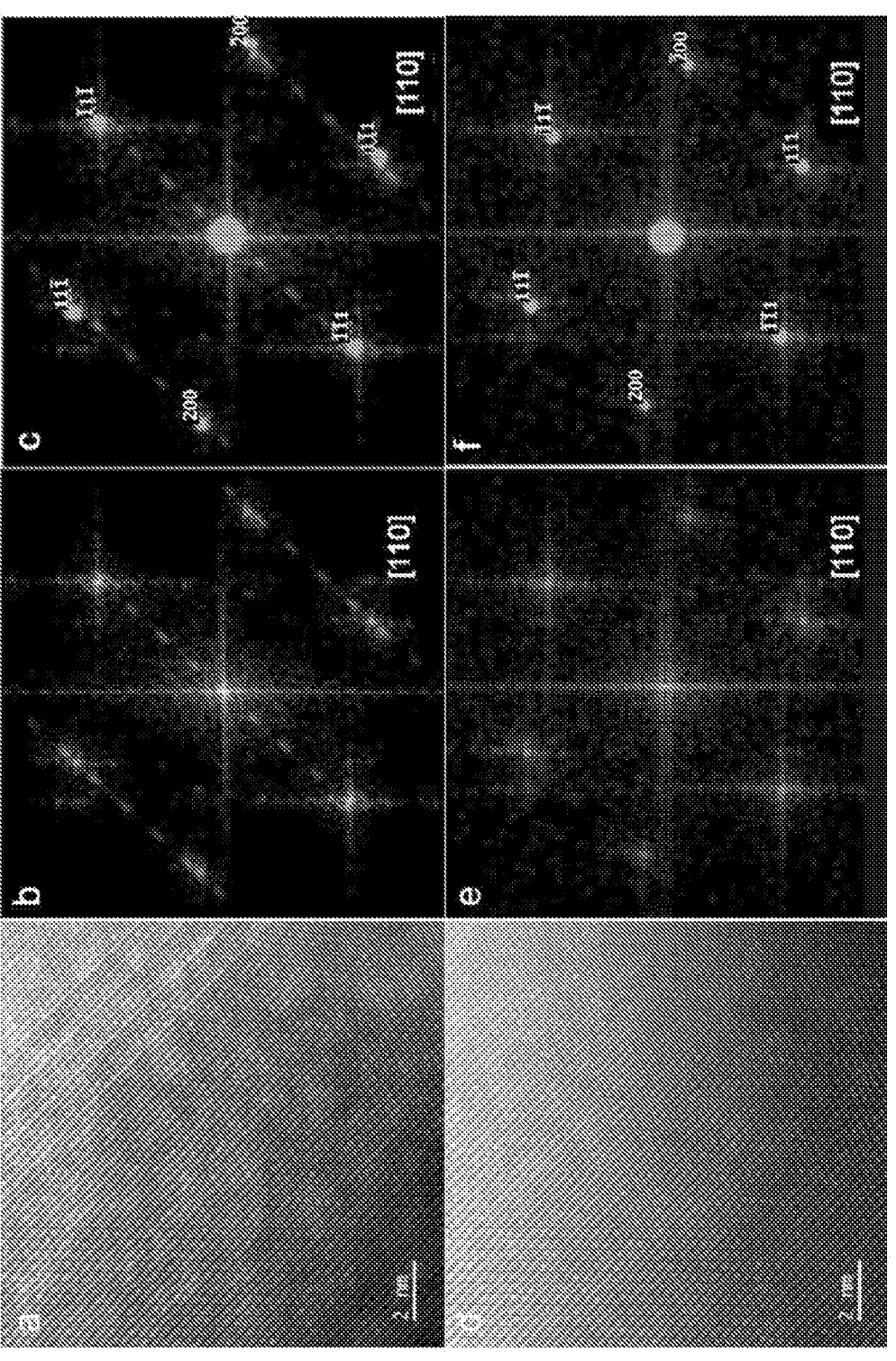
Figure 25:
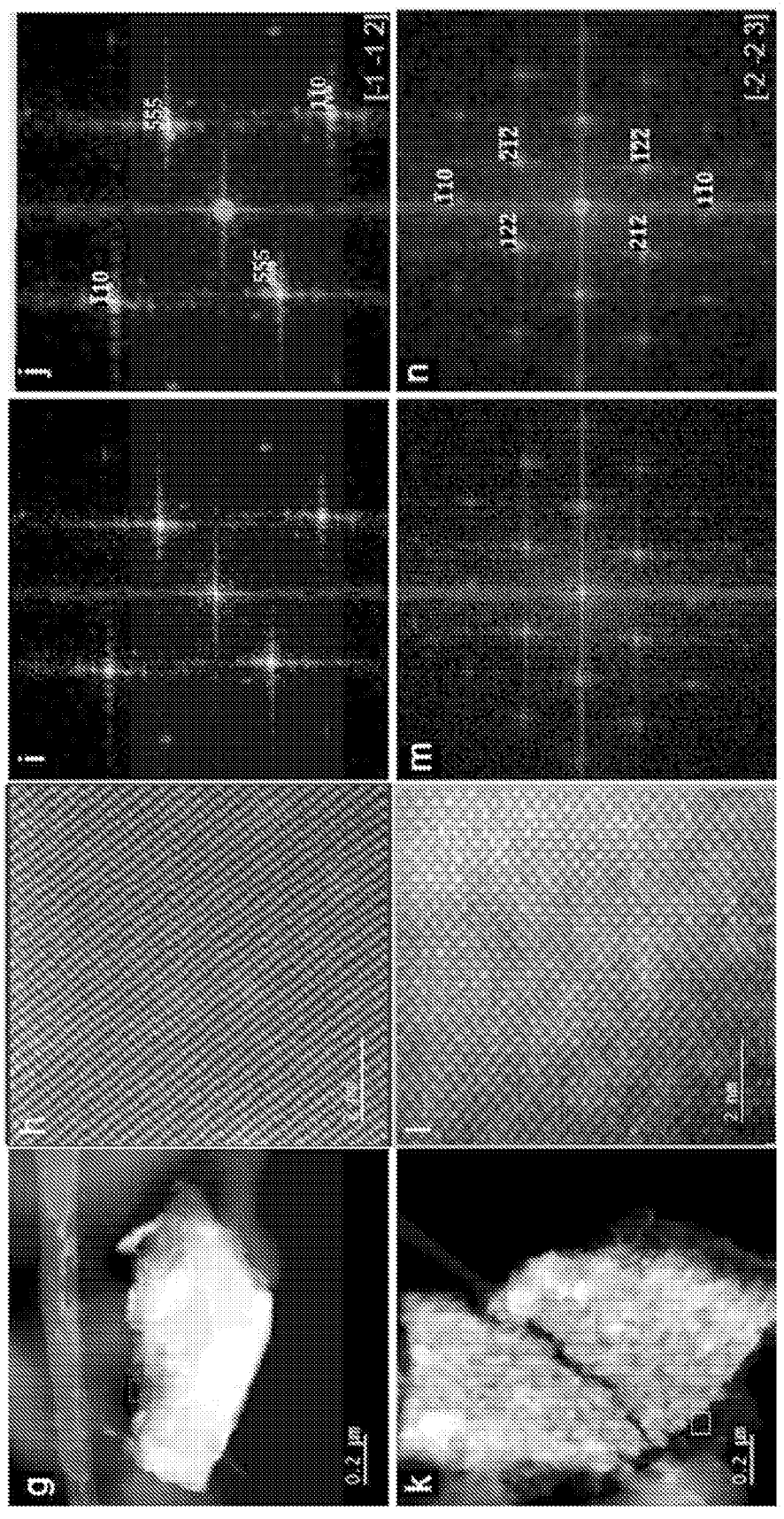
Figure 25:
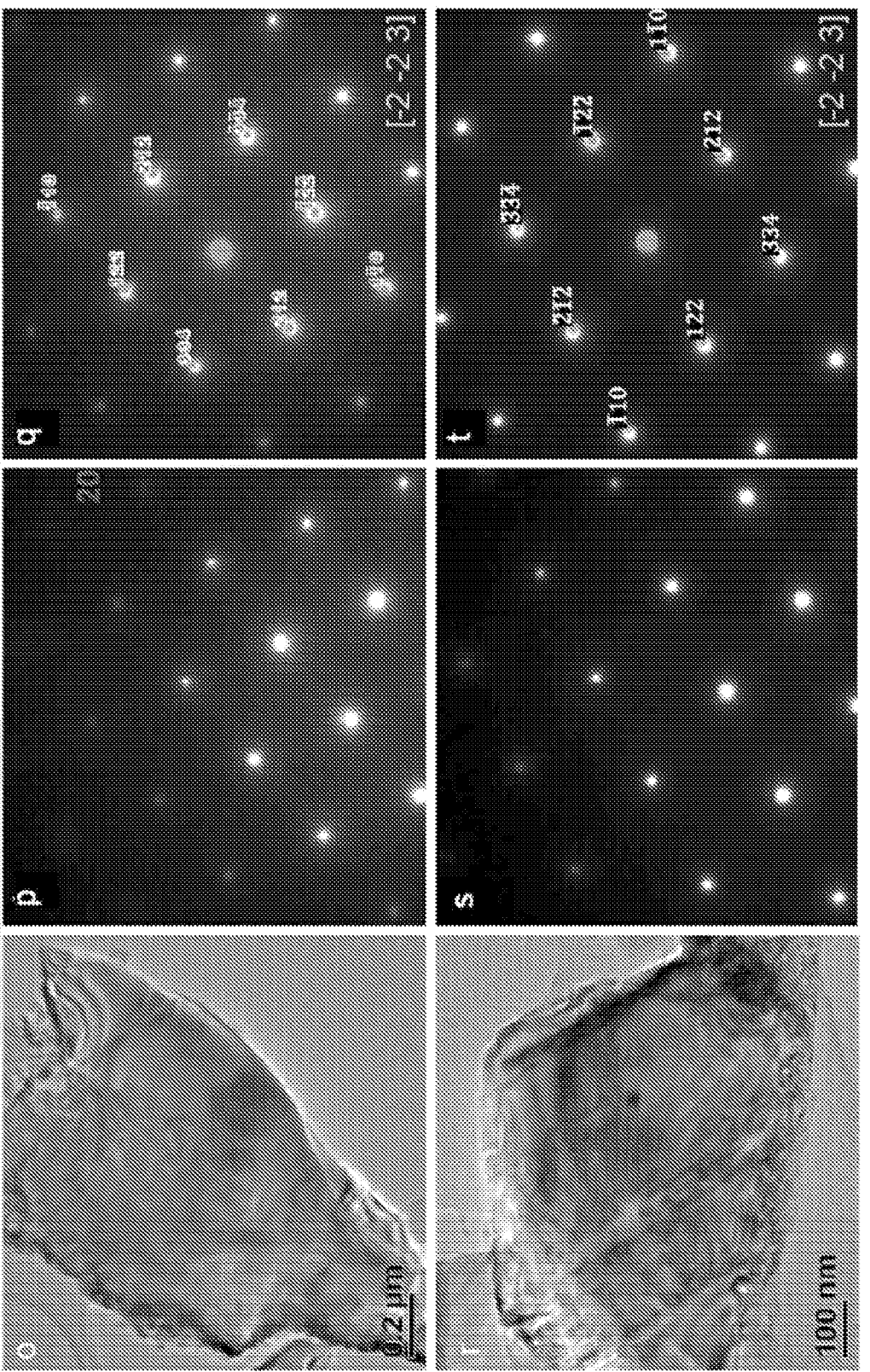

FIG. 25 (*a*)-(*t*) displays SAED and FFT indexing of 3C-15C and 15R—SiC according to example embodiments. HAADF STEM image of a 3C—SiC microtomed crystal section (a) and (d). (b) and (e) are their corresponding FFTs. (c) and (f) show the indexing of FFTs to [110] zone using Crystal Maker software. HAADF STEM image of microtomed sections of M-SiC (g) and (k). HAADF STEMimage of a 15R—SiC microtomed crystal section (h) and (l). (i) and (m) are their corresponding FFTS. (j) and (n) show the indexing of FFTs to [−1 −1 2] and [−2−2 3] zones, respectively. TEM image of microtomed sections of M-SiC (o) and ®. SAED patterns collected on respective sections (p) and (s). Indexing of corresponding SAED patterns to [−2−2 3] zone (q) and (t).

Figure 26:
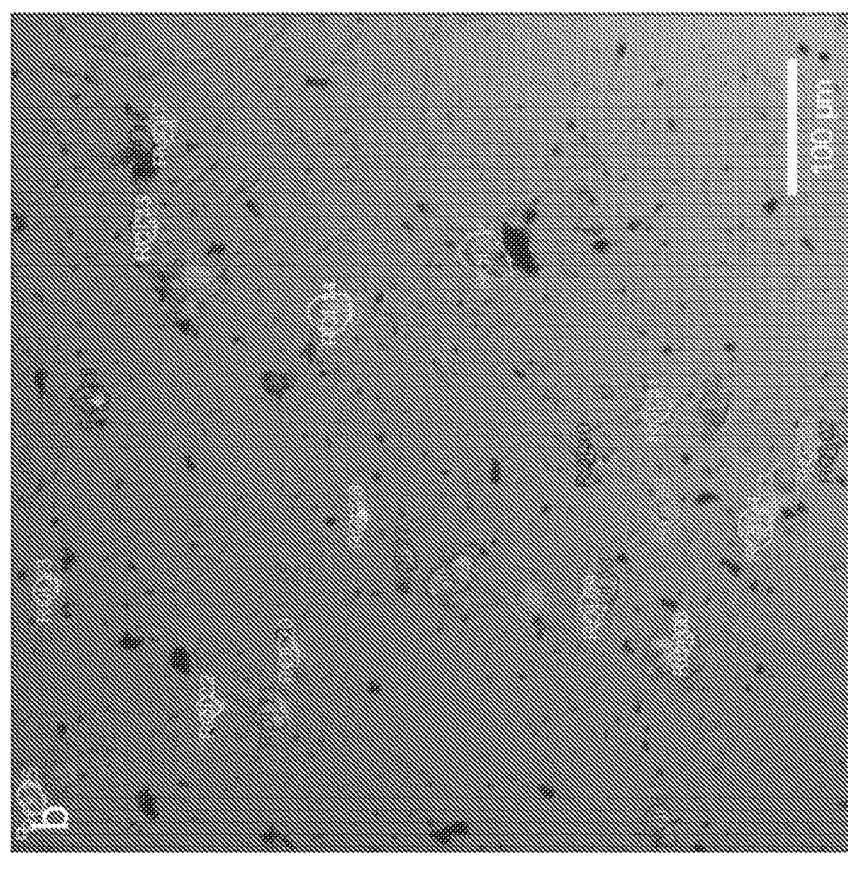
Figure 26:
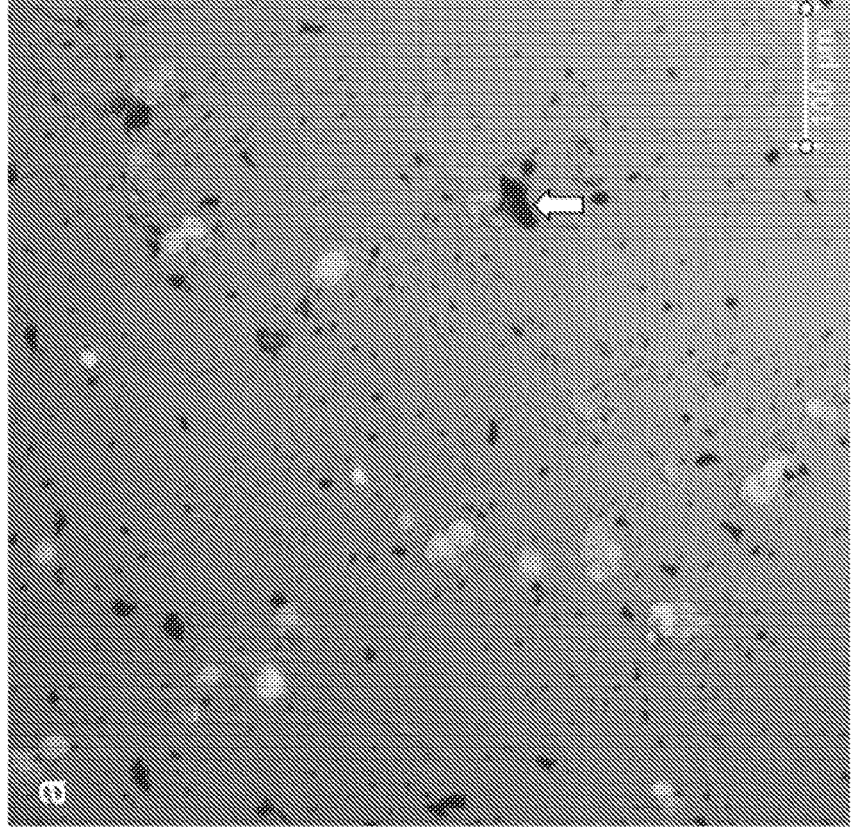

FIG. 26 (*a*)-(*b*) displays neural network stimulation calcium images and network labels according to example embodiments. Region of interest (ROI) of neuronal some marked on DIC and calcium image. The neuron in ROT 12 was stimulated by a 1 ms pulse of 5.3 mW.

Figure 27:
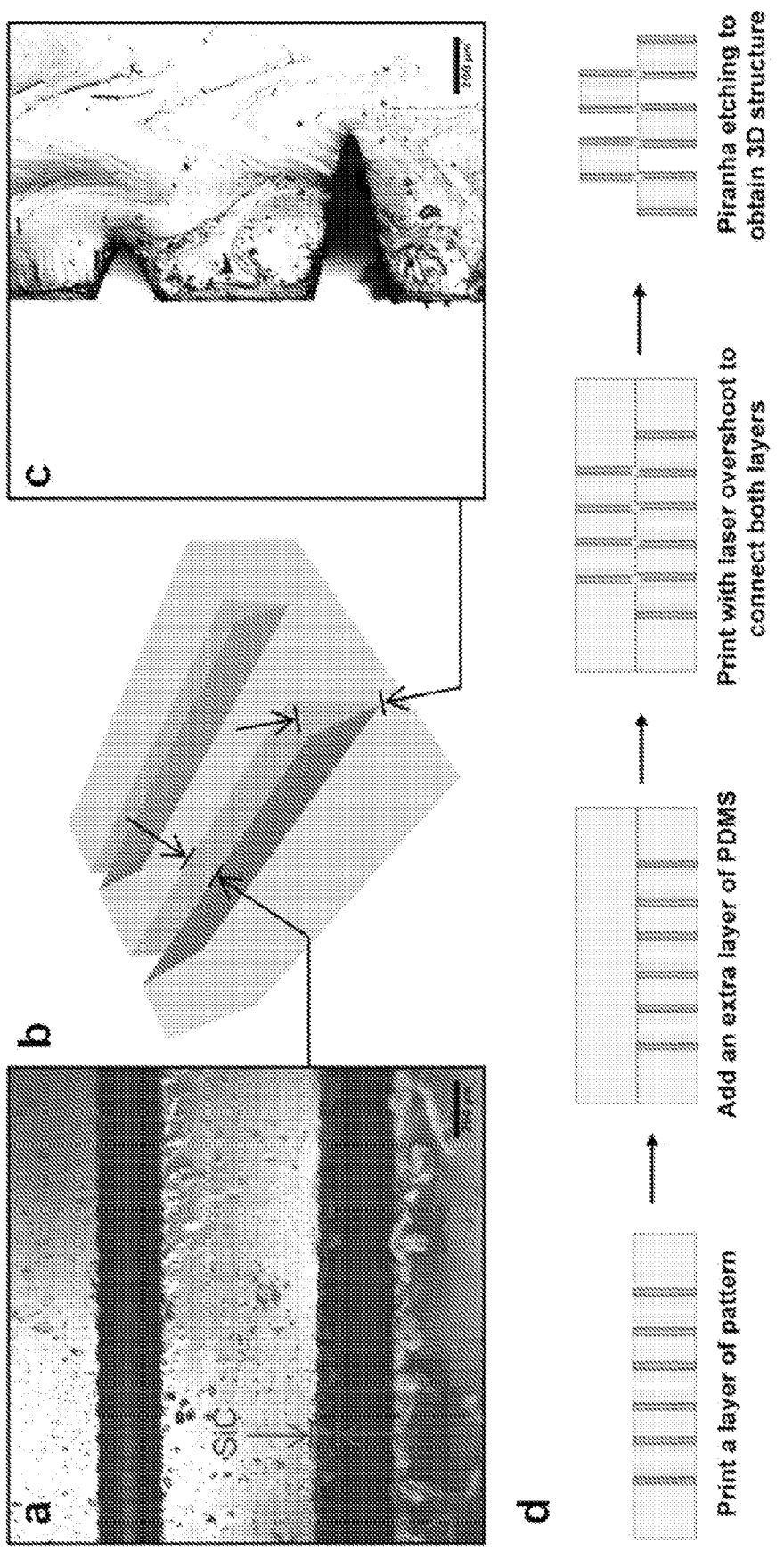

FIG. 27 (*a*)-(*d*) displays the printing resolution and 3D printing methodology according to example embodiments. (a) displays a laser confocal microscopy image from the top of a laser-ablated pattern on PDMS. (b) illustrates a schematic three-dimensional illustration of the laser writing morphology. (c) displays a cross-section of a laser confocal microscopy image of a laser ablated pattern. (d) displays a schematic of a layer-by-laser three-dimensional laser printing process for the creation of integrated structure of silicon carbide.

Figure 28:
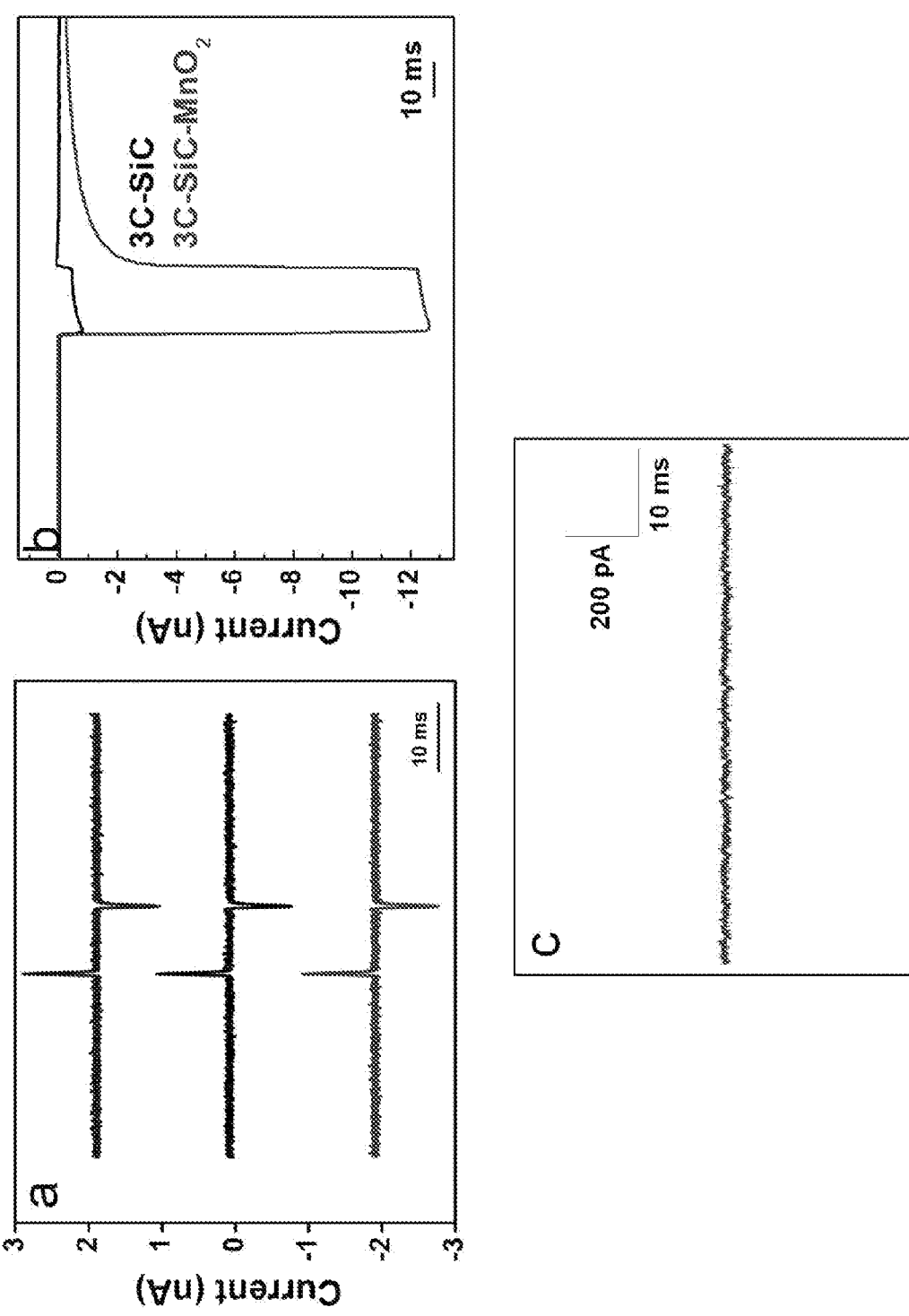

FIG. 28 (*a*)-(*c*) displays the results of photocurrent measurements according to example embodiments. In (a), the photocapacitive response of intrinsic 3C—SiC wafer and its invariance with the bias of current injection is displayed. (b) shows that surface modification of 3C—SiC by $MnO_2$ further enhances the photoanodic oxidation reaction as indicated by the magnitude difference in current. (c) displays the absence of photoresponse from the graphite formed beneath the SiC. (Stimulation: 350 nm/514.5 nm LED with a 10 ms pulse).

Figure 29:
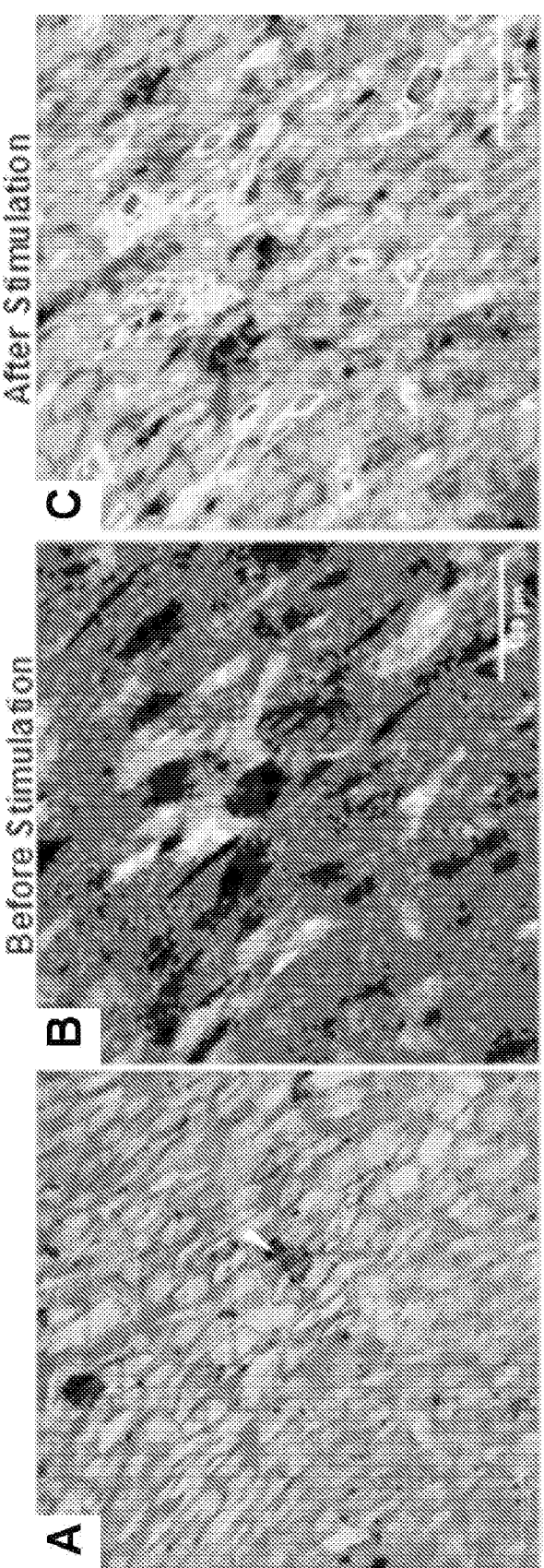
Figure 29:
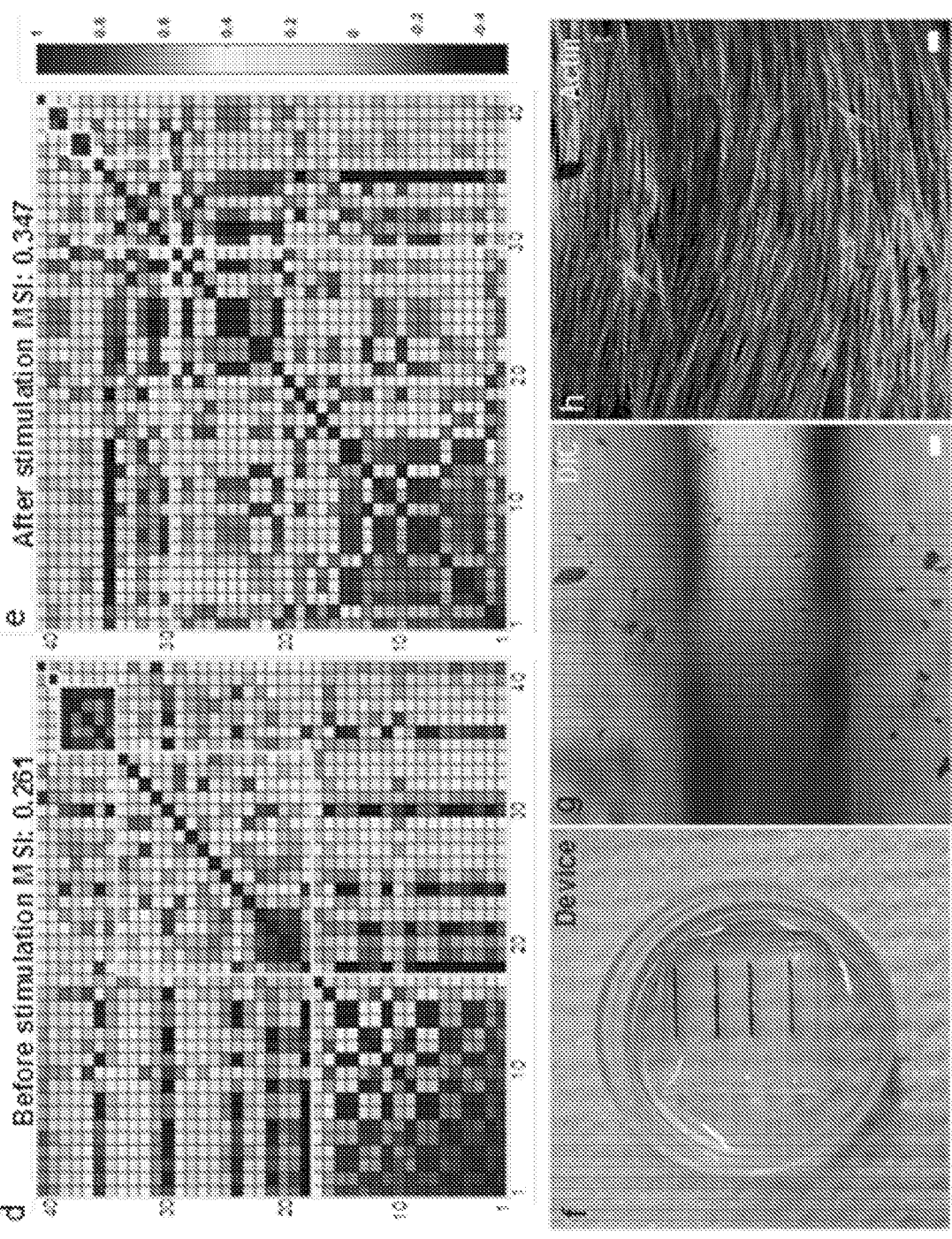

FIG. 29 (*a*)-(*h*) displays the synchronization of smooth muscle cells and their growth on a device according to example embodiments. (a) shows an overlay of calcium and a DIC image showing 3C—SiC particles co-cultured with smooth muscle cells along with the stimulation point indicated as a white arrow. The regions of interest (ROIs) used for synchronization analysis in a and b have been marked (stimulation power: 29 mW, 1 ms pulse). (b) displays a differential calcium image (ΔF/F) of the smooth muscle cell sheet in (a) before stimulation. (c) displays a differential calcium image (ΔF/F) of the smooth muscle cell sheet in (a) after stimulation revealing a global increase in calcium. (d) displays a synchronization matrix of calcium signals before stimulation along with mean synchronization index (MSI) of 0.261. (e) displays a synchronization matrix of calcium signals after stimulation along with mean synchronization index (MSI) of 0.347. (Stimulation Power-29 mW, Pulse: 1 ms). HASMCs are cultured on the device (f) to obtain a uniform film of cells as observed through DIC image (g), Actin immunofluorescence staining (h) and Z-stack (FIG. 3*i* in main manuscript). The red box in (g) indicates the stimulation spot for FIG. 5*g* in main manuscript. Scale bars in (g-h) are 100 μm each.

Figure 30:
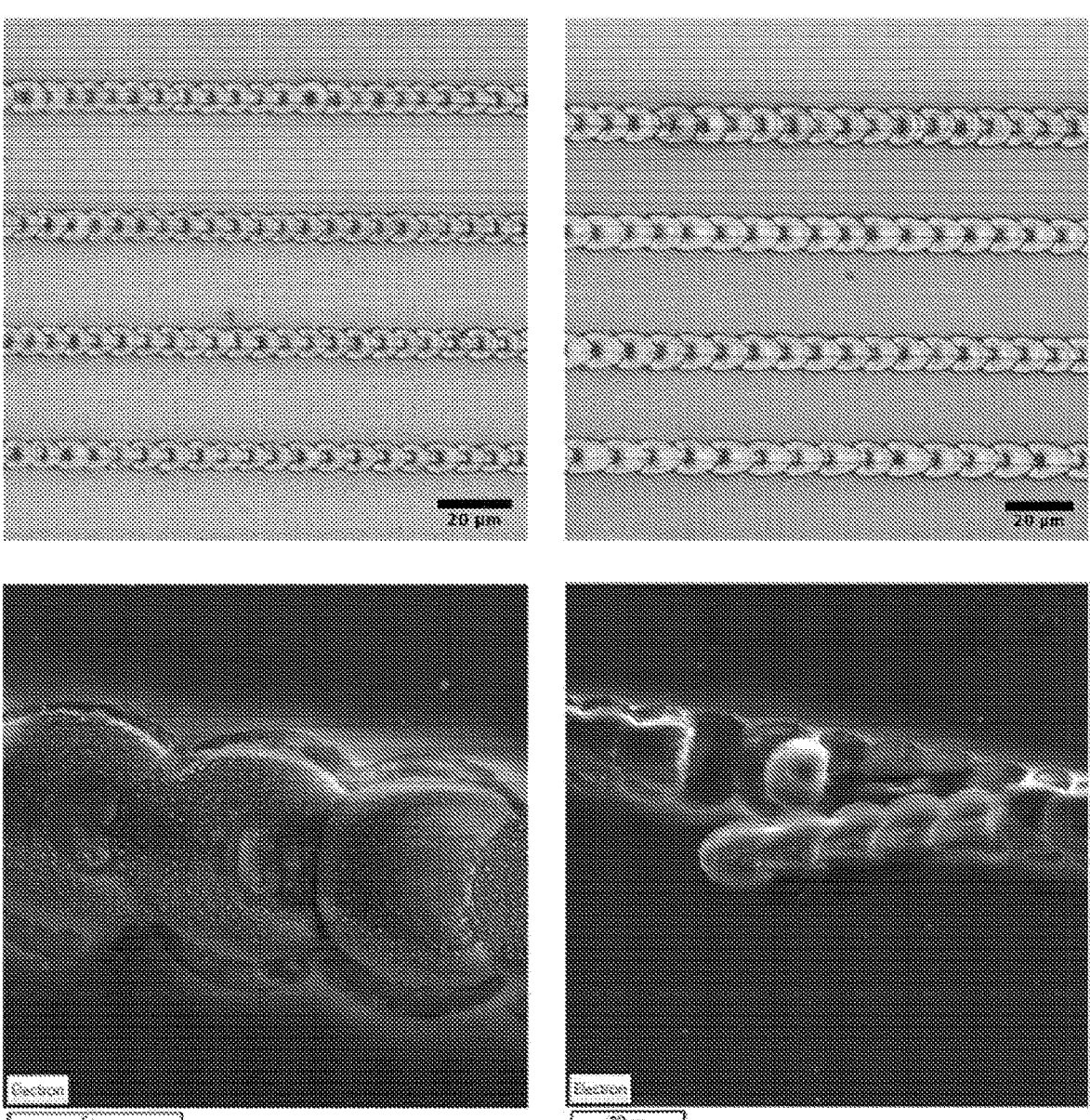

FIG. 30 displays optical micrographs (upper) and SEM images (lower) of irradiated PDMS membranes with a gold membrane deposited on top of the PDMS.

DETAILED DESCRIPTION

Methods to make and using various silicon carbides from a polymer precursor through laser ablative printing techniques are presented. Herein, two- and three-dimensional laser printing of 3C—SiC and 15R—SiC is demonstrated utilizing siloxane polymer as a precursor. The laser-assisted process enables incorporation of dopants from the atmosphere, for example nitrogen, making the electrode capable of exhibiting pseudocapacitive charging. Further, the silicon carbide may be modified by pre-synthetic incorporation of additives, or post-synthetic surface deposition.

According, an aspect of the present disclosure provides for a method comprising: providing a polydimethylsiloxane (PDMS) substrate; and irradiating at least a portion of the substrate with a laser under conditions sufficient to produce silicon carbide comprising 3C silicon carbide (3C—SiC). Novel routes to 3C—SiC synthesis are highly sought. Further, such laser irradiation allows for spatial control of silicon carbide synthesis within the siloxane polymer. PDMS may be prepared by any method as well known in the art. Typically, PDMS synthesis involves contacting a monomer with a curing agent at ambient or elevated temperatures, typically through the hydrolysis of dimethyldichlorosilane in the presence of water, followed by condensation and polymerization. The precursors may be cast onto a supporting substrate, such as glass, and allowed to cure to form a layer. A suitable but non-limiting examples of kits for preparing PDMS according to the present disclosure are available from Dupont Chemical, and sold under, e.g., trade names Sylgard 184 and Sylgard 182. To control elemental doping in subsequent steps, the PDMS polymer may be degassed prior to use.

Additives may also be mixed into the PDMS precursors to result in a modified PDMS material after polymerization. Suitable non-limiting examples of additives include aluminum, gallium, boron, phosphorus, and $MoS_2$. The additives may be provided in any amount that does not substantially inhibit the formation and laser transformation of polydimethylsiloxane. Typically, additives are provided in amounts ranging from 0.00001 wt % to 5 wt %, and are pre-mixed with the monomer or curing agent prior to reaction. After polymerization, a modified PDMS is formed with the additive homogeneously present throughout the polymer matrix. Accordingly, another aspect of the present disclosure provides for a method comprising: providing a $MoS_2$-modified PDMS substrate; and irradiating at least a portion of the $MoS_2$-modified PDMs substrate with a laser under conditions suitable to produce silicon carbide comprising 3C—SiC and 15R silicon carbide (15R—SiC), collectivity M-SiC.

Modification of the PDMS substrate may be accomplished through a variety of means. Ideally, such additives have good stability admixed within the PDMS and are volatile to allow their removal upon laser ablation. $MoS_2$ is an excellent additive given its hydrophobic qualities, allowing it to easily blend with the silicone-based precursor materials. Further, $MoS_2$ may be exothermically oxidized to volatile $MoO_3$ without incorporation into the material. Such transformation has the dual action of removing molybdenum from the composition and also increases the local temperature, allowing manipulation of the synthesis temperature without changing the power input. Accordingly, in certain embodiments as otherwise described herein, the $MoS_2$-modified PDMS substrate is prepared by reacting $MoS_2$ with monomer and curing agent at a ratio of about 10:1:0.5 by weight (e.g., about 4.3 wt % $MoS_2$). Numerous other ratios may be used. For example, in certain embodiments, $MoS_2$ is present in an amount between 0.1 wt % and 10 wt %, or between 1 wt % and 8 wt %, or between 2 wt % and 6 wt %.

In certain embodiments as otherwise described herein, the PDMS substrate may further comprise a gold (Au metal) membrane. For example, in certain embodiments, the gold membrane is coated on top of the PDMS substrate. The gold membrane may be any suitable thickness. For example, in certain embodiments, the gold membrane has a thickness in the range of 2 nm to 20 nm. The gold membrane is advantageously coated on top of the PDMS membrane, and may be deposited through methods known in the art, such as electron beam evaporation or thermal evaporation. Subsequently, if desired, the gold membrane may be removed after irradiation. Accordingly, in certain embodiments as otherwise described herein, the method further comprises contacting the gold membrane after irradiation with a gold etchant so as to remove the gold membrane.

Silicon carbide according to the present disclosure may then be formed through laser irradiation of the PDMS. Suitable irradiation may be performed through a variety of commercial laser sources, including GaAs, Ytterbium YAG, CO, and $CO_2$ laser sources. In certain embodiments as otherwise described herein, the laser has a wavelength in the range of 0.7 μm and 200 μm. For example, the wavelength may in the range of 1 μm and 150 μm, or 2 μm and 100 μm, or 5 μm and 50 μm. In certain embodiments, the wavelength is about 10 μm. The power of the laser may be adjusted based upon the geometrical considerations of the pattern to be formed, and other process considerations such as scan speed and laser spot size. For example, in certain embodiments, the laser power is in a range between 0.1 W and 100 W. In other embodiments, the laser power is in the range of 0.1 W to 50 W (e.g., 0.1 W to 20 W, or 0.1 W to 10 W).

Where a gold membrane is present, it may be desired to select different laser powers and/or wavelengths. Without wishing to be bound by theory, it is presently believed that the gold membrane enhances the irradiation of the PDMS membrane due to a plasmonic effect. The plasmonic effect serves to concentrate the light field so that a much lower laser power can be used to achieve the local temperature required to convert PDMS into SiC. Accordingly, in certain embodiments as otherwise described herein, when the PDMS substrate further comprises a gold membrane, the irradiation is performed with a power in the range of 0.1 mW to 100 mW. Further, as gold absorbs visible light, advantageously lower laser wavelengths may be used, extending even into the visible range. As such, in certain embodiments as otherwise described herein, when a gold membrane is used, the laser may have a wavelength of 0.4 μm to 200 μm. For example, the laser may have a wavelength of 0.4 μm to 100 μm, or 0.4 μm to 50 μm, or 0.4 μm to 10 μm. In particular embodiments, when a gold membrane is used, the laser has a wavelength of 0.4 μm to 1.0 μm, or 0.4 μm to 0.75 μm.

The laser spot size can be adjusted based on the pattern desired. Examples of suitable laser spot sizes include those in a range between 1 μm and 1 mm. Similarly, the laser scan speed may be adjusted according to other process requirements. For example, the laser scan speed is typically in the range between 0.01 mm/s and 10.00 mm/s.

Figure 1:
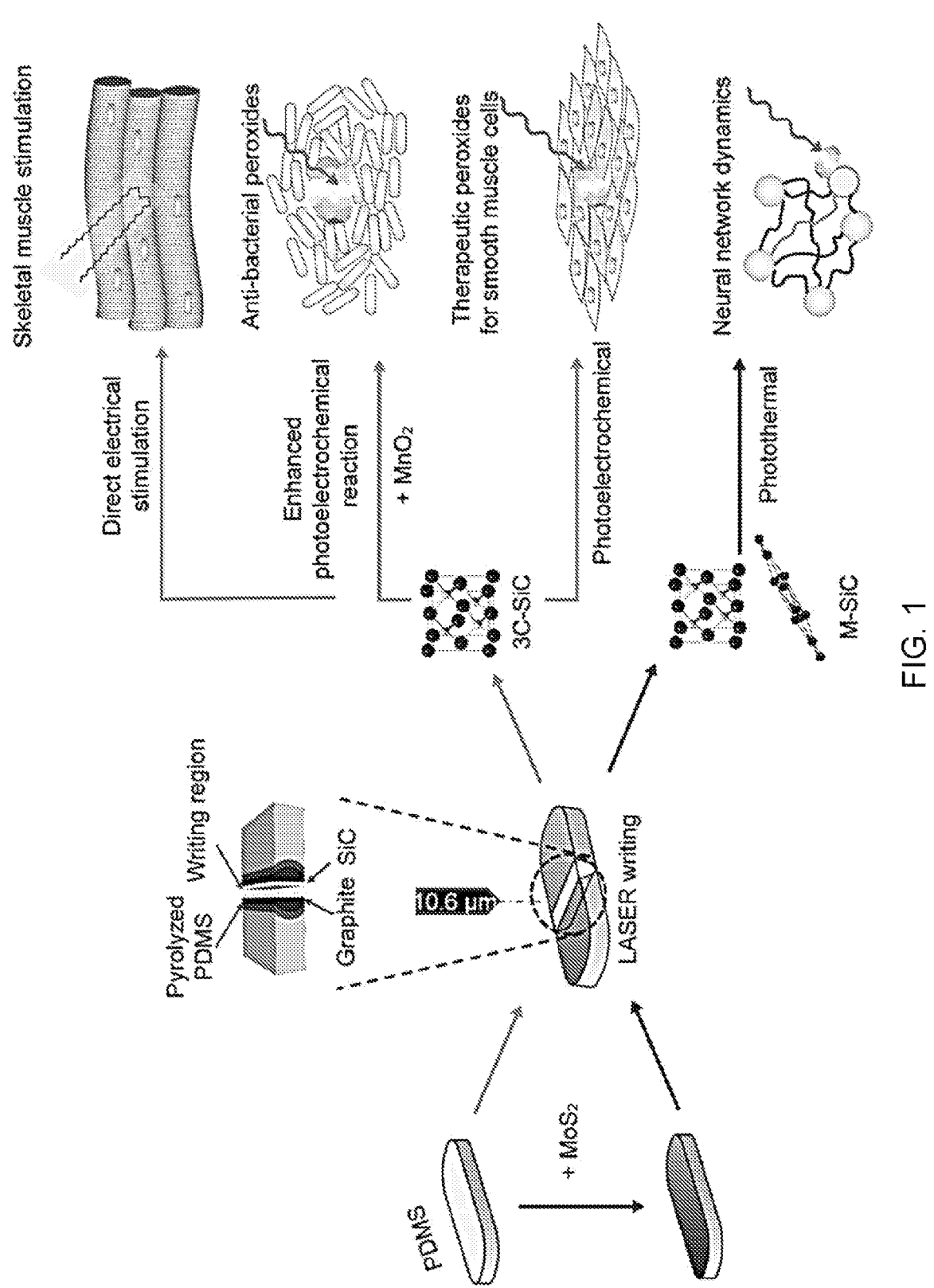
FIG. 1 illustrates a representative synthesis protocol and various applications according to example embodiments. In detail, a schematic illustration shows the emergence of the multi-functionality in a bio-interface from an underlying modification in synthetic methodology. A straightforward synthesis by laser ablation gives nitrogen doped 3C—SiC which can exhibit pseudocapacitive coupling for wired electrical stimulation of skeletal muscles. However, as a free-standing species 3C—SiC electrode can perform photoelectrochemical production of hydrogen peroxide for modulation of smooth muscle cells. Addition of a surface coating of $MnO_2$ by electroless deposition enhances the photoelectrochemical reaction causing the production of hydrogen peroxide to shift to a lethal dosage useful as an anti-bacterial. In contrast, use of a starting material additive like $MoS_2$ tunes the crystal structure and doping thereby generating a photothermal property useful for spatio-temporal neural network modulation. This demonstrates how an additive can tune crystal structure and doping versus the surface functionalization controlling the electrochemistry. Thus, by using a starting material additive and surface functionalization as basic tuning gears, the utility of this laser synthetic methodology is expanded to obtain modified materials with unique properties to suit the stimulation requirements of specific biological systems and pathways.

Without wishing to be bound by theory, the laser ablation is believed to form a temperature gradient. Closest to the laser, a layer of silicon carbide is formed (see FIG. 1, 2, 13). In a next layer, more distant from the center of irradiation, the PDMS is transformed to graphite. As such, the silicon carbide may come to rest on a graphite layer if the PDMS is significantly larger than the laser spot. Accordingly, in certain embodiments as otherwise described herein, the irradiating produces a graphite layer beneath the silicon carbide. Advantageously, the laser printing method of synthesis as described herein can produce high resolution patterns. The printing may be done in points, or by irradiating in a line. If irradiating in a line is drawn, resolution is determined by the width of the line of SiC generated, and the depth of the SiC generated. In general, both the line width and line depth are inversely proportional to both laser power and scan speed, and can be selected by the person of skill in the art in light of the present disclosure (see FIG. 5). For example, in certain embodiments, the line width of the silicon carbide bath is between 1 μm and 1000 μm, or, for example, between 20 μm and 400 μm. In certain embodiments, the depth of SiC generated is between 1 μm and 10,000 μm, or, for example, between 10 μm and 3000 μm.

The silicon carbide of the present disclosure may also be modified by post-synthetic means, such as surface deposition. Of particular interest is the deposition of active materials on the silicon carbide that take advantage of the electronic properties of the silicon carbide, such as the deposition of an electrocatalyst. Of particular interest to biological systems is water oxidation to produce hydrogen peroxide, which may be enhanced by the presence of a water oxidation catalyst. In the vascular system, $H_2O_2$ plays an important role in the modulation of smooth muscle cells. To this end, in certain embodiments as otherwise described herein, the method further comprises depositing $MnO_2$ on the silicon carbide. For example, $MnO_2$ may be deposited on 3C—SiC to form $MnO_2$-3C—SiC. The deposition conditions may be adjusted so as to control the amount of $MnO_2$ deposited on the silicon carbide, and/or selectively deposit $MnO_2$ on a portion of the silicon carbide. $MnO_2$ may then comprise between 0.001 wt % and 1 wt % compared to the silicon carbide layer.

The properties of silicon carbide can be further modified through doping. For example, in certain embodiments, the silicon carbide further comprises nitrogen as a dopant. For example, the nitrogen may be present in an amount ranging from 1 ppm to 10,000 ppm, or 100 ppm to 5000 ppm (e.g., 200 ppm to 4000 ppm, or 500 ppm to 3000 ppm, or 1000 to 3000 ppm). Advantageously, it has been surprisingly found that the gas atmosphere that the laser ablation is conducted in can be incorporated as a dopant. Accordingly, in certain embodiments as otherwise described herein, the irradiation is conducted under an atmosphere of gas. For example, in certain embodiments, the gas is nitrogen or fluorine, or a combination thereof. The gas may further comprise at least one noble gas, for example, the gas may further comprise helium, neon, argon, or xenon. In embodiments where the gas comprises nitrogen, the nitrogen may be present in any volume amount. For example, the nitrogen may be present in approximately atmospheric concentrations (e.g., in an amount between 60 vol % and 90 vol %). In particular embodiments, the nitrogen is present in an amount between 70 vol % and 80 vol %.

A distinct advantage of laser ablative printing is the precise spatial control exercised over the printed area. This control allows for complex two- and three-dimensional structures to be generated within the PDMS polymer, and the polymer may be optionally removed in a subsequent step, or remain as an insulating support. Accordingly, in certain embodiments as otherwise described herein, the irradiation with the laser ablates at least a portion of a surface of the substrate to form a predetermined pattern. The predetermined pattern may be selected to improve the function of the silicon carbide, such as to improve the interface formed with biological tissue, or to allow facile incorporation into a device. Accordingly, an aspect of the disclosure as otherwise described herein is a device comprising a first layer, wherein the first layer comprises silicon carbide as otherwise described herein. Beneath the first layer there may be a second layer, wherein the second layer comprises graphite. The graphite may further comprise silica, or other silicon-containing compounds. In certain embodiments, underneath the second layer is a third layer, wherein the third layer comprises PDMS. At the interface between the second and third layers there may be pyrolyzed PDMS, wherein the PDMS has been partially degraded.

The silicon carbide of the present disclosure may be used directly as crystals (e.g., with any supporting material removed), or may be incorporated into a device. For example, in certain embodiments, the device further comprises a substrate, a connection for applying a voltage, or both. The substrate may be glass, plastic (e.g., a siloxane polymer such as PDMS), graphite (e.g., graphite formed during the laser ablation process), graphene, or a metal such as copper, aluminum, or steel (e.g., surgical steel). In certain embodiments, the substrate is electrically conductive. In other embodiments, the substrate is electrically insulating. In certain embodiments, the substrate possesses high thermal conductivity. Connections for applying a voltage may be conventional wires such as insulated copper or aluminum wires. Other types of wiring, and suitable connections thereof, as commonly used in biomedical practice will be readily apparent to one of skill in the art. As described herein, references to the device of the present disclosure also includes the silicon carbide as otherwise described herein, with or without additional components.

In certain embodiments as otherwise described herein, the device is an electrode. Formation of an electrode comprising the silicon carbide as otherwise described herein may allow direct stimulation of biological tissue. Additionally, the electrode may play a role as a passive sensor, or a dual role of stimulation and sensing. The electrode device may be fabricated to have a spatial array of contacts, allowing a predefined interface with biological tissue or another device. In certain embodiments as otherwise described herein, the device is a surface electrode or a side-wall electrode. Various electrode configurations are enabled by the methods of manufacture of the present disclosure and may be utilized by the person of skill in the art.

The device as otherwise described herein may be used to stimulate muscle tissue. In certain embodiments as otherwise described herein, the disclosure provides for a method of modulating muscle contraction, comprising contacting the device as otherwise described herein with a muscle cell; and stimulating the muscle cell with the device. The contacting with the muscle cell may be through direct contact with the cell, or in close proximity to the cell (e.g., through adjoining tissue or fluid) to enable the stimulation.

The stimulation may be through a variety of means, including application of light to the device, or application of an electrical pulse to the device. It has been found that the silicon carbide as otherwise described herein has a pseudo-capacitive function. Without wishing to be bound by theory, it is believed that this ability allows modulating of muscle tissue through application of an electrical pulse. Accordingly, in certain embodiments, the stimulating the muscle cell with the device comprises providing electrical pulses to the device, thereby providing membrane capacitance to the muscle cell.

Alternatively, the muscle cell stimulation may proceed not through electrical stimulation but rather through chemical stimulation. It is known that quantities of certain small molecules participate in muscle cell signaling and regulation. It has been found that the silicon carbide as otherwise described herein, in certain formulations, can act as a photocatalyst for the production of hydrogen peroxide from water. The hydrogen peroxide may be produced in therapeutic amounts that are not damaging to the cellular tissue but rather serve to regulate cell function. Accordingly, in certain embodiments as otherwise described herein, stimulating the muscle cell with the device comprises providing light pulses to the device, thereby providing a stimulatory amount of hydrogen peroxide to the muscle cell. The hydrogen peroxide may diffuse outward from the silicon carbide (or device incorporating the silicon carbide), contacting one or more cells. The amount of hydrogen peroxide produced may be regulated by the intensity and/or duration of the light pulse, as well as the composition and quantity of silicon carbide provided. It has been presently found that 3C—SiC is able to effectively provide therapeutic amounts of hydrogen peroxide upon light stimulation. Accordingly, in certain embodiments as otherwise described herein, the device for modulating muscle contraction comprises 3C—SiC.

The methods for modulating muscle contraction, either through electrical or light-induced, chemical stimulation, may be beneficial to many different muscle types, including smooth muscle, cardiac muscle, and skeletal muscle. When applied to cardiac muscle, the device as otherwise described herein may function as a cardiac regulator, such as a cardioverter-defibrillator, or as a pacemaker. The device may be used to treat conditions related to abnormal heart function, such as tachyarrhythmia. When applied to smooth muscle or skeletal muscle, the device may be used as a skeletal muscle stimulator in spinal cord injury, or as a sphincter muscle stimulator in peripheral nerve injury patients, or to control vasoconstriction during medical procedures (e.g., trauma surgery). See, for example, Example 3 and Example 8.

The silicon carbide as otherwise described herein may also be designed in certain embodiments to produce hydrogen peroxide in an amount that exceeds a therapeutic dose and is damaging to adjacent cells and tissue. In such embodiments, the silicon carbide or device incorporating the silicon carbide as otherwise described herein may be used to have an antiseptic, antibacterial, or other cleansing effect. Accordingly, in certain embodiments the present disclosure provides for a method for generating hydrogen peroxide, comprising: contacting the silicon carbide produced as otherwise described herein with water: and stimulating the silicon carbide under suitable conditions so as to generate hydrogen peroxide. It has been presently found that at least 3C—SiC and also $MnO_2$-3C—SiC generate hydrogen peroxide upon light irradiation and exposure to water. $MnO_2$-3C—SiC has been found to produce hydrogen peroxide upon exposure to white light in amounts that can be damaging to cells. Accordingly, in certain embodiments as otherwise described herein, the silicon carbide for generating hydrogen peroxide comprises 3C—SiC. For example, in certain embodiments, the silicon carbide is $MnO_2$–3C—SiC. In certain embodiments as otherwise described herein, the hydrogen peroxide is produced in an amount that is damaging to cells. For example, the hydrogen peroxide may serve as a cleaning agent, an antimicrobial, an antibacterial, an antiviral, or an antifungal, or combinations thereof. See, for example, Example 4.

The silicon carbide as otherwise described herein may also be utilized to modulation the activity of neurons and neural networks. In particular silicon carbide formulations as otherwise described herein, the silicon carbide exhibits an efficient photothermal effect, wherein irradiation with light causes the production of heat. The produced heat can be sensed by particular neuronal bodies and be used to effectively regulate their function. Accordingly, in certain embodiments as otherwise described herein, the disclosure also provides for a method of modulating neural activity, comprising contacting a plurality of neuronal cells with the silicon carbide produced as otherwise described herein to form a network having nodes, wherein the nodes comprise neuronal soma; and optically stimulating the node. Accordingly, the present disclosure also provides for a neural network comprising cultured neuronal cells seeded with crystals of the silicon carbide produced as otherwise described herein, wherein the neuronal cells for entangled junctions with the crystals to form a neural network having nodes, wherein the nodes comprise neuronal soma. It has been found that M-SiC (i.e., a silicon carbide comprising both 3C—SiC and 15R—SiC) produced as otherwise described herein has an advantageous photothermal effect. Accordingly, in certain embodiments, the silicon carbide utilized in the method for modulating neural activity, or in the neural network as otherwise described herein, includes M-SiC, or is M-SiC. See, for example, Example 6. Silicon carbide can be present in any amount to elicit this effect. A single silicon carbide crystal with an average diameter in the range of 0.5 to 100 microns may be provided, or a plurality of silicon carbide crystals wherein several crystals are available for each neurons (e.g., in the range of 1 to 100 crystals per cultured neuron). The cultured neurons may have a density in the range of 1000 cells/mL to 50,000 cells/mL. In certain embodiments, the neural network comprising cultured neurons and silicon carbide crystals as otherwise describe herein may form a device, wherein the device is suitable to implantation into animal tissue (e.g., human tissue).

The method of modulating muscle contraction as otherwise described herein may also proceed through a combination of electrical stimulation and light stimulation, wherein at least one of the electrical stimulation and light stimulation provides a source of chemical muscle modulation (e.g., to generate hydrogen peroxide). See, for example, Examples 3-5.

The silicon carbide as otherwise described herein, and also the devices comprised of silicon carbide as otherwise described herein, are stimulated to provide one or more of capacitance, heat, and/or hydrogen peroxide. The stimulation in these embodiments may be electrical. For example, when taking advantage of the pseudocapacitive behavior to stimulate muscle cells, the preferred stimulus is electrical. In other embodiments, the stimulation is light induced. For example, the light stimulation may be pulses of light or continuous illumination. The light stimulation may also be laser light with a narrow distribution of wavelengths, or a non-coherent light source (e.g., a white LED light source). The power supplied depends on the desired amplitude of the effect (e.g., amount of heat generated, amount of hydrogen peroxide desired) and the limitations of the silicon carbide or device.

Examples of methods and systems are described herein. It should be understood that the words "exemplary," "example," and "illustrative," are used herein to mean "serving as an example, instance, or illustration." Any embodiment or feature described herein as "exemplary," "example." or "illustrative," is not necessarily to be construed as preferred or advantageous over other embodiments or features. Further, the exemplary embodiments described herein are not meant to be limiting. It will be readily understood that certain aspects of the disclosed systems and methods can be arranged and combined in a wide variety of different configurations.

EXAMPLES

Materials and Methods

Figure 2:
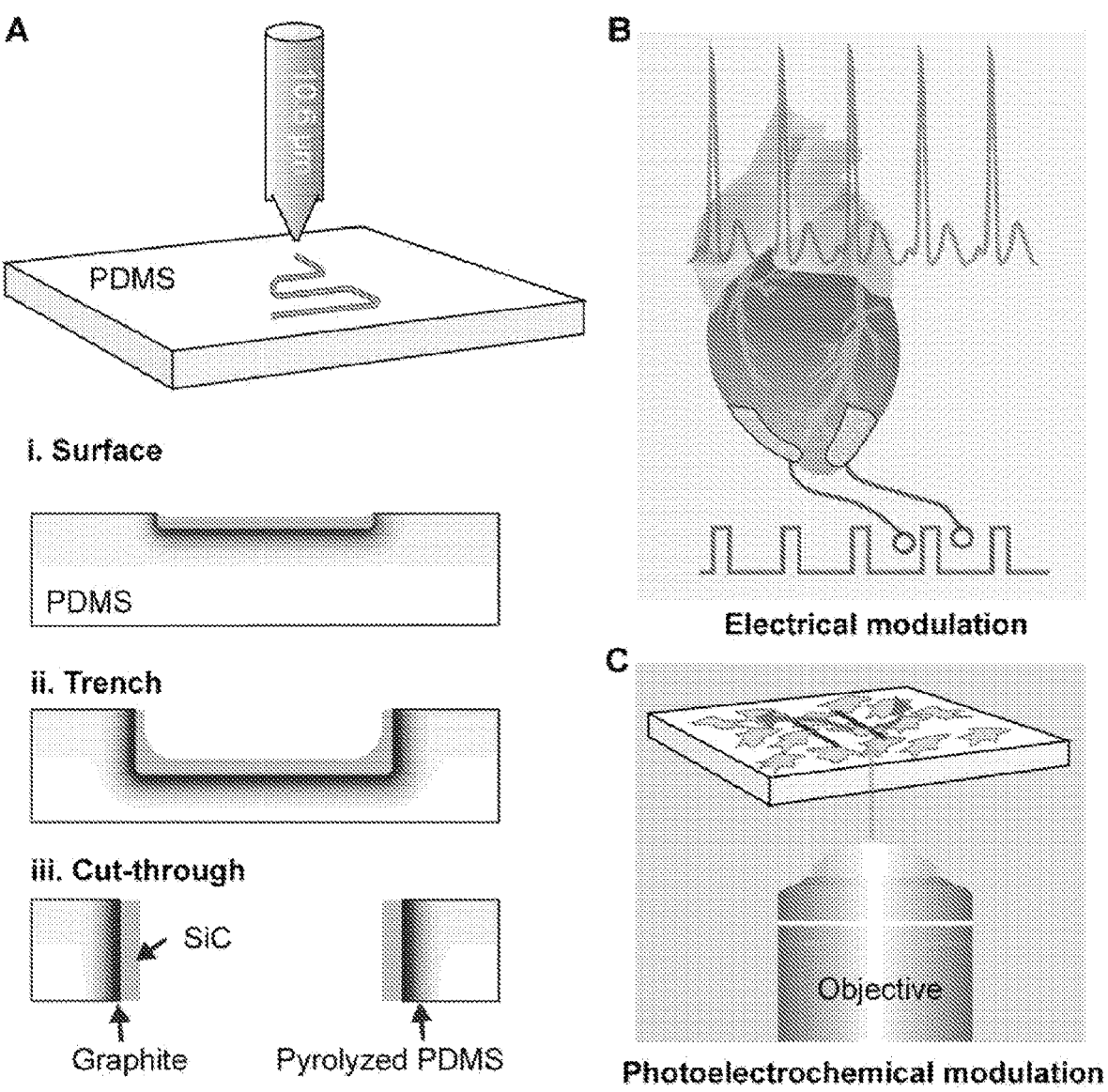
FIG. 2 (a)-(c) are schematic illustrations of the disclosure according to example embodiments. In (a), $CO_2$ laser writing a pattern on a PDMS substrate wherein the pattern can be on the surface (i) or be a trench (ii) or a cut through leading to formation of two distinct pieces. Architectures (i)-(iii) arise as a function of the laser power and writing speed and all of these have a graphite layer beneath the SiC layer by nature of this ablation process. In (b), laser written electrodes are flexible electrodes which can integrate with a heart to stimulate them with electrical impulses leading to its pacing. In (c), laser written circuits can also interface with interconnected cellular ensembles which could be photoelectrochemically modulated by silicon carbide.

Synthesis of PDMS and PDMS-$MoS_2$ Composite:

in this synthetic methodology a pure PDMS slab was placed on a laser cutter platform and ablated by the laser along a line. This ablation converts PDMS to a yellow colored solid with a black solid layer behind it in a direction away from the ablated line (FIG. 2 (*a*)). The yellow solid was characterized as 3C—SiC and the black solid as graphite. Ultimately this ablation along a line creates a SiC-Graphite structure embedded in an insulating PDMS whose geometry depends on pattern of ablation. This structure formation and geometry depends on the printing parameters such laser power and scan speed. Using these tuning gears, we demonstrate two- and three-dimensional (2D and 3D) laser printing of 3C—SiC using PDMS as a precursor. The laser-assisted process enables incorporation of nitrogen as a dopant, making the electrode capable of exhibiting pseudo-capacitive charging and photoelectrochemical effect. Further utilizing manganese dioxide ($MnO_2$) for the surface functionalization enables us to enhance the surface electrochemical activity. This demonstrates that surface modification can be used a post-synthetic modification to expand the material pool from laser synthesis. Ultimately these synthetic strategies hold the potential to design materials for specific biological modulation.

PDMS was prepared using commercially available Sylgard 184 kit (Dupont). The polymer and curing agent were mixed in 10:1 ratio by weight and degassed in vacuum, Following the degassing process, they are cured in a vacuum oven at 80° C. for at least 8 hours. For PDMS-$MoS_2$ composite preparation the polymer, curing agent and bulk $MoS_2$ powder (Sigma Aldrich)(10:1:0.5 ratio by weight) were mixed into homogenous mixture by a magnetic stirrer. This was followed by vacuum degassing and curing at 80° C. for 8 hours. Samples were always re-prepared in case of defects arising due to improper degassing.

Laser Ablation of PDMS to SiC:

PDMS layers were mounted on an aluminum comb (With a supporting layer of glass or polystyrene petridish) and laser written with a $CO_2$ laser of 10.6 μm wavelength, up to a power of 50 W (VLS 460 manufactured by Universal Laser Systems) with a 100 μm spot size. The pattern for writing was generated as a vector image in Corel draw and printed using VLS 460 software. The writing was done in vector cutting mode with parameters for crystal structure and property analysis being 100% power (SOW), 1000 points per inch and 0.254 mm/s speed. However, for pattern printing the power is lowered to 5% (SW) and 0.254 mm/s speed. (Warning: Using no supporting layer or thin samples of PDMS would cause laser to hit the aluminum comb below and melt and even contaminate the samples). Depending on the power of the laser the PDMS sample may be cut across with regions of SiC on either side. For circuit printing it was preferred to use lower power (5%) to provide the circuit as a thin layer. For crystal structure and bulk analysis, full power (100%) was used to have a larger quantity of sample converted. The power only affects conversion along the vertical direction. It does not affect the horizontal or vertical composition of transformed material.

Processing SiC for Characterization and Analysis:

Samples prepared with 100% power were generally used for crystal structure and property analysis and for direct integration with cells via dispersion of these crystals in growth media. However, before these processes are carried out the purification process of these crystals are done. The SiC along with the graphite layer formed is cut out from the PDMS matrix using a razor blade. This is followed by washing the sample in toluene (Fisher scientific) for 5 minutes to remove any organic components present in the material. Following this the sample is kept immersed in isopropyl alcohol (Fisher scientific) and then in De-ionized (DI) water for 5 minutes each. After this sequential washing process they are dipped in 1:1 HF:HNO$_3$ (Sigma Aldrich) to remove any silica and surface organics for 5 minutes. Once this is completed the samples are washed in DI water, nitrogen blow dry and oxygen plasma cleaned at 200 W for 3 minutes (PE-100 Benchtop Plasma System). After the final step the SiC synthesized from pure PDMS would appear yellow and the one with MoS$_2$ would appear light green.

Electroless Deposition of Manganese Dioxide:

Electroless deposition on purified clean SiC surface was carried out by a solution of 0.25 M KMnO$_4$ (Sigma Aldrich) in 0.5 M H$_2$SO$_4$ (Sigma Aldrich). The samples were washed in water and ethanol (1:1) mixture and then kept dipped in the above mixture for 10 minutes. The samples were then washed in water and nitrogen blown dry.

X-Ray Scattering Studies:

Off-axis wide angle x-ray scattering (WAXS) was carried out on SAXS LAB Ganesha with a Cu K-alpha radiation source and 50 μm spot size. The SiC crystals from the top layer are scratched off using a clean sharp tip TEM grid handling tweezer and the resulting crystal powder loaded onto a captone tape. The captone tape is mounted on a holder from which X-rays are scattered through the crystals onto a detector.

Electron Microscopy and Sample Preparation:

Sample prep for TEM, STEM and EELS: According the procedure above, the crystals are scratched using a tweezer and the resulting powder loaded into a resin mold. The mold is then filled with epoxy resin and degassed in vacuum and baked at 60° C. overnight for embedment. The crystals are then microtomed (Leica UC6) into 100 nm sections and loaded on 200 mesh copper grids. The grids were stored in a vacuum desiccator. Transmission electron microscopy and selected area electron diffraction (SAED) patterns were collected on a JEOL 3010F operating at an accelerating voltage of 300 kV with a LaB$_6$ filament. Scanning Transmission Electron Microscopy (STEM) and Electron energy loss spectroscopy (EELS): STEM and EELS were done on a JEOL ARM 200CF (Cs corrected) with a field emission gun at an accelerating voltage of 200 kV. STEM and EELS measurements were done on each area after a 200 kV, 30 min beam shower at the spot to remove any adsorbed hydrocarbon contaminants. EELS was collected using a Gatan dual EELS detector at magic angle. Scanning Electron Microscopy, EDS and Electron backscattered diffraction (EBSD) were all done on TESCAN LYRA3 system equipped with Dual Oxford Instruments X-Max-80 silicon drift x-detectors for EDS and Oxford Instruments NordlysMax2 EBSD detector. The EBSD patterns were processed and indexed using Oxford AZTEC software.

Indexing of SAED and FFT Patterns:

3C—SiC and 15R—SiC structures were generated in Crystal Maker 2.0 using existing reported structures and the indexing of patterns were carried out using Crystal Diffract 2.0.

X-Ray Photoelectron Spectroscopy (XPS) and Ultraviolet Photoelectron Spectroscopy (UPS):

XPS and UPS were performed on Thermo Scientific ESCALAB 250Xi equipped with an electron flood gun and argon ion sputter gun. The XPS measurements were done using an Al K-alpha X ray source of 1.487 keV energy and the spot size of 500 μm in diameter. The UPS measurements were done using a He I source of UV radiation of 21.2 eV energy and the spot size of 3 mm in diameter.

Atom probe tomography (APT) and sample preparation:

SiC crystals were sputter coated with 50 nm nickel to prevent charging during focused ion beam (FIB) milling process. The crystals were then milled into a small lamella on FEI Helios. These lamellas were transferred to silicon microposts using a micromanipulator and milled down to needles for atom probe tomography. These needles were then mounted into a LEAP 400× Si (Cameca) and charged to a potential between 1 to 6 kV. Following this the surface atoms were evaporated using 355 nm laser pulses of 30 pJ at a frequency of 250 kHz in a chamber maintained at 30 K and 2×10-11 torr. The three-dimensional structures were reconstructed and analyzed using Cameca's integrated visualization and analysis software (IVAS) 3.4 code.

Photocurrent Measurements:

Photocurrent measurements were performed by single channel voltage clamped recordings on a patch-clamp amplifier (Axopatch 200B) set up. The material of interest was immersed in 1×PBS (Fisher Scientific) in a petridish and focused on using a microscope (Olympus BX61WI) with a water immersion lens (20×/0.5 NA). Light pulses were delivered through the microscope from two different sources: (a) 375 nm LED source (Thorlabs M37514, ~500 μm spot size) and (b) 532 nm laser (Laser glow, diode-pumped solids state laser, ~5 μm spot size). Light pulses were delivered to these light sources using a digitizer (Molecular devices, Digidata 1550). For measuring the photocurrent measurements glass pipettes of ~1 MΩ were pulled (Sutter Instrument, P-97) and their tip lowered and focused onto the same optical plane (Gap of ~2 μm) as the material surface before the stimulation pulse is applied. The voltage clamped currents were recorded in parallel with the stimulation pulse at various holding current levels. This data was analyzed and the nature of the photocurrents determined using a previously developed method. For analysis of photothermal currents the same pipette used for recording was calibrated for its resistance as a function of temperature. For this measurement the pipette was dipped in pre-heated PBS at approximately 50-60° C. and allowed to cool down naturally as the resistances were recorded alongside temperature, using a thermocouple.

Photoluminescence Measurements:

Raman measurement of photoluminescence from SiC was performed for laser written patterns and crystals to understand the presence of defect related emissions present in the system. The PL measurements were done using a 473 nm excitation laser with detection in a back-scattered geometry with a 50×/0.5 NA objective and 600 grooves/mm grating, under ambient conditions. Point spectra were collected for crystals and mapping was done on patterns which were laser-printed. The instrument used for measurements were on a Horiba LabRAM HR Evo Confocal Raman.

Fluorescence Kinetics:

Fluorescence kinetics experiment was carried out with SiC crystals to understand the photo redox species produced in solution. To understand the production of hydrogen peroxide Amplex Red peroxide/peroxidase kit was used according to the manufacturer's instructions. In order that the same excitation is used for the dye emission and the photoanodic process, the crystals are attached or suspended facing the excitation source and on the edge of the cuvette as illustrated in the photograph below such that all the fluorescent signal is transferred to the detector at 90 degree without any obstruction. The beam of the spectrometer is a rectangular one with ~0.21 cm² area.

Electrochemical Measurements and I-V Characteristics:

A purified piece of graphite-SiC layer was isolated and attached to a wire using conductive silver paste on the graphite side. The wire, contact and the graphite side along with edges were sealed using nail polish or epoxy and dried overnight such that only the SiC crystals are exposed to the electrolyte. The projected area of the SiC crystals exposed were ~0.09 cm², standard glassy carbon (CHI104) electrode was ~0.07 cm² and that of undoped 3C—SiC wafer (MTI corporation-SiC-3CP-a-4-13-05050525-2.2) was 0.25 cm². Cyclic voltammograms (CV) were carried out at 200, 100 and 50 mV/s scan rates from –0.7 V to 0.0 V in IX PBS on a Bio-Logic SP-200 potentiostat. The current was scaled with respect to the area of electrode and the area in a cycle of CV estimated by integration in Origin Pro 8.0. Further the differential capacitance of the electrode was calculated using the equation $\partial C/\partial A=(1/f\Delta V)\int J\ dV$. Where J is the current density, V the potential, f the scan rate, $\Delta V$ the potential window of scan. The I-V characteristics are measured by a Keithley source meter 2636A. Electrochemical impedance measurements were done from 3 MHz through 1 kHz with ten points per decade and ten averaging cycles per measurement. The Nyquist plots were fit using a Randles circuit to obtain the resistance of charge transfer.

Muscle Stimulation Experiment:

Device fabrication: A PDMS film was prepared with a thickness of 100 μm on slide glass by spin coating followed by curing at 100° C. for 30 min. The PDMS film is mechanically peeled off and transfer on to acrylic. For conversion of PDMS to SiC, laser scan with a predefined pattern at 100% power (50 W), 1000 points for inch and 0.254 mm/s speed. Remove residual PDMS film by mechanical peel-off or chemical etching. The residual part could be removed with piranha treatment for 2 hours, and then the native oxide etched with HF treatment for 10 min. To remove amorphous debris, the sample can be treated with O2 plasma (200 W, 10 min) and HF and HNO₃ mixed solution (1:1, 2 hours). Silver paste or solder can be used to make a connection with wires, and PDMS solution added onto the connection points and cured at 115° C.

Animal experiment: An adult rat is anesthetized using ketamine (60 mg/kg)/xylazine (5 mg/kg) cocktail. A cut is made on the rear dorsal skin and the device and probes inserted onto a skeletal muscle. Using a pulse generator an input square pulse of 3 V (Measured with respect to 0 V ground) is applied into the rat's muscle between the SiC device and an electrode. The recording of stimulation current as a consequence of the direct electrical stimulation is done between an electrode and ground attached to the same muscle. The recording signal electrode was connected to a digitizer (Molecular devices, Digidata 1550) for read out.

Human Aortic Smooth Muscle Culture:

Primary human aortic smooth muscle cells were purchased from ATCC (ATCC PCS-100-12) and cultured in Medium 231 (Life Technologies) 500 mL of which is supplemented with 25 mL growth supplement (SMGS) (Life Technologies) and 50 μg/mL of sodium L-ascorbate (Sigma Aldrich) for extracellular matrix secretion. The cells were seeded at a density of $1.25\times10^4$/mL and used within the first three passages. The glass and PDMS surfaces were coated with collagen before seeding. The PDMS surfaces were oxygen plasma cleaned at 200 W for 10 minutes immediately before seeding collagen to make the surface hydrophilic.

Isolated Heart Stimulation Experiment:

Device fabrication: A PDMS film was prepared with a thickness of 100 μm on slide glass by spin coating followed by curing at 100° C. for 30 min. The PDMS film is mechanically peeled off and transfer on to acrylic. For conversion of PDMS to SiC, laser scan with a predefined pattern at 100% power (50 W), 1000 points for inch and 0.254 mm/s speed. Remove residual PDMS film by mechanical peel-off or chemical etching. The residual part could be removed with piranha treatment for 2 hours, and then the native oxide etched with HF treatment for 10 min. To remove amorphous debris, the sample can be treated with O2 plasma (200 W, 10 min) and HF and HNO3 mixed solution (1:1, 2 hours). Silver paste or solder can be used to make a connection with wires, and PDMS solution added onto the connection points and cured at 115° C.

Animal experiment: All animal procedures were conducted in complete compliance with and approval from the University of Chicago IACUC Animal Care and Use Protocol. Adult rats (CD) were heparinized via IP injection (1,000 IU/kg) and an open-drop exposure to isoflurane in a bell jar configuration was used for anesthesia. The chest was opened and the hearts were immediately excised and placed in ice cold HBSS buffer. The aorta was cannulated in preparation for use in a Langendorffsetup. Oxygenated HEPES-buffered Tyrode's solution (containing, in mM, NaCl 126, KCl 5.4, Glucose 10. Hepes 10, MgCl₂ 1, CaCl₂ 2, MgSO₄ 1.2, NaH₂PO₄ 0.39: bubbled with 99.5% O₂; pH titered to 7.3 by 2M NaOH) was perfused through the cannulated aorta. The perfusion was passed through a heating coil and bubble trap (Radnoti), and the hearts were placed in a water-jacketed beaker (Fisher Scientific) to maintain the temperature at 37° C. The perfusion pressure, which was monitored using a BP-100 probe (iWorx), was set to 80-100 mmHg by an I.V. bag set at an appropriate height. A water filled balloon was inserted to the left ventricle and connected to a BP-100 probe (iWorx), to monitor left ventricular pressure (LVP). For ECG recordings, needle electrode was positioned on the apex and the aorta was clamped and connected to a C-ISO-256 preamplifier (iWorx). All recordings (ECG, LVP and perfusion pressure) were amplified using an IA-400D amplifier (iWorx) and interfaced with a PC using a DigiData 1550 digitizer with pClamp software (Molecular Devices). To lower the heart rate, the atria were removed. Then, two PDMS devices with SiC patterns were positioned on the left and right ventricular wall and connected to an isolated constant current generator (SI-100R, iWorx) and a waveform generator for heart pacing. ECG and LVP recordings were used to assess beating frequency of the hearts before and during the stimulation.

Particle Level Bio-Interface Studies:

For bio-interface studies with 3C—SiC the crystals are scratched out from the graphite layers and washed in 100% ethanol. They are then sterilized and dried overnight under a UV lamp in a bio-hood. The crystals are then re-dispersed in the complete media of the required cell type by bath sonication. The media is then changed for the required culture to the one with dispersed SiC within 24 hrs of the initiation of the culture and stimulation experiments performed within the next 24 hrs after this.

Dorsal Root Ganglial (DRG) Neuronal Network Culture and Bio-Interface Studies:

Dorsal root ganglias were harvested from P0-P3 Sprague-Dawley rat pups into ice cold DMEM/F12 (Thermo Fisher 11320033). The ganglias were then digested in 2.5 mg/mL trypsin (Worthington TRL3) in EBSS with no Ca/Mg (Thermo Fisher 14155063) for exactly 20 minutes in a 37° C. shaker incubator. The ganglias were then centrifuged at 1500 rpm for 2 min and separated from trypsin and resuspended in EBSS with 10% FBS. The ganglias are mechanically triturated using fire polished pasteur pipettes of decreasing sizes and centrifuged down at 1500 rpm for 2 min. After removing the supenatant the cells were resuspended in complete media (DMEM/F12 with 1% pen-strep, 5% FBS along with 20 PM 5-fluoro uracil (Sigma Aldrich) and 50 ng/mL of NGF 2.5S (Thermo Fisher). The glass bottom dishes for seeding are covered with 0.01% poly-L-lysine in molecular biology grade water for 20 min, washed with water and aspirated dry with vacuum. The cells are seeded on this dish according to required concentration. For bio-interface studies with M-SiC the crystals are scratched out from the graphite layers and washed in 100% ethanol and dried overnight under a UV lamp in a bio-hood. The crystals are then re-dispersed in the complete media by bath sonication. The media is changed for the DRG culture network to the one with M-SiC within 24 hrs of the initiation of the culture and stimulation experiments performed within the next 24 hrs after this.

Immunofluorescence Staining:

The cell cultures were fixed with 4% paraformaldehyde in PBS for 10 minutes and then washed in PBS thrice. Following this they were permeabilized with 0.5% Triton X-100 for 10 minutes and washed in PBS thrice. After the cells are fixed and permeabilized they were incubated in a blocking solution of 3% BSA in PBS for 60 minutes following which 2 drops/mL of ActinGreen 488 Ready-Probes (Invitrogen) was added to the blocking solution. The solution was incubated for another 30 minutes with the actin stain before washing and imaging in PBS.

Calcium Imaging:

Calcium imaging was done using Fluo4-AM (Invitrogen) which was made into a 50 μM stock solution in Pluronic F-127 which is in 20% DMSO (Invitrogen). Cell were incubated with 2 μM Fluo4-AM in media for 30 minutes and washed post-incubation with media. The cells were further incubated for 15 minutes in media before beginning imaging. The calcium imaging was carried out at a rate of 3.8 Hz with a resolution of 512×512 pixels per frame on a LEICA SP5 STED-CW confocal microscope in a 37° C. incubator.

Confocal Stimulation Experiments:

Point stimulation experiments were carried out in the FRAP mode of a LEICA SP5 STED-CW confocal microscope with a 592 nm laser. The stimulation was done for 1 ms and at varying powers.

SEM Imaging of Dorsal Root Ganglial (DRG) Networks:

DRC networks culture were fixed in 2.5% glutaraldehyde in PBS (pH=7.2) over night. Then washed in a series of increasing concentration of ethanol each for ten minutes, beginning 20% in water till 100%. The samples are then critical point dried (Leica EMCPD300). The samples are then sputter coated with 8 nm platinum and palladium, following which they are imaged on a Carl Zeiss Merlin SEM at 2 kV.

Neural Network Data Analysis:

The neural network calcium data was analyzed using LASX (Leica application software). The regions of interest (ROIs) were marked to identify the neuronal soma and the calcium traces extracted from it. The raw calcium traces were further processed to ΔF/F for each soma in the neural network. The ΔF/F data was then smoothed using a savitzky-golay filter and baseline corrected for bleaching effects using a convex-envelope method on Peak Caller software package. The processed ΔF/F curves were further processed on Peak Caller for generating the synchronization matrices, mean synchronization index, calcium waveforms and raster plots. Peak Caller package was run on MATLAB R2018b engine.

Smooth Muscle Stimulation Data Analysis:

The smooth muscle calcium data was analyzed using LASX (Leica application software). The regions of interest (ROIs) were drawn around smooth muscles identified across regions near and away from stimulation. The raw calcium traces were used to study bio-physical understanding of peroxide induced perturbations on calcium oscillations. For device stimulation studies the calcium channels videos were converted into tiff stacks using Fiji-ImageJ. The stacks were then converted into ΔF/F image and the surface plots generated on Fiji-ImageJ. The ΔF/F data was then baseline corrected for bleaching effects using a convex-envelope method on Peak Caller software package (47). The processed ΔF/F curves were further processed on Peak Caller for generating the synchronization matrices, mean synchronization index, calcium waveforms and raster plots. Peak Caller package was run on MATLAB R2018b engine. Phase synchronization is advantageous as it is time-resolved and only sensitive to phases and not the amplitude. If there are two continuous-time calcium signal x(t) and y(t) then one would need to determine their instantaneous phases φr and φr respectively. This is done by taking the Hilbert transform of the continuous-time signal given by $$\tilde{x}(t) = \frac{1}{\pi} \int_{-\infty}^{\infty} \frac{x(t')}{t - t'} dt'.$$

The Hilbert phase can be obtained by $$\tan^{-1}\left(\frac{\tilde{x}(t)}{x(t)}\right).$$

Once the Hibert phase is obtained the mean synchronization index can be calculated between every neuron pair for N time steps as $$\left| \frac{1}{N} \sum_{j=1}^{N} e^{i(\varphi_x(t_j) - \varphi_y(t_j))} \right|.$$

The values of mean synchronization index vary between 0 and 1, one being the most synchronized and zero the least.

Anti-Bacterial Experiments:

*Escherichia coli* (*E. coli*) MG1655 was obtained from the American Type Culture Collection (ATCC). *E. coli* was cultured to log phase in Luria-Bertani (LB) media and harvested by centrifugation at 3000 rpm. Following which it is washed twice with Phosphate Buffered Saline (PBS) and suspended in LB medium, PBS or deionized (D) water to ~106 c.f.u. ml-1 separately. The 3C—SiC—MnO$_2$ crystals were then added to this bacteria culture and mixed uniformly. Photocatalytic disinfection was performed using a white light-emitting diode of 5 mW power for 24 hrs. Bacteria concentrations were then measured after 24 h illumination using standard spread-plate techniques. Each sample was serially diluted and each dilution was plated in triplicate onto LB plate and incubated overnight at 37° C. The experiments for the disinfection were also conducted in duplicate with 3C—SiC—$MnO_2$ under dark conditions (Control 1) and without 3C—SiC—$MnO_2$ under LED light illumination (Control 2).

Example 1: Structural Characteristics of SiC

To understand the crystal phases of SiC formed from PDMS and the PDMS-$MoS_2$ composite, the isolated crystals were characterized with wide-angle X-ray scattering (WAXS) and electron diffraction techniques. WAXS of SiC obtained from pure PDMS revealed a single phase which can be indexed to the 3C polytype of SiC (3C—SiC) (FIG. 10, (a)), whereas the one obtained from a PDMS-$MoS_2$ composite revealed a mixed phase (M-SiC) of both the 3C and 15R polytypes (FIG. 10, (b)). However, specific spots on the sample produced a pattern corresponding to pure 15R polytype, suggesting that separation of large phase domains is evident with $MoS_2$ addition (FIG. 10, (c)).

Similar information was obtained from high-angle annular dark-field image in scanning transmission electron microscopy (HAADF-STEM) (FIG. 4, (c) and (f)) and from indexed selected area electron diffraction (SAED) (FIG. 4, (b) and (e)) performed on microtomed crystal sections (FIG. 4, (a) and (d)). HAADF-STEM revealed a porous graphitic structure underlying the SiC crystal (FIG. 3 (a)). Electron diffraction performed on a microtome section (FIG. 3 (e)) reveals a pattern indexing to [011] zone of 3C—SiC (FIG. 3 (c)). X-ray scattering revealed peaks indexing to 3C—SiC (FIG. 3 (e)) along with stacking faults and a weak graphite (002) peak from the layer beneath. Similar corroborative information was obtained from HAADF-STEM lattice imaging (FIG. 3 (e)). Furthermore, electron backscatter diffraction (EBSD) point analysis done on various ensembles of crystal grown at an ablation site in PDMS confirmed a purely cubic phase across the surface, (FIG. 11, (a)-(g)). A statistical analysis of multipoint EBSD phase analysis on various batches of SiC from PDMS-$MoS_2$ composite resulted in approximately ~66% 3C polytype, 30% 15R polytype, and 4% 4H polytype (FIG. 11. (a)-(g)). This phase mixing and separation could be attributed to the highly exothermic oxidation experienced by $MoS_2$ to form a highly volatile $MoO_3$ during the laser ablation process. Such a strong exothermic reaction would create temperature instabilities causing some re-crystallization of the initially formed phases to provide rhombohedral and hexagonal phases.

To further analyze the composition of the crystals, atom probe tomography was performed on 3C—SiC and M-SiC samples. The composition analysis revealed the presence of nitrogen doping in both structures along with an absence of molybdenum in M-SiC. Further reconstruction and profiling of nitrogen along the depth of an atom probe tip produced constant average nitrogen doping of ~200 ppm in 3C—SiC (FIG. 4, g). This nitrogen doping happens as a high temperature laser ablation reaction can facilitate gas phase doping of nitrogen from ambient (19). Furthermore, the temperature gradient from laser ablation was also observed to affect the chemical conversion of PDMS to SiC as regions far from point of ablation formed a graphite layer beneath the SiC. However, M-SiC showed a ten-fold increase in the doping concentration along with a gradation along the depth of the atom probe tip (FIG. 4, (g)). Given that, the atom probe tip is fabricated (FIG. 13) such that its pointed edge is from the surface and its base from the interior with respect to the ablation point. The temperature increases with $MoS_2$ superposes on an existing temperature gradient leading to enhanced energetics for increased nitrogen doping from the atmosphere following this gradient, compared to the case without $MoS_2$ (FIG. 14). It is evident that the superposition of an exothermic reaction onto an existing temperature gradient assists in changing the doping concentration. This is supported by the fact that molybdenum is a nitrogen-fixing catalyst and that following its catalytic action it is removed as a highly volatile $MoO_3$, causing limited interference with the material structure and properties. Furthermore, the temperature gradient from laser ablation was also observed to affect the chemical conversion of PDMS to SiC as regions far from the point of ablation formed a graphite layer beneath the SiC (FIG. 13). Thus, from a device design standpoint, such temperature gradients are beneficial in creating semiconductor-metal interfaces with graded doping.

Example 2: Two- and Three-Dimensional Printing

It was sought not only to understand the structural properties of the material, but to explore the utility of this technique in 2D and 3D printing. As a pre-patterning test, the role of laser power was explored and the number of points per inch in controlling the average crystallite sizes (FIG. 9). The test suggested cut-off parameters for synthesis and a significant control on crystallite sizes with laser power and number of points per inch. There exists a sharp cut-off value for power and scan speed below which no 3C—SiC is formed, suggesting the control of power density on initiating nucleation of 3C—SiC. Within the range of parameters which allow formation of 3C—SiC we further study the role of printing parameters on resolution. The horizontal and vertical resolution as a function of printing parameters was obtained by measuring the size of SiC layer formed under those conditions using confocal laser microscopy (FIG. 5 (a), 5 (b). Thus, after the nucleation of 3C—SiC, the power density of the laser spot further controls the crystal size and spatial spread (growth and resolution. These studies suggest us how the resolution could be potentially further improved by using better optical methods, towards a future in manufacturing. With this information, the laser writing techniques may be used for printing fine patterns or circuits. Any painting or pattern (e.g., FIG. 5, (a)) could be vectorized and printed using technique. Furthermore, using Raman mapping of nitrogen defect luminescence, verification was enabled of the patterns as being composed of 3C—SiC (FIG. 5, (c)). For 3D printing a layer-by-layer technique (FIG. 5) is demonstrated, which is based on laser-assisted sidewall cutting/conversion and multilayer fusion. For interlayer fusion, the power of the laser was simply increased to overshoot but just enough to weld various layers of 3C—SiC embedded in PDMS to obtain an integrated construct. This technique has an advantage as it does not use photopolymerizing agents and can be performed in solid state.

Example 3: Patterned Electrodes with Pseudocapacitive Coupling for Electrical Stimulation To explore the electrochemical properties of the 3C—SiC, an electrode was prepared by electrically interfacing a copper wire with the graphitic side using silver paste (FIG.

6 (*a*)). This was followed by sealing the device to expose only the SiC surface of a definite area to the electrolyte. Cyclic voltammograms (CV) were carried out in IX phosphate-buffered saline (PBS). The cyclic voltammograms collected at various scan rates demonstrated a distinct difference with respect to the standards used (FIG. 6 (*b*), (*c*)). The skewed square-like shape of CV and the decreasing trend of differential capacitance from 6.28 mF/cm$^2$ to 4.67 mF/cm$^2$ and to 3.50 mF/cm with an increasing scan rate from 50 mV/s to 100 and 200 mV/s, is indicative of a pseudocapacitive charging in 3C—SiC (FIG. 6, (a)). Moreover the order of a mF/cm$^2$ in differential capacitance is three orders of magnitude greater than double layer capacitance reported on conventional conductive electrodes. This means that the Faradaic component of the charge storage available in 3C—SiC is due both to its nitrogen doped electronic structure and surface properties, making it a superior electrode for forming well-coupled capacitive junctions with cells. This idea is reinforced by electrochemical impedance measurements which reveal a ~100Ω resistance of charge transfer for the doped 3C—SiC crystals compared to ~MΩ for undoped 3C—SiC wafers (FIG. 6, (e), (f)). Such an enhanced double-layer capacitance and lower resistance of charge transfer can facilitate an enhanced capacitive coupling between material surface and cell membrane. Furthermore, electrochemical properties being surface sensitive the potential role of oxide defects as observed in X-ray photoelectron spectroscopy (FIG. 20, 21) is to be noted.

Furthermore, the in-situ formation of a graphite layer underneath the 3C—SiC is what portrays these circuits as ready-to-use electrodes because they act as interfacing electrodes with excellent conductivity (FIGS. 13-14). The utility of such electrodes is demonstrated by direct in vivo electrical stimulation of skeletal muscle (FIG. 6, (d)). Electrical pulses were delivered through a printed 3C—SiC device placed on the skeletal muscle of rat limb. Extracellular field potential recordings on the same tissue revealed bioelectric signals that are synchronized to stimulation (FIG. 6, (e)), suggesting a successful stimulation of the skeletal muscle.

Example 4: Flexible Capacitively Coupled Electrodes for Electrical Cardiac Pacing Having realized the potential capacitive coupling by the nitrogen doped surface, printing and testing devices of these for electrical stimulation was undertaken. The in-situ formation of a graphite layer underneath the 3C—SiC portrays these circuits as ready-to-use electrodes which act as interfacing electrodes with excellent conductivity. Devices were fabricated by printing a zig-zag pattern on PDMS layer with two different powers. Using different powers, a surface electrode and a side-wall electrode were created, the latter utilizing higher power (FIG. 7 (*a*), (*c*)). The devices were connected to copper wire using silver paste and all electrical contacts sealed to expose only SiC surface to electrolyte. Both of these electrodes were separately used to interface with an ex-vivo isolated heart. A viable contracting heart was mounted on langendorff apparatus and two SiC devices were placed against the left and right ventricles. The flexibility of the device (as observed in FIG. 7 (*d*)) demonstrates the soft interface that is determined by the PDMS substrate. Then, electrical stimulation was delivered to the heart via the interfacing devices (FIG. 7 (*b*)). Before stimulation, the slow atrioventricular node rhythm of 1.5-2 Hz can be observed by ECG and left ventricular pressure (LVP) recordings. Upon electrical stimulation, the heart rate immediately synchronizes to that of the stimulation rate (FIG. 7 (*e*), (*f*)). As the electrical stimulation clearly distorts the ECG signal due to the electrical artifact, we also used LVP recordings that shows the clear overdrive pacing effect of the stimulation. As expected, when eliminating the electrical stimulation, the heart resumes its slow atrioventricular node rhythm. This observation clearly indicates that the SiC device is fully compatible for bio-modulation of a viable tissue with low tissue-electrode impedance losses while maintaining its flexibility and integrity.

Example 5: Photoelectrochemical Characteristics of 3C—SiC

The surface and its composition would influence the electrochemical properties, which are critical for forming functional biointerfaces. To account for these properties, the valence band position was characterized of all synthetic products using ultraviolet photoelectron spectroscopy (UPS). The valence band edge estimated using UPS (FIG. 15, (a)) is given with respect to the standard hydrogen electrode as 1.86 eV for 3C—SiC, 2.48 eV for 3C—SiC—MnO$_2$ and 1.19 eV for M-SiC (FIG. 8 (*a*)). Single-channel photocurrent measurements were used to determine the nature of functionality that the interfaces would exhibit with optical excitation. The 3C—SiC electrodes exhibited a photoanodic oxidative reaction, confirmed by the negative direction of the faradaic current and its invariance with the holding level (FIG. 8, (c)). Furthermore, this photoanodic oxidation reaction is enhanced ~10-fold by the electroless deposition of MnO$_2$ on the 3C—SiC surface (FIG. 16). Given the n-type nature of the 3C—SiC and their upward band bending at the electrolyte interface (FIG. 8, (b)), the photocurrent measurements for 3C—SiC and 3C—SiC—MnO$_2$ showing photoanodic oxidation is consistent. Hence, a qualitative comparison of UPS determined valence band edge with standard redox potentials for the two- and four-electron oxidation of water reveals an overlap of 3C—SiC valence band edge with water oxidation to hydrogen peroxide (FIG. 5 (*a*)). This photoanodic behavior of the synthesized doped 3C—SiC structure is in stark contrast with intrinsic 3C—SiC which exhibits pure photocapacitive behavior (FIG. 28). Furthermore, the graphitic layer formed beneath the 3C—SiC is non-photoresponsive ruling out its contribution (FIG. 29, (c)). These comparisons once-again highlight the unique electronic structure of nitrogen doped 3C—SiC bringing forward this photofaradaic property.

This suggests water oxidation to hydrogen peroxide as a potential reaction that is measured in the single-channel photocurrent measurements. Furthermore, to verify the functionality of 3C—SiC and the hypothesis of hydrogen peroxide production, fluorescence kinetics studies were undertaken. These studies confirmed the production of hydrogen peroxide by 3C—SiC, and the kinetics showed its saturation with time (FIG. 8 (*d*)). However, for 3C—SiC—MnO$_2$, the hydrogen peroxide production is more than 3C—SiC, suggesting a catalytic role for MnO$_2$. This idea is supported by a more positive valence band edge of 3C—SiC—MnO$_2$, thermodynamically favoring more oxidation of water to hydrogen peroxide. Furthermore, the difference in the quantity of hydrogen peroxide produced also discriminates their role in biology-3C—SiC provides a therapeutic dose, though 3C—SiC—MnO$_2$ provides a lethal dose, hence its utility in anti-bacterial applications (FIG. 18).

Example 6: Biomimicry of 3C—SiC as an Endothelial Cell

From a cardiovascular perspective, hydrogen peroxide or reactive oxygen species (ROS) plays a unique role in the control of smooth muscle cells. Endothelial cells that form the lining of arteries and veins sense pressure and use nitric oxide to signal smooth cells to regulate their contraction-relaxation cycles. However, studies have revealed that the direct addition of hydrogen peroxide could also elicit a similar response mediated via regulation of inositol triphosphate receptors (IP3R) (FIG. 8 (*e*)). Thus, investigations were carried out on an ensemble of smooth muscle cells and studied the calcium signals of individual cells as a consequence of 3C—SiC stimulation. Calcium signals of individual cells in the region of stimulation were analyzed, such that their response could be separated into stationary and oscillatory. Here, "stationary" cells are classified as those which fire action potentials with very long periods (~1 contraction cycle per 2-3 minutes) and "oscillatory" cells as those which fire faster (~3-4 contraction cycles per minute). As a consequence of stimulation—or exogenous hydrogen peroxide availability to cells—an immediate calcium spike is seen for stationary cells (FIG. 8, (f)(i)) whereas for oscillatory cells the response depends on where the stimulation happens with respect to the last calcium peak or contraction state. The oscillatory cells respond to hydrogen peroxide in three ways, depending on whether the stimulation happens in its relaxed state (FIG. 8, (f)(ii)), immediately after contraction (FIG. 8, (f)(iii)) or just after reaching a relaxed state (FIG. 8, (f)(iv)). These responses are a phase shift (delay in next firing) in oscillation, or a transient frequency increase, or an increase in frequency followed by damping to higher calcium level, respectively. These perturbations in oscillatory responses are consistent with experimental and theoretical studies of smooth muscle behavior that occur with an increase of inositol triphosphate (IP3).

Fluorescence kinetics (FIG. 8, (d)) has demonstrated the production of hydrogen peroxide, which is known to directly increase JP3 by binding to G-protein coupled receptors (GPCR). GPCR activation leads to an increase in cytosolic IP3 which regulates IP3R which opens in a cyclic fashion modulated by cytosolic calcium levels. Such a biphasic regulation of IP3R by cytosolic calcium leads to oscillation in cytosolic calcium and transmembrane chloride current. The opening of this transmembrane chloride channel causes depolarization via the uptake of exogenous calcium and the release of calcium from internal storages like the endoplasmic or sarcoplasmic reticulum. Thus, putting together the cellular calcium perturbation observations with these existing facts, confirming the IP3-based signaling mechanism involved. The capability of hydrogen peroxide produced by 3C—SiC in modulating smooth muscle contraction cycles through an IP3 mediated pathway is in contrast with endothelial cells which perform it through nitric oxide. This contrast in fundamental mechanism leading to similar underlying modulation illustrates the biomimicry.

In addition, observation of a stimulated sheet of cells using a printed device or with 3C—SiC particles reveals an overall increase in calcium levels (FIG. 8. (g), (h)). This increase, observed as IP3R activation, leads to an exogenous calcium uptake and an internal store release of calcium leading to depolarization of cells. Such an overall calcium level increase on an ensemble level manifests on the cellular level in different ways as observed in FIG. 8, (f). Further exploration of correlations of calcium signals on an ensemble of stimulated smooth muscle cells by analyzing mean synchronization between them reveals an increase in synchronization post-stimulation. This also illustrates the increased synchronization in contraction of an ensemble of smooth muscles consistent with increased calcium levels, illustrating the functionality on an ensemble level (FIG. 19). This suggests a device-based therapeutic utility for remote vasoconstriction in trauma surgeries or sphincter contraction in cases of chronic spinal cord injury.

Furthermore, it is demonstrated the device-level scaling of this phenomena by growing smooth muscle cells on a device to form a uniform layer (FIG. 8, (i)), and then further stimulating them to produce localized calcium waves (FIG. 8, (j)). This suggests a device-based therapeutic utility by delivering hydrogen peroxide.

Example 7: Spatiotemporal Synchronization of Neural Networks

M-SiC consisting of mixed phase and excess nitrogen doping demonstrated a weak photothermal effect. Further the photothermal effect is characterized by portraying a growing photocurrent with an applied stimulation (FIG. 9, (a); FIG. 16). In order to justify this observation, surface composition of all synthesized materials was compared using X-ray photoelectron spectroscopy (XPS). The surface composition revealed the presence of 21% surface oxide and 1% nitride defects in 3C—SiC, which increased to 30.4% and 3.75%, respectively, in M-SiC (FIGS. 20 and 21). The increased presence of oxide and nitride surface defects in M-SiC could potentially justify their weak photothermal capability-apart from the excessive doping (~2000 ppm nitrogen) they have in bulk. Besides, M-SiC has a valence band edge much higher than all possible water oxidation reactions (FIG. 8) which explains its capability in portraying the photothermal effect due to its inability in performing any photoelectrochemical reaction. This may be attributed to a change in electronic structure at the surface due to excessive doping, defects and higher surface phonon density as verified in low-loss electron energy loss spectroscopy (EELS) (FIG. 22).

A system is next identified with which to test the photothermal effect of M-SiC. Being sensory, dorsal root ganglial neurons (DRG) are known to respond to heat as a stimulus. Moreover, the fact that photoelectrochemical stimulation has poor spatial confinement due to diffusion of produced molecular species provides thermal effects with a unique edge (FIG. 9, (b)) when it comes to spatio-temporal control. Herein, DRG networks were cultured (FIG. 9, (c), (f)) with M-SiC crystals dispersed in culture to form stable and biocompatible biointerfaces with networks. Scanning electron microscope (SEM) revealed the capability of M-SiC crystals to form entangled junctions with axons (FIG. 9, (d), in addition to dendrites wrapping around them (FIG. 9, (e)). The synchronization changes introduced by an optical stimulation on a single node of a DRG network were explored (FIG. 9, (f)). Such stimulation caused increased local synchronization around that node and an overall increase in the average synchronization index on the entire network. These are clearly visible in the synchronization plots before and after stimulation with the rearrangement and expansion of clusters around the stimulated neuron (Neuron ID: 12, indicated by arrow in FIG. 9, (g)). The mean synchronization index increased from 0.197 to 0.338 after stimulation. This observation suggests how one could spatiotemporally control neural network dynamics by photothermal stimulation compared to conventional drugs which stimulate networks globally. This principle could be potentially used for precision neuromedicine in regaining synchronization in networks of nerve injury, regional neuromodulation or even degenerative diseases such Alzheimer's Disease.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

We claim:

1. A method, comprising:

providing a polydimethylsiloxane (PDMS) substrate; and irradiating at least a portion of the substrate with a laser under conditions sufficient to produce a layer of silicon carbide comprising 3C silicon carbide (3C—SiC) and a layer of graphite, wherein the layer of graphite is positioned between the substrate and the layer of silicon carbide.

2. The method of claim 1, wherein the irradiation is performed with a power in the range of 100 mW to 20 W.

3. The method of claim 1, wherein the laser has a wavelength of 0.7 μm to 200 μm.

4. The method of claim 1, wherein the PDMS substrate further comprises a gold membrane.

5. The method of claim 4, wherein the irradiation is performed with a power in the range of 0.1 mW to 100 mW.

6. The method of claim 4, wherein the laser has a wavelength of 0.4 μm to 200 μm.

7. The method of claim 1, further comprising depositing $MnO_2$ on the silicon carbide.

8. The method of claim 1, wherein the silicon carbide further comprises nitrogen as a dopant.

9. The method of claim 8, wherein the nitrogen is present in an amount ranging from 10 ppm to 10,000 ppm.

10. The method of claim 1, wherein the irradiation is conducted under an atmosphere of gas.

11. The method of claim 10, wherein the gas comprises nitrogen or fluorine.

12. The method of claim 11, wherein the gas comprises nitrogen and is present in an amount of between 60 vol % and 90 vol %.

13. The method of claim 1, wherein the irradiation ablates at least a portion of a surface of the substrate to form a predetermined pattern.

14. A method comprising:

providing a $MoS_2$-modified PDMS substrate; and irradiating at least a portion of the $MoS_2$-modified PDMS substrate with a laser under conditions suitable to produce silicon carbide comprising 3C—SiC and 15R silicon carbide, collectively M-SiC.

15. The method of claim 14, wherein the $MoS_2$-modified PDMS substrate is prepared by reacting $MoS_2$ with a monomer and a curing agent at a weight ratio of about 10:1:0.5.

16. The method of claim 14, wherein the irradiation is performed with a power in the range of 100 mW to 20 W.

17. The method of claim 14, wherein the laser has a wavelength of 0.7 μm to 200 μm.

18. The method of claim 14, wherein the irradiation further produces a graphite layer beneath the silicon carbide.

19. The method of claim 14, further comprising depositing $MnO_2$ on the silicon carbide.

20. A method, comprising:

providing a polydimethylsiloxane (PDMS) substrate;

irradiating at least a portion of the substrate with a laser under conditions sufficient to produce silicon carbide comprising 3C silicon carbide (3C—SiC); and depositing $MnO_2$ on the silicon carbide.

* * * * *